(12) United States Patent
Hu et al.

(10) Patent No.: US 10,264,407 B2
(45) Date of Patent: Apr. 16, 2019

(54) INTELLIGENT MULTI-BEAN MEDIUM ACCESS CONTROL IN KU-BAND FOR MISSION-ORIENTED MOBILE MESH NETWORKS

(71) Applicants: The Board of Trustees of the University of Alabama, Tuscaloosa, AL (US); San Diego State University (SDSU) Foundation, San Diego, CA (US)

(72) Inventors: Fei Hu, Tuscaloosa, AL (US); Xin Li, Tuscaloosa, AL (US); Sunil Kumar, San Diego, CA (US)

(73) Assignees: The Board of Trustees of the University of Alabama, Tuscaloosa, AL (US); San Diego State University (SDSU) Foundation, San Diego, CA (US)

(*) Notice: Subject to any disclaimer, the term of this patent is extended or adjusted under 35 U.S.C. 154(b) by 118 days.

(21) Appl. No.: 15/193,617

(22) Filed: Jun. 27, 2016

(65) Prior Publication Data
US 2016/0381596 A1   Dec. 29, 2016

Related U.S. Application Data

(60) Provisional application No. 62/184,694, filed on Jun. 25, 2015.

(51) Int. Cl.
*H04W 28/04* (2009.01)
*H04W 4/04* (2009.01)
(Continued)

(52) U.S. Cl.
CPC ............. *H04W 4/046* (2013.01); *G06F 9/00* (2013.01); *H04B 7/0617* (2013.01); *H04L 47/50* (2013.01);
(Continued)

(58) Field of Classification Search
None
See application file for complete search history.

(56) References Cited

U.S. PATENT DOCUMENTS 9,392,565 B2 * 7/2016 Shao ................. H04W 56/0065
2004/0184434 A1   9/2004 Benoist et al.
(Continued)

OTHER PUBLICATIONS

Chakraborty et al, A HiperLAN/2 Based MAC Protocol for Efficient Vehicle-to-Infrastructure Communication Using Directional Wireless Mesh Backbone, (Year: 2012).*
(Continued)

*Primary Examiner* — Vinncelas Louis
(74) *Attorney, Agent, or Firm* — Meunier Carlin & Curfman LLC

(57) ABSTRACT

A MAC design for Ku-band mobile wireless mesh network with multi-beam smart antennas is disclosed. This MAC includes an overlay control that separates the collision domain. It also has lower layer CSMA-like scheme. The disclosed design includes an enhanced PCF and an enhanced DCF for two purposes: (1) exploiting multi-beam concurrent communication capability (2) supporting QoS and mission-based communications. An efficient time synchronization scheme is also disclosed to ensure all beams can concurrently send data to the star node. Finally, ARMA or HMM based prediction schemes are disclosed to predict future traffic profile in each beam. This helps the star node to better prepare the queue content and schedule information.

24 Claims, 38 Drawing Sheets

(51) Int. Cl.
    H04B 7/06      (2006.01)
    H04W 28/02     (2009.01)
    H04L 12/863    (2013.01)
    G06F 9/00      (2006.01)
    H04B 7/26      (2006.01)
    H04W 84/06     (2009.01)
    H04W 84/00     (2009.01)
    H04W 74/08     (2009.01)
(52) U.S. Cl.
    CPC ....... *H04W 28/0268* (2013.01); *H04B 7/2643* (2013.01); *H04W 74/0808* (2013.01); *H04W 84/005* (2013.01); *H04W 84/06* (2013.01)

(56) References Cited

U.S. PATENT DOCUMENTS

| | | | |
|---|---|---|---|
| 2006/0268760 | A1 | 11/2006 | Fang et al. |
| 2006/0274776 | A1* | 12/2006 | Malik ................. H04B 7/00 370/445 |
| 2007/0232359 | A1* | 10/2007 | Pinheiro ............ H04B 7/0695 455/562.1 |
| 2009/0067326 | A1* | 3/2009 | Perrot .................... H04L 47/14 370/230 |
| 2010/0017826 | A1 | 1/2010 | Fitting |
| 2013/0262354 | A1* | 10/2013 | Ide ...................... G06N 99/005 706/12 |
| 2015/0186569 | A1* | 7/2015 | Sekine .................... G01V 3/12 703/2 |

OTHER PUBLICATIONS

Nagase, Ku Band Mobile Multimedia Satellite Communications for trains (Year: 2003).*

Allan, et al., "Time and Frequency(time-domain) Characterization, Estimation, and Prediction of Precision Clocks and Oscillators", IEEE trans-actions on ultrasonics, ferroelectrics, and frequency control, vol. 34, No. 6, 1987, pp. 647-654.

Aryafar et al., "MIDU: Enabling MIMO Full Duplex", in MobiCom, 2012, 12 pages.

Baharadia et al., "Full Duplex Radios", in ACM SIGCOMM, 2013, 12 pages.

Bao, et al., "Distributed Dynamic Channel Access Scheduling for Ad Hoc Networks", Journal of Parallel and Distributed Computing, vol. 63, No. 1, 2003, pp. 3-14.

Bao, et al., "Transmission Scheduling in Ad Hoc Networks with Directional Antennas", Proceedings of the 8th annual international conference on Mobile computing and networking. ACM, 2002, pp. 48-58.

Bazan et al., "A Survey on Mac Protocols for Wireless Adhoc Networks with Beamforming Antennas," Communications Surveys & Tutorials, IEEE, vol. 14, No. 2, 2012, pp. 216-239.

Bekmezci et al., "Flying ad-hoc networks (fanets): A survey," Ad Hoc Networks, vol. 11, No. 3, 2013, pp. 1254-1270.

Cheng et al., "Design considerations for next-generation airborne tactical networks", Communications Magazine, IEEE, vol. 52, No. 5, 2014, pp. 138-145.

Choi et al., Achieving Single Channel, Full Duplex Wireless Communication, MobiCom, 2010. 12 pages.

Chou et al., "QoS Provisioning for Wireless LANs With Multi-Beam Access Point", Mobile Computing, IEEE Transactions, vol. 13, No. 9, 2014, pp. 2113-2127.

Chou et al., "UPCF: A New Point Coordination Function with QoS and Power Management fo Multimedia over Wireless LANs", IEEE/ACM Transactions on Networking, vol. 14, No. 4, 2006, pp. 807-820.

Choudhury, et al., "Capture-aware Protocols for Wireless Multihop Networks using Multi-beam Directional Antennas", Technical report, VIUC, 2005, 16 pages.

Choudhury et al., "Deafness: A MAC Problem in Ad Hoc Networks When Using Directional Antennas," in Network Protocols, 2004. ICNP 2004. Proceedings of the 12th IEEE International Conference, 2004, pp. 283-292.

Cidon, et al., "Flashback: decoupled lightweight wireless control", Proceedings of the ACM SIGCOMM 2012 conference on Applications, technologies, architectures, and protocols for computer communication (SIGCOMM '12). ACM, New York, NY, USA, 223-234.

Cox, et al., "Time Synchronization for ZigBee Networks", System Theory, 2005. SSST'05. Proceedings of the Thirty-Seventh Southeastern Symposium, IEEE, 2005, pp. 135-138.

Duarte et al., "Full-duplex wireless communications using off-the-shelf radios: Feasibility and first results", Signals, Systems and Computers (ASILOMAR), 2010 Conference Record of the Forty Fourth Asilomar Conference, vol., No.,2010, pp. 1558-1562.

Elson, et al., "Fine-grained Network Time Synchro-nization Using Reference Broadcasts", ACM SIGOPS Operating Systems Review, vol. 36, No. SI, 2002, pp. 147-163.

Fox, et al., "Bayesian Nonparametric Learning of Complex Dynamical Phenomena", Doctoral Thesis, Massachusetts Institute of Technology, Jul. 2009.

Hamieh et al., "Detection of Jamming Attacks in Wireless Ad Hoc Networks Using Error Distribution", Communications, 2009. ICC '09. IEEE International Conference, pp. 1-6.

Iannucci et al., "No Symbol Left Behind: A Link-Layer Protocol for Rateless Codes", MobiCom'12, 2012, 11 pages.

Jain, et al., "On-demand Medium Access in Multihop Wireless Nnetworks with Multiple Beam Smart Antennas", Parallel and Distributed Systems, IEEE Transactions, vol. 19, No. 4, 2008, pp. 489-502.

Jain, et al., "Practical, Realtime, Full Duplex Wireless," in Proc. of ACM MobiCom, 2011, 12 pages.

Kim et al., "Resource Allocation for QoS Support in Wireless Mesh Networks", Wireless Communications, IEEE Transactions, vol. 12, No. 5, 2013, pp. 2046-2054.

Lee, et al., "Ku-band Link Budget Analysis of UAV with Atmospheric Losses", in 25th Digital Avionics Systems Conference, 2006 IEEE/AIAA. IEEE, 2006, pp. 1-8.

Lin et al., "Compressive Sensing Medium Access Control for Wireless Lans", in Global Communications Conference (GLOBECOM), 2012 IEEE. IEEE, 2012, pp. 5470-5475.

Luby, "LT codes", in Annual IEEE Symp. Found. of Comp. Sci., Nov. 2002, pp. 271-280.

Magistretti et al., "Wifi-nano: Reclaiming wifi efficiency through 800ns slots", In Proceedings of MOBICOM, 2011, 12 pages.

Morton et al., "Ku-band subsampling track-and-hold amplifier with 8 ENOB resolution", Electronics Letters 42.8,2006, pp. 1-2.

Nagase, "Ku Band Mobile Multimedia Satellite Communications System for Trains", AIAA-paper-2003-2205, ICSSC, 2003, 7 pages.

Nedevschi et al., "An Adaptive, High Performance MAC for Long-Distance Multihop Wireless Networks", in Proceedings of the 14th ACM international conference on Mobile computing and networking. ACM, 2008, 12 pages.

Obregon et al., "On the sharing opportunities for ultra-dense networks in the radar bands", Dynamic Spectrum Access Networks (DYSPAN), 2014 IEEE International Symposium on , vol., No., pp. 215-223.

Pei, "A Neighbor Discovery Protocol for Directional Antenna Networks", Military Communications Conference, 2005. MILCOM 2005. IEEE. IEEE, 2005, pp. 487-492.

Porcello, et al., "Designing and Implementing Multibeam Smart Antennas for High Bandwidth UAV Communications Using FPGAs", Aerospace Conference, IEEE, 2013, pp. 1-12.

Rabiner, "A tutorial on hidden Markov models and selected applications in speech recognition", Proceedings of the IEEE, vol. 77, No. 2, 1989, pp. 257-286.

Raman et al., "Design and Evaluation of a new MAC Protocol for Long-Distance 802.11 Mesh Networks", in Proceedings of the 11th annual international conference on Mobile computing and networking. ACM, 2005, pp. 156-169.

(56) References Cited

OTHER PUBLICATIONS

Rao, et al., "An overlay MAC Layer for 802.11 Networks", Proceedings of the 3rd international conference on Mobile systems, applications, and services. ACM, 2005, pp. 135-148.
Reese, et al., "Modeling and Simulation of a Helicopter-mounted SATCOM Antenna Array", Antennas and Propagation Magazine, IEEE, vol. 53, No. 2, 2011, pp. 51-60.
Reigadas et al., "Modeling and Optimizing IEEE 802.11 DCF for Long-Distance Links," Mobile Computing, IEEE Transactions, vol. 9, No. 6, 2010, pp. 881-896.
Rokonuzzaman, et al., "A Cross-layer Approach for Using Multiple Radio Channels with Directional Beams in a Subur-ban Ad Hoc Network", Telecommunication Networks and Applications Conference, 2008. ATNAC 2008. Australasian. IEEE, 2008, pp. 192-197.
Romer, et al., "Time Synchronization in Ad Hoc Networks", Proceedings of the 2nd ACM international symposium on Mobile ad hoc networking& computing. ACM, 2001, 9 pages.
Salmeron-Ntutumu et al., "Comparison of MAC Protocols for 802.11-based Long Distance Networks," in Proc. Workshop Wireless for Development (WIRELESS4D), 2008, 10 pages.
Slater et al., "A game-theoretic framework for jamming attacks and mitigation in commercial aircraft wireless networks", In AIAA Infotech @ Aerospace Conference, 2009, 8 pages.
Sheu et al., "A Clock Synchronization Algorithm for Multihop Wireless Ad Hoc Networks," Wireless Personal Communications, vol. 43, No. 2, 2007, pp. 185-200.
Stockhammer et al., "Application Layer Forward Error Correction for Mobile Multimedia Broadcasting", CRC Press, Tech. Rep., 2008, 33 pages.
Su, et al., "Time-diffusion Synchronization Protocol for Wireless Sensor Networks", Networking, IEEE/ACM Transactions, vol. 13, No. 2, 2005, pp. 384-397.
Sugiyama et al., "A Wireless Full-duplex and Multi-hop Network with Collision Avoidance using Directional Antennas", Mobile Computing and Ubiquitous Networking (ICMU), 2014 Seventh International Conference, 2014, 6 pages.
Suzuki et al., "Vehicle Teleoperation Using 3D Maps and Gps Time Synchronization," Computer Graphics and Applications, IEEE, vol. 33, No. 5, 2013, pp. 82-88.
Swami et al., "Multichannel ARMA processes", Signal Processing, IEEE Transactions, vol. 42, No. 4, 1994, pp. 898-913.
Tan, et al., "A QoS provisioning framework for Wireless Mesh Network", Automation, Quality and Testing, Robotics, 2008. AQTR 2008. IEEE International Conference, vol. 1, No., 2008, pp. 342-345.
Tiwari, et al., "Feasibility of Communication Planning in Airborne Networks Using Mission Information", Military Commu-nications Conference, 2009. MILCOM 2009. IEEE. IEEE, 2009, pp. 1-7.
Vilzmann, et al., "A Survey on MAC Protocols for Ad hoc Networks with Directional Antennas", EUNICE 2005: Networks and Applications Towards a Ubiquitously Connected World. Springer, 2006, pp. 187-200.
Wu, et al., "Cross-layer Forward Error Correction Scheme using Raptor and RCPC Codes for Prioritized Video Transmission over Wireless Channels", IEEE Transactions on Circuits and Systems for Video Technology. Issue: 99, 2014, 14 pages.
Xie et al., A Survey and Analysis of Mobility Models for Airborne Networks, Communications Surveys & Tutorials, IEEE , vol. 16, No. 3, 2014, pp. 1221-1238.
Xu et al., The feasibility of launching and detecting jamming attacks in wireless networks. In MobiHoc, 2005, 12 pages.
Xu et al., "Anti-jamming Timing Channels for Wireless Networks", Proceedings of the first ACM conference on Wireless network security, 2008,11 pages.
Yang et al., "Next Generation Half-Duplex Common Data Link", in Military Communications Conference, 2007. MILCOM 2007. IEEE. IEEE, 2007, pp. 1-7.

* cited by examiner

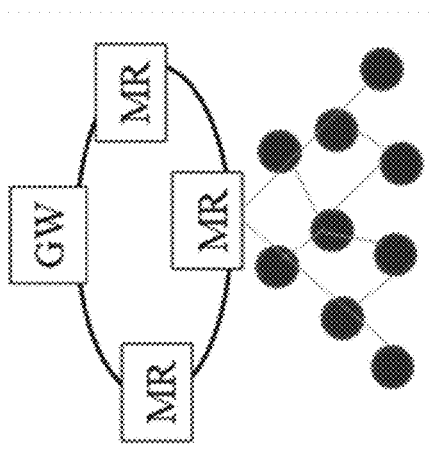
FIG. 3A
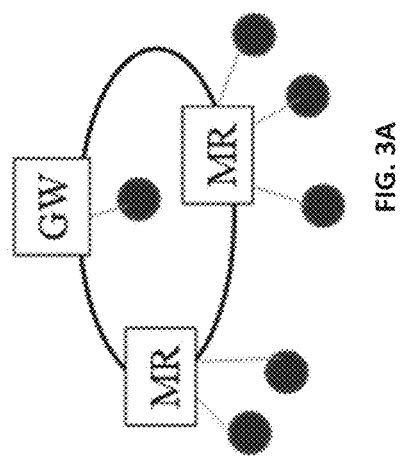
FIG. 3B
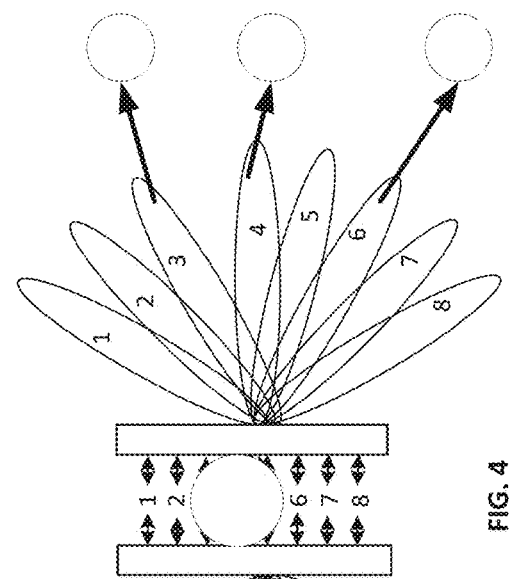
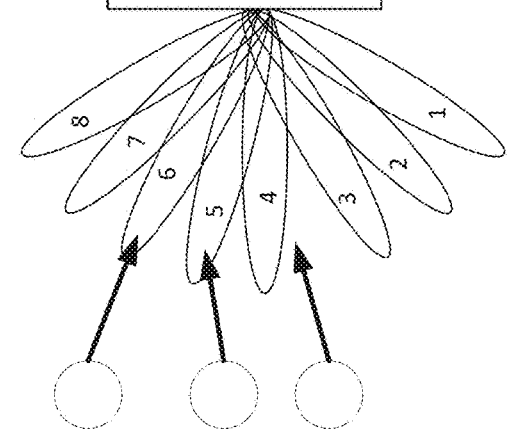
FIG. 4

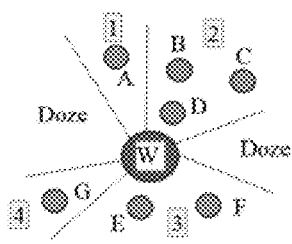
FIG. 17A
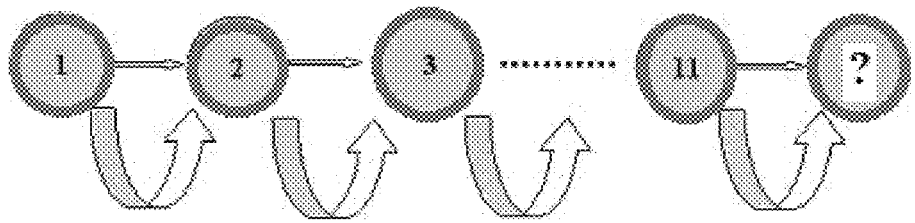
FIG. 17B
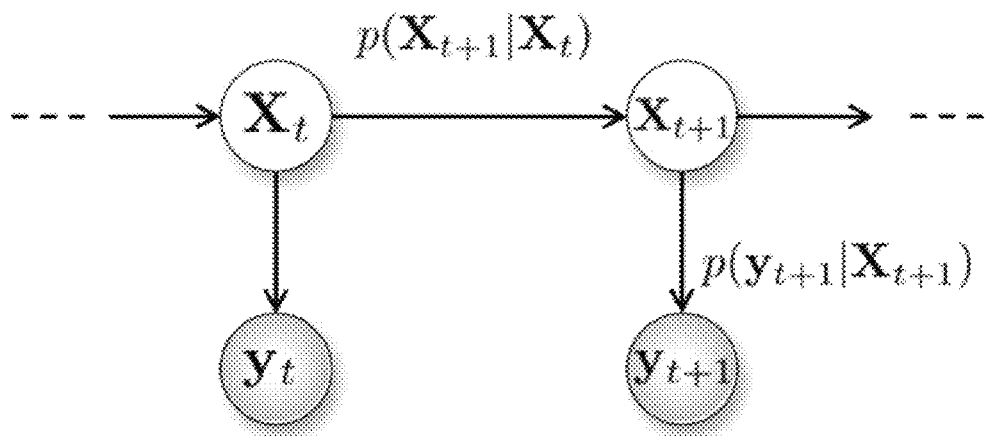
FIG. 18A
FIG. 18B

(a) Conventional Stop-and-Go  FIG. 46A
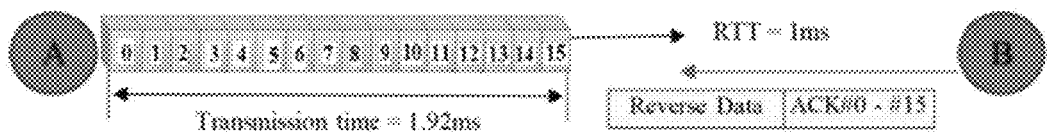
(b) Window ACK  FIG. 46B
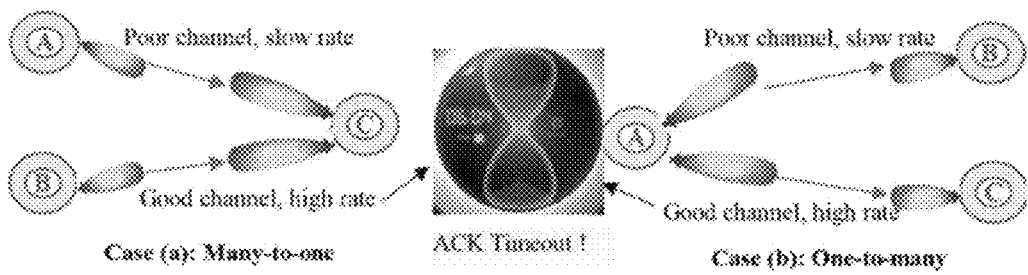
FIG. 47
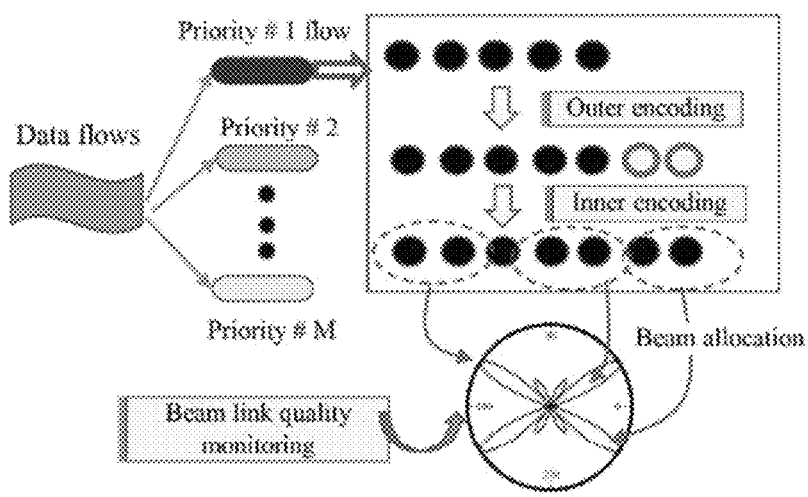
FIG. 48

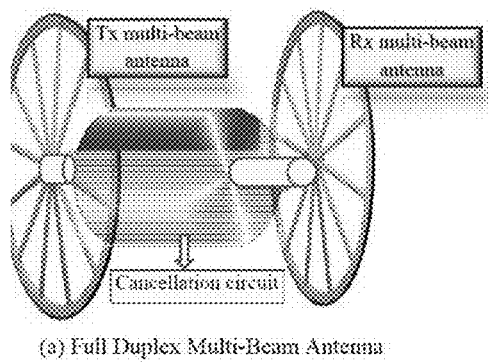 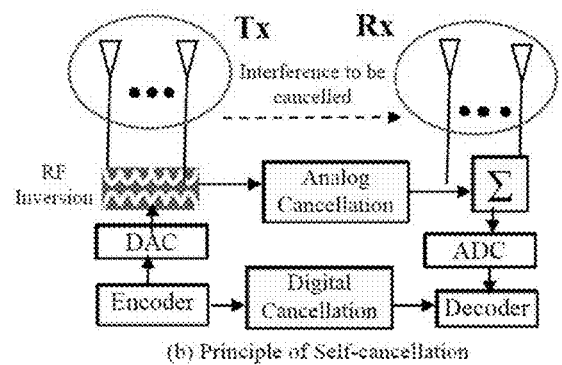
(a) Full Duplex Multi-Beam Antenna
(b) Principle of Self-cancellation
FIG. 69A       FIG. 69B

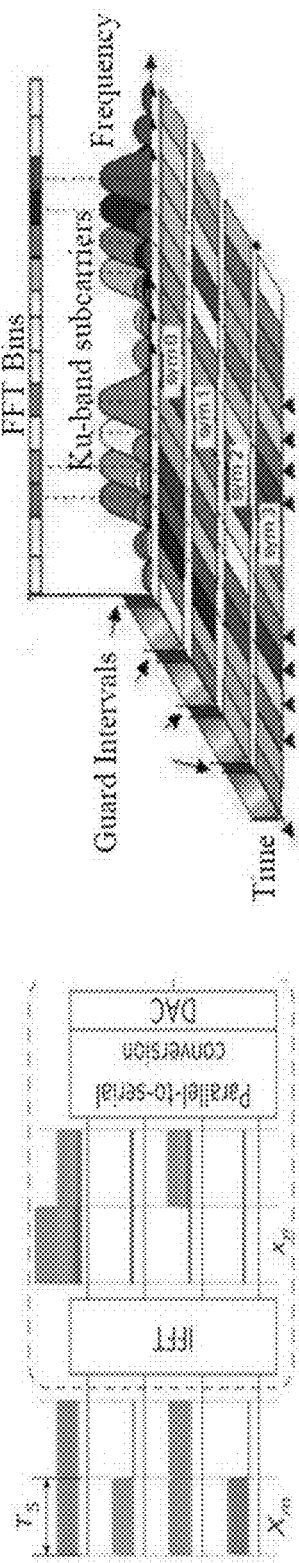
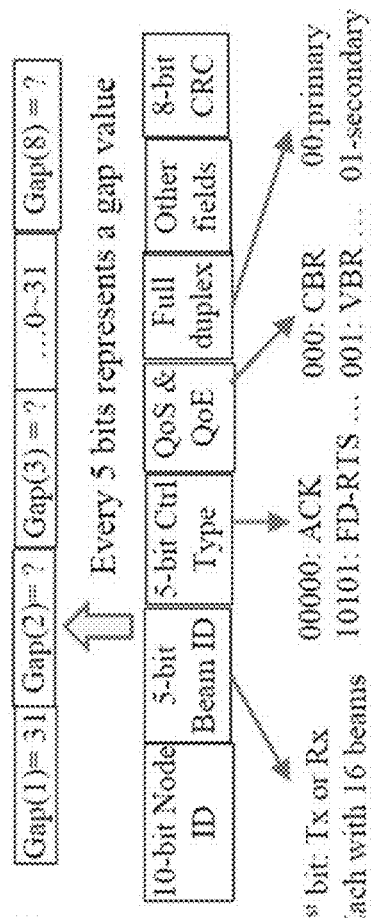
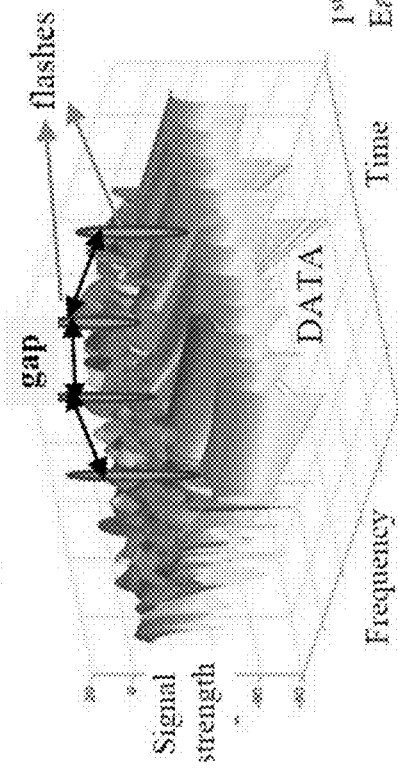
(a) OFDM Transmitter FIG. 75A
(b) OFDM subcarrier FIG. 75B
(c) Concept of Flashes FIG. 75C
(d) Flash coding/decoding FIG. 75D

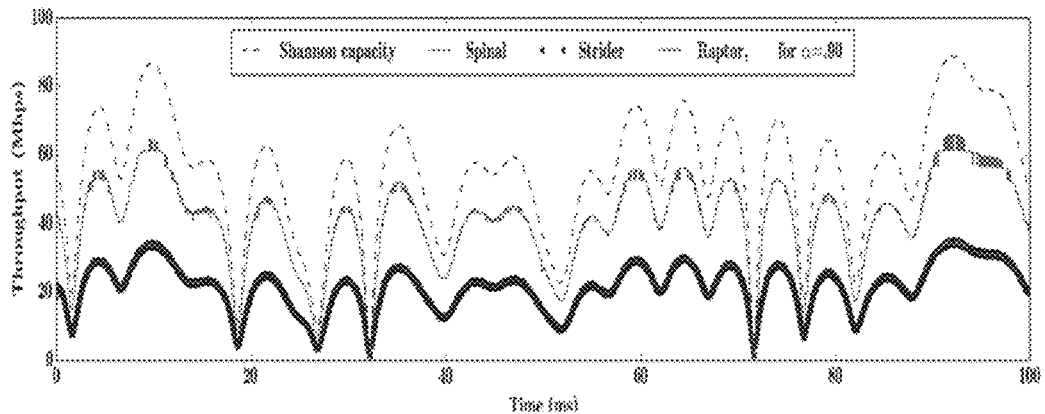
FIG. 84
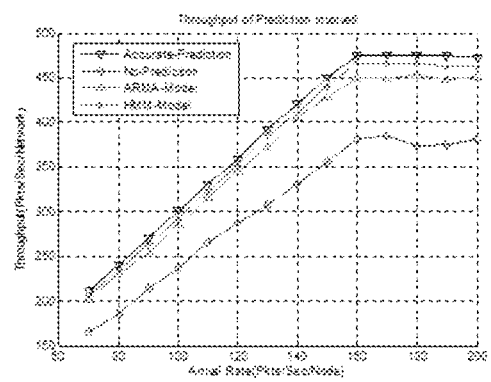
FIG. 85
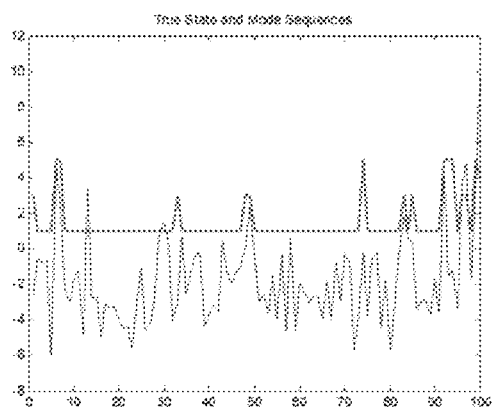 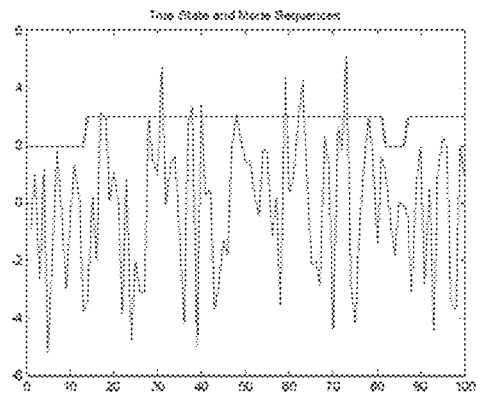
FIG. 86A          FIG. 86B

INTELLIGENT MULTI-BEAN MEDIUM ACCESS CONTROL IN KU-BAND FOR MISSION-ORIENTED MOBILE MESH NETWORKS

CROSS REFERENCE TO RELATED APPLICATION

This application claims priority to and benefit of U.S. Provisional Patent Application Ser. No. 62/184,694 filed on Jun. 25, 2015, which is fully incorporated by reference and made a part hereof.

GOVERNMENT SUPPORT CLAUSE

This invention was made with government support under U.S. DOD #FA8750-14-1-0075 awarded by the U.S. DoD (Department of Defense). The government has certain rights in the invention.

BACKGROUND

Directional Airborne Networks

With the popularity of unmanned aerial vehicles (UAVs) and environment surveillance applications, airborne networks (ANs) have become important platforms for wireless transmissions in the sky.

Ku-Band Communications

The Ku-band of the electromagnetic spectrum (approximately 10-17 GHz) has been used, for example, for land-to-satellite communication applications. It can be useful for when satellites sends signals to a mobile object, such as train communications, aircraft Internet access, and the like. Ku-band satellites may require the relatively high gain of directional antenna in order to reach hundreds of miles away. The carrier-to-noise ratio (C/N) of Ku-band communication, even in rain (for example, 4 mm/h precipitation), can maintain a reliability of 90% and a bit error rate (BER) of $10^{-5}$, for a distance of approximately 200 km. Other methods have also been shown to achieve spectrum sharing in indoor applications, albeit in the 15.7-17.2 GHz band, in addition to showing that the impact of interference can be negligible in many spectrum sharing cases.

Overall, Ku-band communication has a path fading performance between the Wi-Fi case and milli-wave links. It has much better signal focusing capability than Wi-Fi, which means that a directional antenna can deliver the Ku-band signals for long distances without much diffusion. This can be called its "semi-wire" feature. By using multi-beam antennas, space reuse can be achieved, to make neighbors in different beams of a node communicate with a referred node simultaneously. The Ku-band's signal diffraction capability can be better than milli-wave due to its lower frequency, which means general small objects (such as a cat) cannot totally block its line-of-sight (LOS) communications. Ku-band signals can even get through the human body with certain path loss.

Multi-Beam Antennas

As per this disclosure, multi-beam antennas simply refer to an antenna that is able to separate the signals between different beams and can achieve concurrent sending or receiving in all beams. But, a multi-beam antenna may not allow some beams to send while some to receive in the same time. A multi-beam antenna may also not have the capability of using the feedback from a receiver to form an antenna array weight matrix. Thus, it might not be able to control the whole antenna to achieve a multiple-input and multiple-output (MIMO)-like smart communications.

Multi-Beam MAC Protocols

Many Media Access Control (MAC) protocols under directional antennas assume that the antenna has only one direction at each time, and few are geared towards multi-beam antennas.

Contention-based MAC in 802.11 networks have been studied. However, in this context, hybrid MAC (HMAC) have been proposed to achieve concurrent packet reception (CPR) as well as concurrent packet transmission (CPT). However, these studies only assume an 802.11 distributed coordination function (DCF) is used. This may not be suitable to some contemporary MAC implementations (such as 802.11e) that emphasize the use of point coordination function (PCF). PCF plays a critical role in quality of service (QoS)-oriented applications since it can use a point coordinator (PC) to poll each node in order to control their sending rates. Thus, PCF can support the QoS performance via the resource allocation and transmission scheduling among the nodes.

QoS-based MAC conducted in Wi-Fi has also been studied. In this context, a set of polling model control protocols have been used in order to schedule the transmissions of multiple nodes to a Wi-Fi access point (AP). Only PCF mode can be improved compared to standard 802.11 protocols. The DCF mode has not been explored in multi-beam antennas. Moreover, only the AP is assumed to make use of multi-beam smart antennas (MBSAs) while other nodes just simply use omni-directional antennas.

Distributed, receiver-oriented MAC with multi-beam antennas, have been designed previously as well. Unlike general Carrier Sense Multiple Access (CSMA)-based random access schemes, the use of on-demand handshakes and signal scanning has been avoided. Instead, node IDs are simply used to determine the transmission schedule. The studies however need 2-hop topology information, and many practical MAC issues are not considered, e.g. synchronization issues, QoS issues, and the like.

QoS in WMNs

QoS in wireless mesh networks (WMNs) is a well-studied topic considering so many works on the support of prioritized transmissions in ad hoc networks. However, most of existing WMN QoS works are conducted in higher layers. One reason for the lack of investigation on QoS support in lower layers may be due to the dearth of adjustable parameters in the MAC layer. The disclosed methods propose multiple enhancements to 802.11-like MAC in order to support QoS, such as Time Division Multiple Access (TDMA)-like collision domain separation, rate control in each beam, and the like.

Intelligent Beam Prediction

Intelligent node state prediction for improving MAC performance remains uninvestigated. Mission-oriented airborne networks may need careful communication planning, and mobility-adaptive data transmissions can be proactively scheduled based on the prediction of node behaviors.

SUMMARY

Aspects of this disclosure are directed to a systematic Medium Access Control (MAC) in a heterogeneous airborne networks with multi-beam and single-beam antennas.

The disclosed methods and systems facilitates a throughput-optimal, heterogeneous (with both scheduled and random communications) medium access control (MAC) strategy for a typical airborne network with the following features: (1) hierarchical topology wherein the higher height level has a small amount of powerful aircrafts with multi-beam antennas and long-distance links (>50 km) and the lower level has high-density UAVs with <10 km link distance and single-beam (directional) antennas; (2) Ku-band (15 GHz) links wherein such a cm-Wave frequency has better directionality but higher fading loss than 2.4 GHz radio. The exemplified MAC scheme allows the UAVs to use uplink/downlink MAC schemes to communicate with the aircrafts. In some embodiments, it includes 3 parts: (1) a multi-beam, long-distance MAC for aircraft-to-aircraft links comprising a dynamic, scheduled MAC that fully explores multi-beam features to achieve high-throughput transmissions with beam locking/synchronization; (2) a downlink/uplink MAC for aircraft-UAV communications that in the uplink (UAVs to aircraft) portion includes an enhanced 802.11n with fame aggregation and compressive sensing based request polling and that in the downlink portion includes a prediction-based, differentiated transmissions for reliable multi-beam multicast communications; (3) MAC for UAV-UAV links that, among the high-density UAVs, extend 802.11e DCF through parameter adjustment for 10 kmlink access. Simulation results of the exemplified MAC scheme shows a significant performance improvement over conventional MAC protocols.

Aspects of this disclosure are directed to efficient MAC design in the Ku-band for multi-beam WMNs.

The disclosed methods address drawbacks of existing multi-beam MAC protocols and exploit advantages of MBSAs by enhancing both PCF and DCF modes. The disclosed methods further use two-level MAC architecture to limit collision domains. Many random collisions are because multiple nodes are allowed to send (or receive) at the same time. The time synchronization issue among WMN is also considered in relation to achieving concurrent multi-beam communications.

In one exemplary aspect, the disclosure is directed to a hierarchical MAC protocol for directional Ku-band communications. This MAC protocol can be back compatible to 802.11, thus giving the ability to communicate with existing 802.11 wireless adapters. Moreover, 802.11 can be significantly improved through a two-level MAC architecture: in the lower layer, the CSMA-based scheme to multi-beam concurrent transmission/receiving can be improved; in the upper layer, overlay control can be added by using a node scheduling scheme with different time intervals. Such an upper layer can be used to achieve coordinated transmissions among nodes. A WMN time synchronization scheme is disclosed in both small-scale and large-scale mobile networks for node- and beam-level timing control in the upper layer. The lower level can run in nano-second granularity, and the higher level can run in milli-second granularity.

In another exemplary aspect, the disclosure is directed to QoS-oriented MAC adaptation. The parameters in both upper and lower MAC layers can be tuned in order to meet the QoS requirements of mission-oriented WMNs. In the upper layer a weighted scheduling scheme can be for overlay control. The weights can determine the number of time intervals to be allocated to different users. By giving a higher priority node a higher chance to access the channel, it can send out more data. In the lower MAC layer, the corresponding data sending rates can be determined in each beam based on multimedia data types (for example real-time video, audio, text, and the like). There may be different priorities of nodes in each direction (i.e., beam) of a sender. Their data transmissions can be based on their traffic types. Multi-beam concurrent data transmissions can also be used to schedule all beams' transmission in one time such that all beams can use the bandwidth.

In another exemplary aspect, the disclosure is directed to state-suppressed beam communication pattern prediction. Mission-oriented ad hoc networks can have predictable mobility. A Hidden Markov Chain model can be used to capture the node state transitions. Differentiation between the hidden, intrinsic node state (in terms of channel quality, traffic profile, and the like) and the observable, noisy node data can be achieved. With that, the changing trends of a node's mobility mode and traffic features can be deduced. Such a state-to-state transition matrix may be large due to the complex multi-channel condition changes. Therefore, the Markov Chain state space can be suppressed via a Hierarchical Dirichlet Process based Hidden Markov Model (HDP-HMM), to achieve low-complexity node state prediction. Such a beam communication pattern prediction can play a role in mission-oriented environment surveillance applications.

In one aspect of the disclosure, a method for control of a wireless mesh network is described. The method can include the steps of: implementing a multi-layered media access control protocol for coordinated transmission among a plurality of nodes of the wireless mesh network; adapting parameters in the layers of the media access control protocol to schedule a data transmission among the plurality of nodes of the wireless mesh network; and predicting state transitions between the plurality of nodes of the wireless mesh network using a mathematical model.

The wireless mesh network can operate in a Ku-band frequency range. The at least one of the plurality of nodes of wireless mesh network can be mobile. The wireless mesh network can include multi-beam smart antennas. The wireless mesh network can include switched or steered antennas. It can include all-beam synchronized transmission or receiving operation. The wireless mesh network can include priority aware communication. The multi-layered media access control protocol can be quality of service (QoS) oriented. The QoS can include at least no priority, node priority, traffic priority, and traffic urgency data classification. The wireless mesh network can include node-based or beam-based operation. The wireless mesh network can include relay node mode operation. The wireless mesh network can include node synchronization for concurrent beam communication. The multi-layered media access control protocol uses time difference synchronization further enhanced by using reference broadcast time synchronization. The wireless mesh network can be one of either a large or small scale wireless mesh network. The wireless mesh network has a tree topology. The multi-layered media access layer uses a distributed coordination function. The distributed coordination function can include beam synchronized backoff. The multi-layered media access control protocol can use a point coordination function. The multi-layered media access control protocol can include TDMA-like collision domain separation. The multi-layered media access control protocol can include TDMA rate control in each beam of the multi-beam smart antennas. The wireless mesh network can include neighborhood-synchronization in switched multi-beam smart antennas. The mathematical model can include a vector autoregressive moving average model (ARMA). The mathematical model can include a hidden Markov model. The model can include a Bayesian extension of conventional hidden Markov model. The mathematical model can include a Dirichlet hidden Markov model. The mathematical model can include a hierarchical Dirichlet process hidden Markov model. The mathematical model can include a state-suppressed hierarchical Dirichlet process hidden Markov model.

In another aspect of the disclosure, a system is described. The system can include a wireless mesh network including of a plurality of nodes. One or more of the plurality of nodes can include a processor, a memory and a communications interface. The processor can execute computer-readable instructions to: implement a multi-layered media access control protocol for coordinated transmission among the plurality of nodes of the wireless mesh network, adapt parameters in the layers of the media access control protocol to schedule a data transmission among the nodes of the wireless mesh network; and predict state transitions between the nodes of the wireless mesh network using a mathematical model.

The wireless mesh network can operate in a Ku-band frequency range. The at least one of the plurality of nodes of wireless mesh network can be mobile. The wireless mesh network can include multi-beam smart antennas. The wireless mesh network can include switched or steered antennas. It can include all-beam synchronized transmission or receiving operation. The wireless mesh network can include priority aware communication. The multi-layered media access control protocol can be quality of service (QoS) oriented. The QoS can include at least no priority, node priority, traffic priority, and traffic urgency data classification. The wireless mesh network can include node-based or beam-based operation. The wireless mesh network can include relay node mode operation. The wireless mesh network can include node synchronization for concurrent beam communication. The multi-layered media access control protocol uses time difference synchronization further enhanced by using reference broadcast time synchronization. The wireless mesh network can be one of either a large or small scale wireless mesh network. The wireless mesh network has a tree topology. The multi-layered media access layer uses a distributed coordination function. The distributed coordination function can include beam synchronized backoff. The multi-layered media access control protocol can use a point coordination function. The multi-layered media access control protocol can include TDMA-like collision domain separation. The multi-layered media access control protocol can include TDMA rate control in each beam of the multi-beam smart antennas. The wireless mesh network can include neighborhood-synchronization in switched multi-beam smart antennas. The mathematical model can include a vector autoregressive moving average model (ARMA). The mathematical model can include a hidden Markov model. The model can include a Bayesian extension of conventional hidden Markov model. The mathematical model can include a Dirichlet hidden Markov model. The mathematical model can include a hierarchical Dirichlet process hidden Markov model. The mathematical model can include a state-suppressed hierarchical Dirichlet process hidden Markov model.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIGS. 3A and 3B show how mesh clients may use two topologies to connect to the wireless backbone; FIG. 3A illustrates a small-scale WMNs and FIG. 3B illustrates a large-scale WMN.

FIG. 4 illustrates a node in the intersection of multiple routing paths relaying packets for different upstream nodes.

FIG. 5A shows a beam-based hidden terminal problem. FIG. 5B shows the same direction contention issue. FIG. 5C shows that the sender A can cause interference to C while C is sending data to B.

FIG. 8A illustrates a conventional backoff scheme while FIG. 8B illustrates a beam-synchronized backoff scheme.

FIG. 17A shows the multiple active nodes in each beam and FIG. 17B shows the multi-round, multi-priority data phase.

FIGS. 18A and 18B show (FIG. 18A) ARMA-based prediction (FIG. 18B) HMM-based prediction.

FIGS. 46A and 46B illustrate examples of window ACK (sending back only one combined ACK for the whole window of sent packets).

FIG. 47 illustrates an exemplary ACK non-synchronization challenge.

FIG. 48 illustrates an example of prioritized Raptor codes based multi-beam data collection.

FIGS. 69A and 69B illustrate the principle of a full-duplex multi-beam antenna.

FIGS. 75A through 75D illustrate the concept of flash-based MAC control messages.

FIG. 84 illustrates throughput for different rateless codes.

FIG. 85 illustrates the impact of using state prediction schemes (ARMA and HMM).

FIGS. 86A and 86B shows the effect of using HDP-HMM to reduce the complexity of HMM-based prediction.

DETAILED DESCRIPTION

Figure 1A:
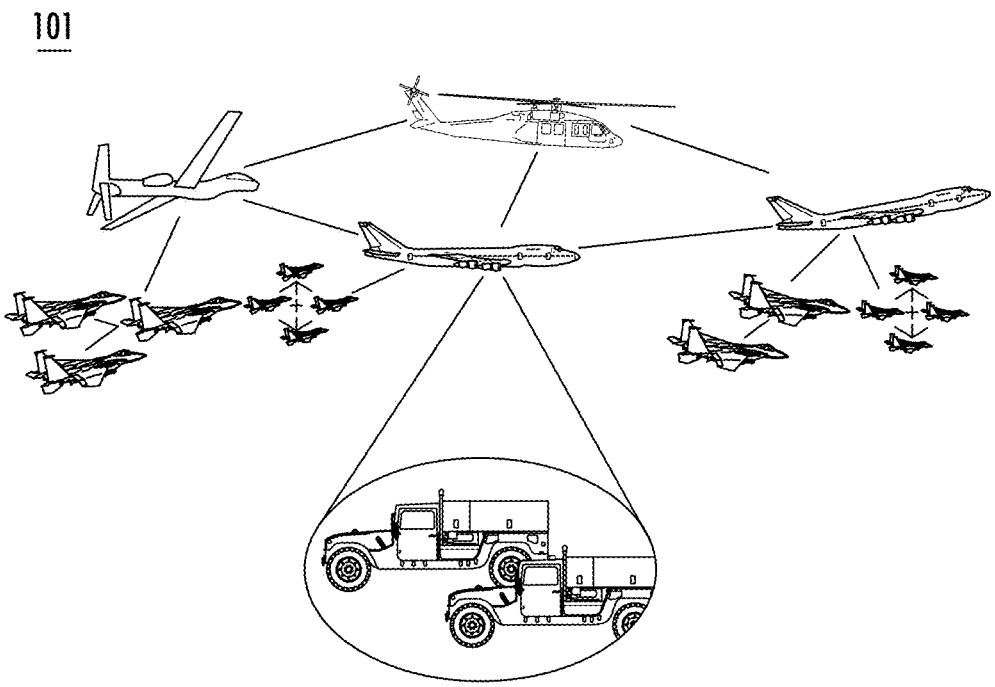
FIGS. 1A and 1B illustrate an example wireless airborne network that is multi-level, directional, mobile, and high-frequency (Ku-band).

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1B:
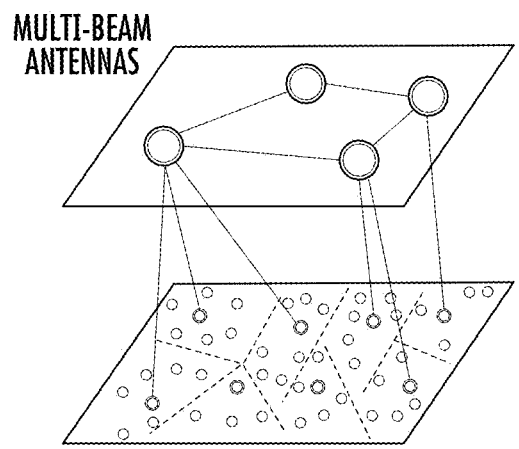

FIGS. 1A and 1B illustrate an example wireless airborne network that is multi-level, directional, mobile, and high-frequency (Ku-band). With the popularity of unmanned aerial vehicles (UAVs) and environment surveillance applications, airborne networks (ANs) have become important platforms for wireless transmissions in the sky. The exemplified methods and systems may be used in a hierarchical AN as shown in FIGS. 1A and 1B.

As shown in FIGS. 1A and 1B, the airborne network comprises a multi-level network that, in the lower level, includes a large amount of UAVs that form a high-density network with a link distance of 500 m to 10 km and that, in the higher level, includes a small number of aircrafts that use higher power levels to reach a communication distance of longer than 100 km.

In addition, the airborne network uses multi-beam antennas on the aircrafts. These antennas are configured to simultaneously communicate with multiple neighbors located in different directions (beams). The lower level UAVs are equipped with simpler antennas, which are either omnidirectional or single-beam directional antennas. An UAV may use omnidirectional antenna to carrier-sense possible signal sources, and then uses directional antenna to deliver the data.

In addition, the airborne network employs Aircraft-UAV Information flow in which some UAVs are selected as region-of-interest (RoI) nodes and in which each RoI node typically flies in a pre-defined interested area. Other UAVs then use multi-hop relays to send data to the RoI nodes, which then use uplink channel to send data to an available aircraft. An aircraft can use downlink channel to broadcast commands (such as assigning new surveillance tasks) to the UAVs. The aircrafts use high transmission power to relay data among them, and one of them, called gateway node, can directly communicate with a satellite or a ground station.

In addition, the airborne network forms wireless mesh network (WMN) architecture in which a WMN includes small number of powerful nodes (called mesh routers) and larger number of nodes (called mesh clients).

In addition, the airborne network employs Ku-band links that can be focused on specific direction with better signal quality (as compared to Wi-Fi). Coupled with the use of high-gain directional antennas, Ku-band signals can be used to reach targets greater than 100 km away with good signal directionality.

In addition, the airborne network has a highly mobile topology that can tolerate general flying speed (<600 mph) at distances of over 100 km away and provide good signal quality in such topology so long as the destination node is within the signal coverage of a specific beam of its antenna.

The exemplified medium access control (MAC) design may be used in the above airborne mesh network (AMN) to reduce avoidance of transmission collisions among neighbors (typically 1-hop) and to achieve a high throughput.

Because of the long links between airborne vehicles, transmission of signals can take a "long" time (e.g., greater than 0.1 ms) for a remote signals to reach the current node. Existing carrier sense multiple access (CSMA) based random access scheme (such as IEEE 802.11 standards) or scheduled access scheme (such as TDMA) cannot achieve high-throughput among high-density UAVs in their existing form. This may be due to the difficulty of managing time slots among so many UAVs. Existing protocols can also cause huge bandwidth waste when no data is sent for an allocated time slot. Or, existing protocols may cause frequent collisions when used in long-distance links (such as aircraft-to-aircraft links) due to the potential misdetection of signals sent from 100 km away.

In addition, the exemplified MAC supports provide an aircraft link that has a higher throughput than the UAV links (the aircraft uses multi-beam, high-gain antennas). In the uplink (UAVs-to-aircraft), the exemplified MAC aggregate the UAVs' packets into one larger packet, whereby the reduction reduces the communication rounds of DATA/ACK packets. And, in the downlink direction, the exemplified MAC supports multi-beam multicast operation to distribute instructions to groups of RoI UAVs, e.g., with instructions for new surveillance tasks. The exemplified methods and systems adjust the bit rates in each beam (direction) based on its corresponding beam quality.

Described herein is a systematic MAC design that is suitable to the above AMN architecture (FIGS. 1A and 1B) in which the exemplified MAC scheme is based on the above mentioned features of AMN and includes a heterogeneous architecture with both multi-beam and single-beam antennas.

Heterogeneous MAC Solution

Figure 1C:
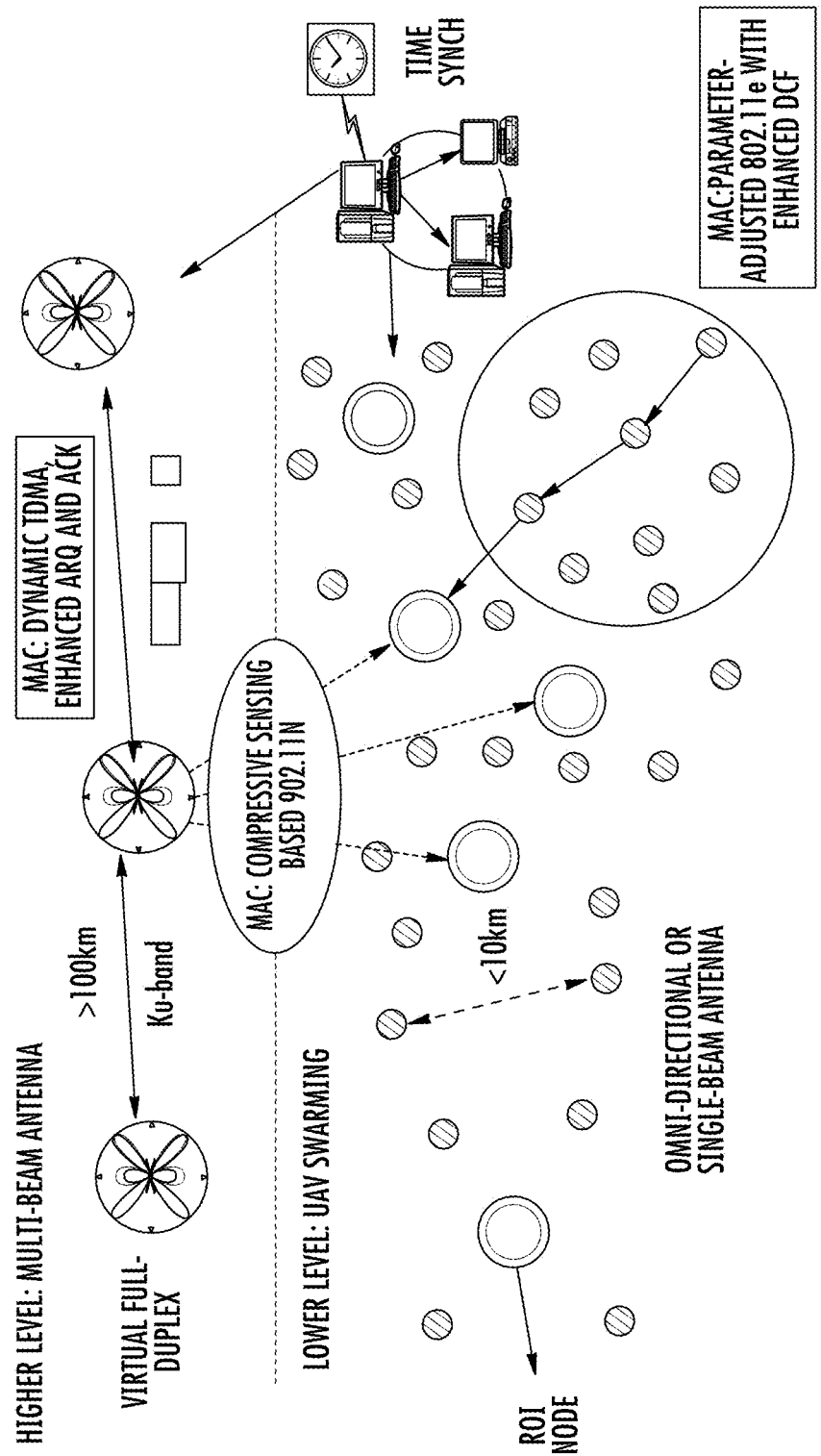
FIG. 1C illustrates a heterogeneous MAC that achieve high throughput in Aircraft-to-aircraft (A2A) links, aircraft-to-UAVs (A2U) links, and UAV-to-UAV (U2U) links, in accordance with one embodiment.

FIG. 1C illustrates a heterogeneous MAC that achieve high throughput in Aircraft-to-aircraft (A2A) links, aircraft-to-UAVs (A2U) links, and UAV-to-UAV (U2U) links, in accordance with one embodiment.

As shown in FIG. 1C, the A2U links include both uplink (from RoI nodes to a nearby aircraft) and downlink (from an aircraft to its covered RoI nodes) transmissions. It has a heterogeneous nature in that different medium access schemes are based on the topology features of aircraft network and UAV network. Particularly, scheduled TDMA-like, multi-beam MAC is used to achieve high-throughput, long-distance A2A transmissions, enhanced, CSMA-based MAC scheme is used for high-density, shorter distance (<10 km) U2U communications.

Aspects of this disclosure include A2A links, A2U links and U2U links: A2A links comprise multi-beam-oriented, token-and-schedule based medium access strategy for high-throughput A2A links. First, A2A communications comprising multiple beams to achieve concurrent neighborhood transmissions are disclosed. Second, both tokens and time slots are used to control the schedule of transmission (Tx) and receiving (Rx) phases in each A2A link. Here, the time slot duration can be over 10 ms, which is longer than conventional TDMA slot length (<1 ms). Thus aggregated traffic can be sent in one slot over the fast A2A link (>10 Mbps) for a long distance (>100 km). Variable slot durations are used in order to adapt to diverse traffic profiles. Third, Tx/Rx switching operations are reduced to overcome the long round trip delay (RTT) of long-distance A2A links with the goal of maximizing the link throughput and avoiding data collisions among aircrafts.

A2U links involve compressive sensing based CSMA extensions with multi-beam multicast considerations. In the uplink direction (from RoI nodes to the aircraft), to avoid time-consuming RoI node polling (i.e., asking each node whether or not it has data to send), compressive sensing based 802.11n extension is used for fast polling response collection. The 802.11n supports frame aggregation, which fits the uplink traffic aggregation requirements. In the downlink (aircraft to RoI nodes), the multi-beam multicasting issue is addressed and channel quality prediction is used for beam-specific rate adaptation.

U2U links involve directional CSMA extensions for high-density, middle-distance (500 m 10 km) UAV networks. Parameters such as ACK timeout in 802.11e are adjusted for UAV communications. Antenna-caused deafness and capture issues under single-beam directional antennas are also addressed. Other issues in the above heterogeneous MAC design, such as beam locking problem, which refers to the fact that an aircraft cannot switch to Tx mode if one of its beams is still receiving data (in Rx mode) are also addressed.

Ku-Band for Mobile Networking

In recent years some mobile networks transmit data in Ku-band (approximately 10-15 GHz) that was originally reserved for satellite communications. An example Ku-band application may be a high-speed environmental surveillance through the wireless interconnections of aircrafts, called an airborne network. Such a network may have a wireless mesh network (WMN) topology (see, for example, FIGS. 1A and 1B). The relatively less mobile nodes serve as mesh routers (MRs), which form the high-speed wireless backbone. Other nodes are called mesh clients (MCs). The MCs near a MR can either use 1-hop (if not many MCs) or form a multi-hop tree topology (if there are many MCs), The MR can be the corresponding tree root in the latter case. One of the MRs may serve as a gateway if, for example, the Internet is to be connected. In a typical airborne network, each WMN node has a certain mission area. The nodes can change mission areas depending on the mission requirements. The data to be transmitted in the WMN may be any data including, for example, multimedia format, such as video or images in different terrains.

As disclosed herein, the AN forms a WMN with mesh routers (aircrafts), and mesh clients (UAVs). A RoI node is a special UAV that flies in the center of a particular region called RoI. The coverage of any region is pre-defined based on surveillance requirements. There could be many RoI nodes. Other UAVs use multi-hop communications to reach a nearby RoI node. Because the aircrafts have much higher power than UAVs, they can easily reach hundreds of miles away in each beam (direction) of its multi-beam antennas. One of the aircrafts may directly communication with a satellite or a ground station. An aircraft collects data from the lower-level RoI nodes within its radio range.

Due to their good line-of-sight (LoS) signal propagation in the sky with GPS satellites, the airborne nodes can easily use GPS receivers to achieve global time synchronization among them. If GPS is not available, many synchronization schemes could be used such as, for example, a WMN-oriented clock synchronization scheme. Note that an accurate synchronization scheme is not required here since the disclosed time slot model uses coarse time resolution and has long duration (>10 ms).

Multi-Beam Antennas

A multi-beam antenna has the following features: (1) it can easily detect the incoming signals in any beam by using Direction of Arrival (DoA) estimation. (2) If it is desired to switch from transmission (Tx) to receiving (Rx) mode, or from Rx to Tx mode, all beams must be switched together to the same mode. This is mainly because the all antenna hardware elements are under the same antenna coefficient matrix's control. If one beam is in Rx while another beam is in Tx, the side lobe of the Rx beam will seriously interfere with the main lobe signals of the Tx beam. Once the multi-beam antenna switches to Tx mode, it is important for all neighbors that are supposed to receive data from this node, to synchronize their communications. That is, all those neighbors should switch to Rx mode simultaneously, in order to efficiently utilize the bandwidth. If a neighbor enters Rx late, it may miss some data from the sender. Likewise, if the multi-beam antenna is in Rx mode, all neighbors that have data for this node, should prepare their sending data concurrently. If a node is in relay mode, it can only operate alternatively, that is, in one time, all beams are in Rx mode, in order to receive data from the upstream nodes; and then in the next time, all beams should be in Tx mode to send data to the downstream nodes.

Although the availability of large amount of Ku-band transponders provides many interesting applications, Ku-band is unlike the popularly used unlicensed frequency, i.e., approximately 2.45 GHz. Although its higher frequency enables faster data rate, its smaller wavelength (approximately 6 times shorter) may make it more difficult to propagate through objects such as buildings, aircrafts, trees, and even humans. It may also have higher fading loss than 2.4 GHz waves when no clear line-of-sight (LOS) is present. However, the Ku-band can provide better anti-interference capability from neighboring nodes, and thus a good spatial spectrum reuse. This may be due to the following: (1) its high frequency can cause oxygen absorption (oxygen absorption loss is approximately 15 dB/km). Such a loss makes the signal interference from other nodes attenuate quickly. Therefore, the same channel can possibly be reused in other places (called spatial reuse); (2) it is feasible to achieve a good radio directionality if the narrow beams are used in both the transmitter and receiver through directional antennas. For the same antenna size, the radio directivity scales as $1/\lambda^2$. Therefore, by using well-focused beams, a Ku-band link can act as a "semi-wire." This "semi-wire" nature of Ku-band communication makes the direction-aware node-to-node coordination as important as interference avoidance since a misaligned beam-to-beam transmission may cause many packet drops.

Figure 2A:
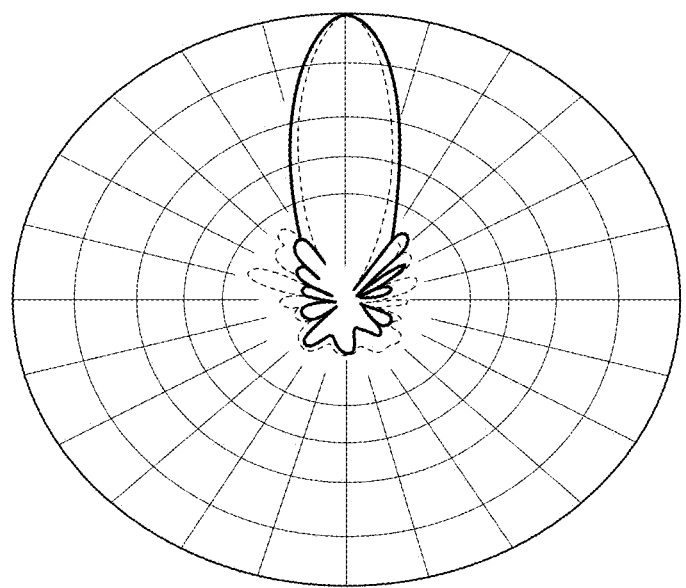
FIG. 2A shows exemplary lobes of a single-beam antenna.
Figure 2B:
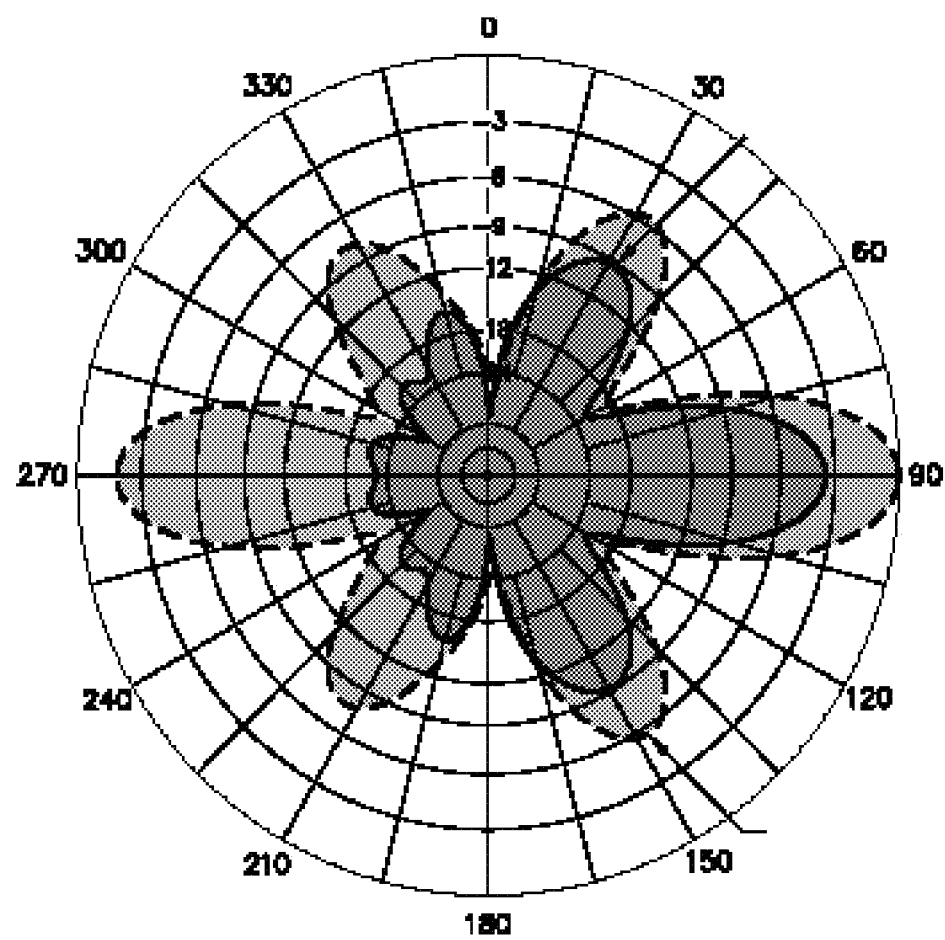
FIG. 2B shows exemplary lobes of a multi-beam antenna.

High-gain radiation materials and steerable beam-forming circuits are a feature of current antenna technology. The Ku-band's high frequency can significantly reduce the antenna size. Its directionality makes it feasible to integrate one beam or multiple beams in the same antenna, with each beam achieving well focused energy propagation in a narrow angle (see, for example FIG. 2A (lobes of a single beam antenna) and FIG. 2B (lobes of a multi-beam antenna)). In surveillance airborne networks, multi-beam smart antennas (MBSA) can be equipped in each aircraft to achieve multi-direction, simultaneous packet transmissions. Unlike multiple-input and multiple-output (MIMO) antennas that need the timely feedback from the receiver and complex weight matrix calculation to align the antenna arrays, MBSA can be a low-cost, single antenna. However, a wireless device can be used to dispatch/receive packets to/from different beams at the same time without the need of receiver feedback.

Mission-Oriented Mobile Networks

Environment surveillance applications necessitate mission-oriented mobile networking protocols, which can imply that nodes follow certain mobility patterns. For example, different aircrafts can have certain region-of-interests (RoIs), see FIGS. 1A and 1B. They may only move among those RoIs, and fly in certain height levels to avoid collisions. Even though a node (e.g., an aircraft) can fly around, as long as it is still within the beam's coverage of another node, the two can still communicate with each other.

Mission-oriented networks generally have two features. (1) Priority-aware communications: If any node captures RoI data (such as an intrusion event), its traffic can be marked with a higher priority than general scene data. Such priority-aware transmissions may require that the MAC layer be able to use QoS-aware schemes to handle different traffic types. (2) Predictable mobility trajectory: With clear mission assignments, different nodes can have predictable mobility behaviors. This may imply that any node can establish a state transition model based on its historical communication patterns, in order to predict which node it may communicate to in the next phase, and which beam it should use to send data to that node. Such a prediction-based communications can largely avoid unnecessary data queuing and beam turning-on if it predicts that there will be no desired destination node available in the next phase.

Existing MBSA-based MAC protocols do not support mission-oriented communications. They may support QoS in higher layers. But no QoS support schemes are proposed in MAC layer. The MAC layer handles the communications in each hop. If the QoS requirements cannot be met in MAC layer, the packet transmission errors or delays may accumulate in each hop, which makes higher layer protocols difficult to meet QoS performance goals.

System Model

WMN Architecture

Aspects of this disclosure are directed to a WMN architecture (FIGS. 1A and 1B show a simple case). This can comprise a wireless backbone consisting of mesh routers (MRs), and mesh clients (MCs). Each MC belongs to the management domain of a MR. One of the MRs may also serve as the gateway to run TCP/IP for Internet connection. This may be useful for Internet-based, remote data collection.

The MR can have higher local data processing capacity for large amount of traffic processing. It can also have wireless links to easily connect to other MRs. Those MRs typically form a mesh connections. That is, any MR can use 1-hop links to reach any of the remaining MRs. In practical airborne networks, relatively less mobile aircrafts (such as helicopters) can be chosen to serve as MRs, in order to ensure the full mesh connections among them. If 1-hop link is not available among MRs, multi-hop routing schemes could be used instead. Note that some airborne networks can use satellites or even static ground stations to serve as MRs. In those cases, a stronger transmission power or different spectrum bands may be needed in order to reach longer distances.

Note that an airborne network can maintain good connections among MRs and MCs even though each node flies around. This is because each node uses strong power to be able to reach long distance (>50 km) in Ku-band links. As long as a node is still within the communication range (from distance and antenna beam angle perspective), mobility is not an issue.

The MCs may use two topologies to connect to the wireless backbone: (1) in small-scale WMNs (FIG. 3A), there are not many nodes around the backbone. Each MC can simply use 1-hop communications to link to a MR. (2) in a large-scale WMN (FIG. 3B), the large amount of MCs typically self-organize themselves into a tree topology and use multi-hop communications to reach the tree root—a MR. Such a tree topology helps not only a proposed time synchronization scheme (described herein), but also makes some ad hoc routing schemes (such as AODV—ad hoc on-demand vector) easy to implement.

Antenna Model

A typical multi-beam smart antenna (MBSA) can radiate directional signals in each narrow beam. MBSA may have the following features: (1) Lower complexity than MIMO antennas: Unlike MIMO antenna that requires timely feedback from the receiver side in order to adaptively adjust the sender's antenna array weight matrix, a MBSA may have low manufacturing costs and simple beam control (i.e. no receiver's feedback may be needed); (2) Arrival beam signal detection: Any beam can easily detect the incoming analog signals (although it does not know whether this signal holds a packet with a MAC address targeted to itself or not). Today any beamforming antenna can easily apply a weight vector to a received signal vector which consists of a set of signals received in different omnidirectional elements of the antenna array. Such a scheme can be used in Direction of Arrival (DoA) estimation. Thus a MBSA can detect the incoming signal and its direction in each beam; (3) Switched or steered antennas: Switched antennas can set up the weight vectors in order to activate one or multiple beams. Steered antennas (or called adaptive antennas, or phased antennas) can use a variety of signal processing algorithms to adapt the weight vectors in order to achieve the best signal quality in each beam. Although steered antennas can achieve better performance in multi-path environments, their complexity and cost limit their applications. Its continuous tracking of beam signals can result in higher power consumption; (4) All-beam synchronized transmission/receiving: Although a switched MBSA has separate beams, those beams are all considered in the calculation of a weight vector to form certain beam pattern (this controls the on/off and power level in each beam direction). It may not be possible to calculate the individual weight for only one beam each time since all antenna hardware elements would need to be synchronized into the same weight vector's control. Therefore, it may not be possible to allow one beam to send data while ask another beam to receive data at the same time. In other words, all beams should be either transmit or receive data concurrently. This can be called the principle of concurrent beam communications (CBC). The CBC can also mean the following communication requirements (R1-R3): (R1) Neighborhood synchronization: In switched MBSAs, it may be necessary to ensure that all neighboring nodes to synchronize their transmissions together if they have data for the same receiver. This way can make the receiver turn on all related beams simultaneously for receiving. Likewise, if a node is sending data, it may be important for related neighbors to be ready for receiving at the same time. (R2) Relay node mode: If a node is in the intersection of multiple routing paths, it may need to relay packets for different upstream nodes (FIG. 4). It may be important to carefully schedule the data transmission within two hops. For example, since the relay node can send or receive at any time, either the upstream or downstream nodes can be active at one time, but not both. (R3) Node-based or Beam-based operations: Since a node can send out packets in different beams, it may be important to decide whether the entire node or just individual beam participate in an operation. For example, 802.11 uses backoff window during carrier sense. Since all beams can be involved into the synchronized transmission, it may be necessary to use node-based backoff window setup instead of maintaining individual backoff window for each beam. However, it may be necessary to set up different queues in each beam for packet scheduling purpose since the traffic patterns in each direction may be different A Two-Level MAC for Ku-BAND, Multi-Beam WM One of the goals of the MAC layer can be to ensure collision-free communications in a neighborhood. Here the neighborhood can be defined as a group of nodes that can use one-hop to reach each other. But some MAC schemes consider nodes that use 2-hop communications as part of the neighborhood. The communications across more than 2-hops belong to routing layer issues and thus are not considered members of a neighborhood.

The transmission collisions in MBSAs come from the following: when a beam is sending data to another node, it hears the signals from other nodes. The 802.11 standard can solve this issue through carrier sense multiple access (CSMA) scheme, which comprises the following operations: (1) a node first listens to the channel when it plans to send out data. Even if the channel is idle, for safety, it still waits for a short duration—the Distributed Coordination Function (DCF) Interframe Space (DIFS); (2) if the channel is still idle, it waits for a random backoff time, which is between [0, CW]. Here, CW is the contention window. (3) If the backoff timer expires, it begins to send out data; (4) if the collision is detected after sending data, it doubles CW and waits again. (5) When the data packet size goes beyond certain threshold, a 4-way handshake (4WH) can be used, which can be the RTS-CTS-Data-ACK. Note that the RTS tells network allocation vector (NAV) to other neighbors in order to reserve the channel for NAV long.

However, the 802.11 standard may not be used for MBSA-based Ku-band communication due to its following drawbacks: (1) it was designed for omni-directional antennas, not directional antennas, or multi-beam antennas. Therefore, a beam-specific data forwarding table may have to be maintained. For example the RTS/CTS messages might need to be tied with a specific beam direction; (2) 802.11 assumes each node sends out one radio signal each time, and such a signal is radiated towards all directions. But only one neighbor is supposed to receive such a signal, and other neighbors see it as an interference signal. Thus 802.11 cannot explore the benefits of multi-beam concurrent transmissions. If the transmissions or receptions of neighboring nodes are synchronized, the concurrent transmission can greatly improve the throughput. (3) It assumes that the interference is the reason for packet collisions. However, in Ku-band, this may not be the case, as node coordination plays a role in MAC layer in order to avoid the packet loss.

Other MAC schemes still have the following main drawbacks when used in Ku-band directional WMN: (1) Handling Ku-band (coordination loss): Node coordination between nodes is as important as interference avoidance. The Ku-band has much better "radio concentration" capability than 2.4 GHz channel due to its fast fading and big oxygen absorption. With narrow-beam antennas, the signal propagation in a specific beam can look like a "semi-wire." The interference from neighboring nodes or other beams does not have serious impacts on the current beam signals. Therefore, all neighbors' transmissions should be coordinated such that all of them can send data to the same destination. It is certainly a great enhancement if a node can predict the transmission state of each neighbor such that it can prepare the data transmission in each beam; (2) Providing a mission-oriented QoS support: It is desirable that mission-oriented network have prioritized flow transmissions. A node can operate in Point Coordination Function (PCF) or DCF mode in 802.11 protocols. Adjusting the parameters in MAC layer to achieve multi-priority transmissions can be a challenge. (3) WMN-specific node synchronization for concurrent beam communications: WMN desires a special time synchronization scheme due to its unique mesh/tree topology. When the network has a large scale (see FIG. 3B), the clock drifts may be very different in each tree level. If the wireless backbone does not have a global time, all nodes in a WMN may not have a consistent clock even if the link delay is different in each tree level?

In aspects of this disclosure, a two-layer MAC scheme is disclosed to at least partially overcome the above issues.

First, in the higher layer, coarse time slot management can be used to divide the time into different intervals. Each interval can only allow one node to be the receiver or the sender (it depends on whether the MAC is running in PCF or DCF modes). The reason for separating the collision domains (by only allowing one 'star' node that is receiving data from all beams), can be that existing CSMA-based MAC tries to give each node an equal chance to access the medium, which can significantly under-utilize the nominal network throughput, in particular when there are different sending rates among the neighbors. Another shortcoming of existing 802.11 protocols is that they do not give the nodes that need to help relay other nodes' traffic more opportunity to access the resource, and hence generate a suboptimal resource allocation. The TDMA-like MAC can also help to handle prioritized flows by controlling slot allocation.

Second, in each time interval (of the higher layer), 802.11-compatible CSMA in the lower MAC layer can be run. The general 802.11 Superframe architecture can be enhanced by using a MBSA-oriented multi-beam transmission management.

Third, a set of QoS support schemes is disclosed in both higher and lower MAC layers. In the higher layer the higher priority nodes have higher probability to occupy a longer time of the medium. It may grab multiple time slots to send out its high priority traffic. In the lower layer different nodes can be allowed to have prioritized transmissions to the same receiver. The sending rates may also be controlled based on its traffic type.

Finally, a hierarchical, tree-topology-adaptive clock synchronization scheme is disclosed. It can fit the WMN mesh/tree topology and can scale to large network. It considers the tree level-to-level delay accumulation and clock drifts, as well as round trip delay in each link. It can ensure the concurrent node transmissions in multiple beams.

Higher Level MAC—a Time Interval Architecture

Figure 5A:
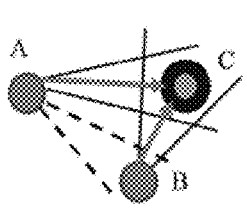
FIGS. 5A-5C show different contention cases for aspects of the disclosed implementation in MBSA-based WMN.
Figure 5B:
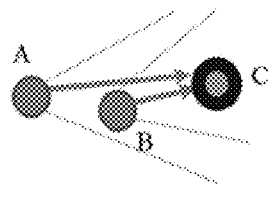
Figure 5C:
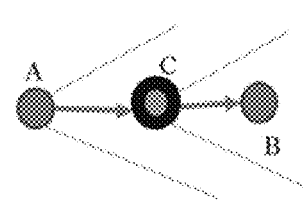

In MBSA-based WMN, there may be multiple types of transmission contentions. FIGS. 5A-5C illustrate a few scenarios. FIG. 5A shows a beam-based hidden terminal problem. B is hidden to A. FIG. 5B shows the same direction contention issue. Both A and B are located in the same beam direction of C, and can cause collisions when they compete for medium access. FIG. 5C shows that the sender A can cause interference to C while C is sending date to B.

If conventional 802.11 MAC protocols are used in all the above three cases, the measured throughput may be significantly lower than the nominal one (approximately 54 Mbps for 802.11g). Those multi-beam traffic collisions may cause throughput lower than approximately 1 Mbps from time to time in relay nodes, which may need to first receive the data from the upstream nodes, then send out data to downstream nodes in next phase. The throughput may be especially low when the nodes have heterogeneous sending rates and varied QoS demands. Since conventional MAC tries to give equal chance to each neighboring node, this makes the node with heavy traffic (such as the relay nodes) not able to get enough sending opportunities, which further worsens the network throughput due to delayed data relay.

One way to overcome this issue is by separating different collision domains. For example, each time one node is allowed to be the receiving mode (other nodes can be carefully scheduled to send data to it). If accurate clock synchronization scheme is obtained in a WMN, concurrent data transmission can be achieved in all the beams of a specific node.

For omni-directional antennas, if the node interference is removed (a reason for packet loss in general Wi-Fi) by using a time slot based transmission (that is, each time only one pair of nodes is allowed to perform communications), the 802.11 throughput can be enhanced. For multi-beam antenna case, there exists complex beam synchronization issues. It will significantly reduce the collision events if one sender or one receiver is allowed in a neighborhood. Then other neighbors' data queues can be managed to ensure that all nodes with the data for the same receiver, can concurrently send out their data. Since a node that can be the receiver this time will be the sender in the next time anyway, it may be fair to give each node the same chance to be a receiver. However, if a node has higher priority (such as an aircraft that has the data of regions of interest (RoIs)), this node can be assigned a higher probability of being a receiver in a time slot. QoS issues are also addressed herein.

Note that the above time slot concept may be different from general TDMA concept. First, a coarse time granularity may be used to define the time length in each slot. It does not need to be exactly the same length since it is used to separate the collision domains (each time only can allow one node to receive). Second, a periodical time slot assignment architecture is not used. For example, if a node is selected to be the receiver in a slot, it may not be the receiver again after a fixed number of slots. A probability function can be used to calculate who should be the receiver slot by slot.

The length of each slot, T, can be a number that meets the following requirements: (1) T should be much larger than the clock synchronization error, which can be measured by the maximum clock deviation between different tree levels in a WMN (discussed herein); (2) it should be larger than at least one packet. In practice, T may be selected as the time of finishing certain number of packets. For example, it takes about 2 ms to send out one 1500-byte packet, after considering MAC and PHY overhead. If T is selected as the transmission of around 10 of those packets, T could be 20 ms. Also note that during such a T, the lower layer MAC is run (described herein). Such a Superframe architecture consists of both PCF and DCF phases.

One issue is to design a time slot assignment scheme that is entirely distributed, that is, no central coordinator is involved. And all nodes can automatically determine which node be the 'star' node (a receiver, or a sender) in the current time interval, without the need of exchanging control messages with the neighbors. This may be desirable in an ad hoc network without a central server.

An aspect in any network is that any node can be assigned a unique ID. A MAC address or IP address is not used as the ID since they could be a large number. Instead, an integer belonging to $(1, 2, \ldots, N)$, can be assigned to each node. For each time interval, each node can calculate a pseudo-random hash function for each node ID:

$$\text{Position}(i) = \text{Hash}(\text{ID}(i), \text{timestamp}), i=1,2,\ldots,N$$

Here, the hash function has a value belonging to (0, 1]. The timestamp is the current clock in the whole network. A node with ID=J wins the current time slot if and only if it gets the maximum hash value:

$$\underset{1 \leq i \leq N}{\arg\text{MAX}} \text{Hash}(ID(i), \text{timestamp}) = J$$

Note that each node can easily find out who should win the time slot since all nodes' IDs are known. Each node scans through each ID's hash function result, and gets to know the maximum case.

The above hash calculation has a random nature. Thus each node has equal chance to win the time slot at any time. However, in some QoS-oriented applications some nodes may be preferred to have a higher chance to win the slot.

When a new node joins the network in a particular slot, or a node leaves the current slot, it may be that a node who claims to be the winner, actually has a smaller hash result than another node. If this is the case, multiple winners may be in a slot. However, since two-level MAC architecture is used, the lower layer MAC still has CSMA-based, 802.11-compatible nature. Therefore, the lower layer MAC can take care of multi-winner case. The above event may not happen frequently since the WMN has a stable membership most of the time.

Lower Level MAC

The latest 802.11 standards (such as 802.11e) recommend the use of PCF for scheduling control of each neighbor's transmissions. Such a centralized control can poll each node to ask for desired data rates for each neighbor. In this disclosure, PCF phase is also maintained in the Superframe for a few reasons: first, the existence of PCF can be compatible with the latest 802.11 MAC standards; Second, in the disclosed upper MAC layer, a node the 'star' node is selected, which can be the only receiver or sender in that time slot. Naturally the star node can serve as point coordinator (PC) in the PCF mode; third, since each direction of the star node can have different priorities of flows, PCF can help to poll each node in different beams to achieve QoS-oriented data transmissions from each node to the star node.

However, conventional PCF can be improved for the following reasons: (1) to fully use the capability of multi-beam concurrent transmissions in MBSA. Conventional PCF only allows one node to be polled each time. It does not allow more than one node to send data to the same receiver. This is not the case in MBSA since all nodes can send data to the star node (who wins the time slot), as long as those nodes belong to different beams. (2) Since each beam can have multiple nodes, there may still exist contentions among them. Moreover, those nodes may have different priorities. Conventional PCF does not provide solutions to this issue. (3) Conventional PCF does not have concrete solution to the issue of rate control for multimedia traffic, such as VBR (variable bit rate), CBR (constant bit rate), and the like. The disclosed scheme overcomes the above issues.

If a node wins a time slot, it can have the entire Superframe time to perform both PCF and DCF modes. While PCF can be a contention-free channel access, DCF is still based on a traditional CSMA-based backoff scheme. An enhanced DCF scheme is disclosed to exploit MBSAs. For example, beam-RTS and beam-CTS is defined for concurrent multi-beam transmissions. The DCF phase is maintained due to the following considerations: (1) It can be possible that some nodes still run conventional 802.11-compatible protocols without understanding the PCF protocols; (2) the PCF suffers the single-point failure issue.

Suppose the upper MAC layer chooses a winner node, which serves as the role of point coordinator (PC). However, the PC may not have any data transmission/receiving tasks, or it may stop working due to the network's high mobility (i.e., leaves the current MAC neighborhood coverage) or power failure. (3) Some applications may not require QoS support and simply assume that each node has the equal chance to access the channel. PCF has certain control overhead due to polling messages. DCF may be a better choice.

Figure 6:
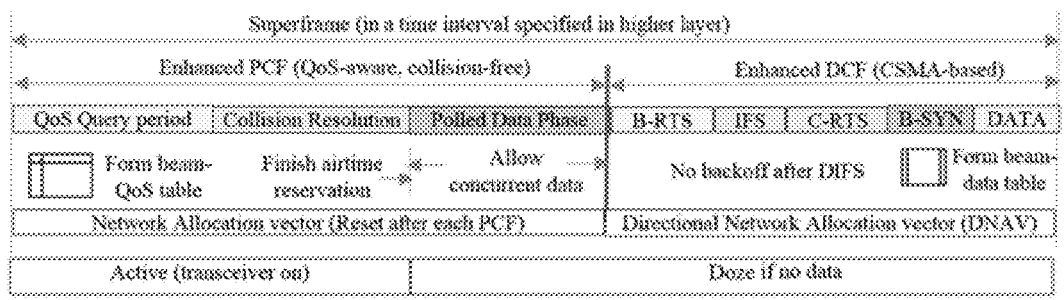
FIG. 6 is a graphical representation of enhanced PCF and DCF in each superframe.

FIG. 6 shows the Superframe architecture. The lower level MAC supports both QoS-oriented PCF and DCF. Both considers the features of multi-beam communications.

PCF Phase

Figure 7:
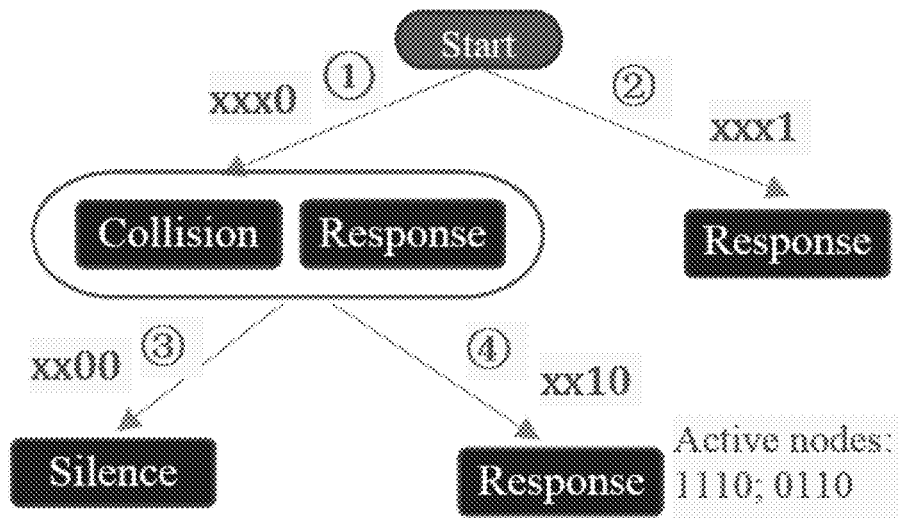
FIG. 7 shows a tree-splitting approach to address node collisions in each beam during PCF.

The PCF includes three small phases: (note that the "polled Data Phase" may have the longest time duration since it may be the major communication in the network; the first two phases can be very short since they deal with some control messages): (1) In QoS Query phase, the star node (the only receiver in the superframe) sends the QoS-related query message in all the beams. The star node can obtain the priority information from each node in each beam. Basically, the star node sends the QoS query message to ask about the priority level (0 can be for best effort traffic with the lowest priority, other levels can be 1, 2, 3, . . . N), and how much airtime is needed for each flow. The nodes feedback QoS Response message to the star node. If a beam feeds back just one QoS Response message, then such a node tells the star node about its QoS level. If no response message is received in that beam, it means no node in that beam wants to communicate with the star node. However, if the star node detects a collision signal in a specific beam (similar to the data collision signals in CSMA-based MAC protocol), Collision Resolution phase can be run to resolve the node collisions in that beam. (2) Collision Resolution Phase: If a beam detects collisions during nodes' QoS response phase, the star node may need to run a collision resolution algorithm to detect which active nodes cause the collision events. Such an algorithm should have low control overhead (avoiding many control messages between nodes), try to run in a parallel way, and can address collisions within a bounded period. To meet such criteria, the node ID-based tree-splitting algorithm can be used. FIG. 7 shows its basic principle. It can first assign a binary tree IDs to each node. For example, all nodes in the left branch of level 1 tree can have IDs ending with 0, and right branch ending with 1. Then it can use a stack to achieve the preorder traversal for the dimension splitting tree. The star node can then recursively search the tree to address the collision nodes. The algorithm has low overhead since the simple tree traversal can rule out random backoff used in conventional collision resolutions. Its binary tree search architecture can make parallelized operations possible. (3) Polled Data Phase: After the above two phases, the star node collects all QoS related information from each neighbor, such as who has what priority of traffic and needs how long of airtime. In other words, all neighbors can actually finish resource reservations here. Then those active nodes can enter a polled data phase, and can start to send data to the star node with certain data rates. The rates can be calculated based on the priority level and the nature of the traffic, such as VBR (variable bit rate) video, CBR (constant bit rate) audio, ABR (available bit rate), best effort traffic, and the like. In the beginning of the polled data phase, the star node can broadcast a Polling Notification frame to all beams to indicate what nodes should take part in the polling activities. All nodes without being polled can enter Doze status to save energy.

Note that by the end of collision resolution phase, a Beam-QoS table can be formed. An example of such a table is shown in Table 1, below. It helps the star node to schedule different priorities of traffic with the corresponding queue allocations in each beam. For instance, a VBR flow may need a fast queue serving discipline with long enough space to hold real-time video packets. The attribute "claimed next round airtime" can be fed back by each node in the QoS Response message. It helps the star node to prepare the polling commands for the next round of PCF operations, as well as pre-allocation of queues in each beam. The "predicted mobility" can be determined by the disclosed node state prediction algorithm. Since the airborne network has high mobility, it is important to predict the node's moving patterns such that the star node can form the updated network topology.

TABLE 1

Beam-QoS table (assuming the star node is the only receiver in the current slot)

| Beam ID | Active senders | Airtime Desired | Priority | Traffic | Claimed next airtime | Predicted mobility |
|---------|----------------|-----------------|----------|---------|----------------------|--------------------|
| 1 | A (ID: 0001) | 2.4 ms | #1 | VBR | 2 ms | Same beam |
| 2 | C (ID: 0101) | 3 ms | #7 | CBR | 1 ms | To beam 3 |
| ... | ... | ... | ... | ... | ... | ... |

DCF Phase

A second part of the Superframe can be the DCF phase where conventional CSMA-based channel access scheme shall be used. Note that the star node which wins the current time slot can be the only sender in the current DCF phase. The reason for assuming the star node as the sender (instead of the receiver in the above-discussed PCF phase), can be for the convenience of CSMA-based transmission management: a sender actively can send out a RTS message to ask for the confirmation of ready-for-receiving (which can be included in the CTS message). Thus a natural assumption may be to let the star node be the only sender which uses multiple beams to send data to all active nodes. Since a star node will become non-star node in the next time slot anyway, each node has the fair chance to participate in the DCF operations.

Figure 8A:
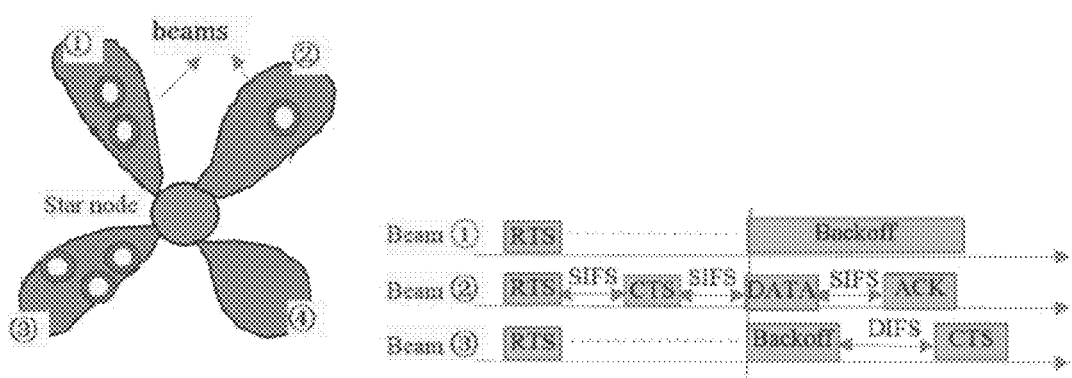
FIGS. 8A and 8B show all beams achieving synchronized RTS/CTS for an exemplary 4-beam case in a multi-beam transmission.
Figure 8B:
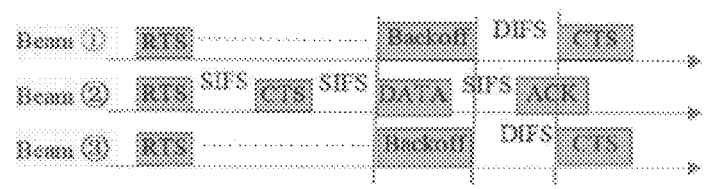

The first enhancement of conventional DCF is that the backoff timer be controlled for concurrent multi-beam transmissions. Unlike conventional 802.11 DCF operations which use random backoff after each DIFS, the disclosed methods use multi-beam antennas that ensure all nodes are ready to receive data simultaneously if the star node sends out different flows in multiple beams. Thus, all neighbors that receive the data from the star node first synchronize their clocks; second, the entire node (including all of its beams) perform CW-based backoff together, instead of performing backoff in each beam individually. This is because that the entire node cannot be guaranteed to be under accurate timing control if each beam waits for different times. Particularly, CW-based backoff is removed after DIFS for ARMA communications. However, the backoff timer is still maintained for 802.11 compatibility. Each node waits for the CW-based random backoff before (not after) DIFS duration. And all beams wait for the same time durations if not receiving CTS or having data collisions. FIGS. 8A and 8B show the 4-beam case. In both Beam 1 and 3, multiple nodes are located in the same beam. Their collisions cause the beam's backoff delay. By removing the backoff after DIFS, all beams achieve synchronized RTS/CTS.

Here a further clarification of the backoff model is provided. A node's beam can perform random backoff based on:

$$\text{Waiting\_Time} = \text{Random}(\text{seed}) \times \text{Delta\_Delay} \qquad (1)$$

The Random (seed) generates a pseudo-random number in the range of [0, CW] based on a uniform distribution. Here Delta_Delay is a constant time depending on the physical layer characteristics. CW is an integer with a range $[CW_{min}, CW_{max}]$. Again, here $CW_{min}$ and $CW_{max}$ can depend on the physical layer characteristics. Based on 802.11 DCF specifications, equation (1) can be calculated before the star node sends out RTS. In the multi-beam antenna case, if any of the beams does not feedback CTS, the CW can be doubled until it reaches the maximum value ($CW_{max}$). But the CW needs to be reset to the $CW_{min}$ if one of the following cases occurs: (1) at least one beam can successfully send out data; or (2) a packet gets dropped (i.e., no ACK is received) after its retransmission limit is reached.

An interesting fact is that any beam that did not receive a CTS has actually waited for one packet of time duration already, while other beams were able to successfully send out a packet. Therefore, a fixed backoff length can be already added before the beam performs carrier sensing again. This fact can ensure that all beams are able to concurrently send out data without time deviation between them.

The star node also maintains a table, called DCF Beam Table (see Table 2), and updates such a table after sending RTS in any beam. Similar to Table 1, the star node needs to know what nodes are active receivers in each beam. Note that DoA (Direction of Arrival) based neighbor discovery protocol can be used to find those receivers.

TABLE 2

DCF Beam Table

| Beam ID | Active receivers | Traffic type | Airtime | RTS Pass | Multiple RTS? | (predicted) Node mobility |
|---------|------------------|--------------|---------|----------|---------------|---------------------------|
| 1 | D | CBR | 2 ms | Y | N | Same beam |
| 2 | A | VBR | 2.3 ms | Y | Y | Out of scope |
| 2 | C | ABR | 1 ms | N | Y | Move to Beam 1 |
| ... | ... | ... | ... | ... | ... | ... |

For each receiver, the star node may know what data it should send to that particular node based on the cross-layer information (from the application layer). The RTS can hold the airtime it needs to reserve in that particular beam. If a beam has multiple receivers, the star node may need to issue multiple RTS, each time for one receiver. If the RTS responds (i.e., a CTS is received), the star node can send data after a SIFS. The attribute "predicted node mobility" again can be used for future queue management purpose in each beam.

Figure 9:
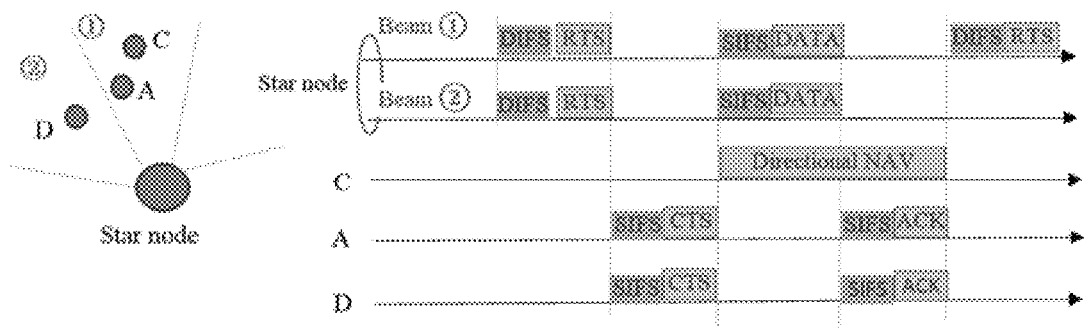
FIG. 9 shows an example of DCF operations in aspects of the disclosed implementation.

FIG. 9 provides an example of multi-beam DCF operations. Note that C and A can be in the same beam. The star node can only talk with one of them (based on the traffic priority in the Beam table; for example, VBR has higher priority than ABR). Here the star node uses (RTS-CTS-DATA-ACK) to communicate with A first. C needs to wait for DNAV based on the time specified in A's CTS. The upper MAC layer ensures that each time only one sender (i.e., the star node) is in the current DCF. Other nodes in different beams can only be the receivers. Therefore, there is no hidden terminal issue here. Since in the next time slot (Superframe), other nodes will have chance to be the sender, the star node can be a common receiver next time.

WMN Synchronization

Figure 10:
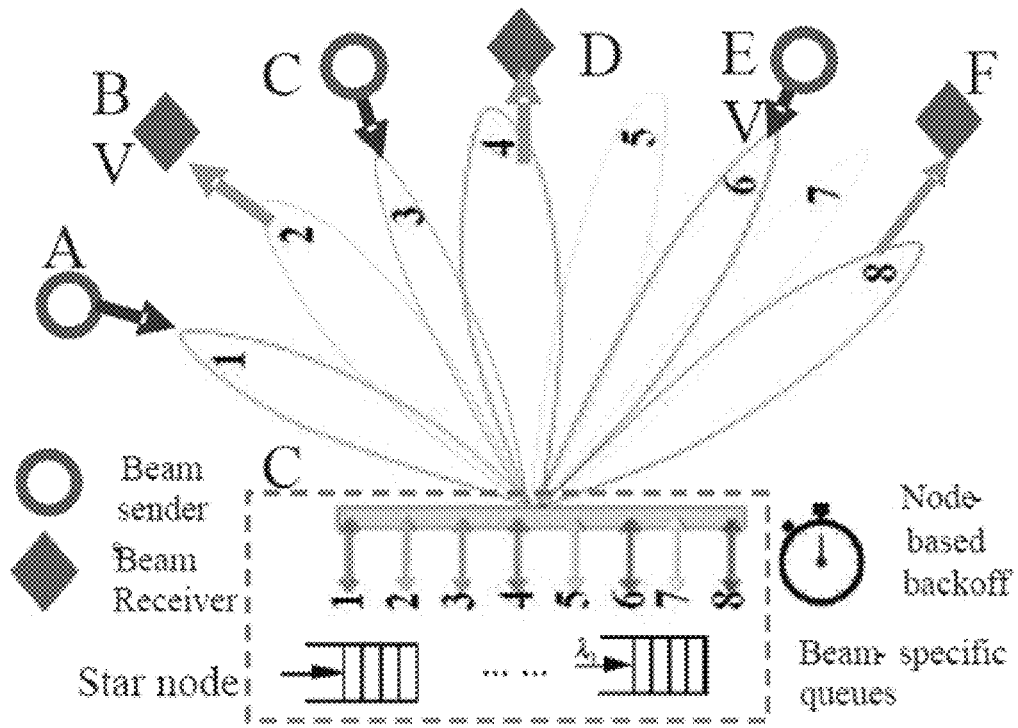
FIG. 10 shows beam synchronization and node synchronization in aspects of the disclosed implementation.

There are two types of communication synchronizations in the disclosed system: (1) beam synchronization: As shown in FIG. 10, although each beam needs to maintain separate queues due to the different traffic profiles and sending rates in different beams, the entire node ensures that all beams switch to sending or receiving status simultaneously. The backoff delay after DIFS can be removed. It makes sure that all beams operate at the same time. Since the entire node uses one timer to control all beams, it can be easy to change all beams' operations at the same time. (2) Node synchronization: Even though the star node can ensure that all beams are steered at the same time, if the destination nodes are not synchronized well, bandwidth can be wasted. For example, nodes A, C, E are supposed to send data to the star node simultaneously. However, if any of them misses the sending time or is late, the bandwidth in that beam may be wasted. Likewise, nodes B, D, F prepare their receiving queues well in the specified time when the star node is going to send data to them. Typically the RTS/CTS messages are used to negotiate about the sending/receiving time. However, if for some reason, the local clocks (controlled by the node's local crystal oscillators) in different nodes drifts, the nodes may not start their transmissions in the same time since they can have different interpretations for the timestamp specified in the RTS/CTS messages.

The reason for clock synchronization comes from the fact that local clock can drift from time to time. The clock drift rate, $r_d$, can be defined as the speed that a WMN node's clock deviates with respect to a reference clock. Such a drift rate depends on the physical characteristics of different crystal oscillators. It could be approximately 1-100 μs per second.

For WMN mesh/tree topologies, a set of low-complexity, high-accuracy clock synchronization methods that are suitable are needed. For example, special network topologies in WMNs, which consist of a high-speed wireless backbone and some tree-like mesh clients may require such methods.

As shown in FIGS. 3A and 3B, the synchronization methods should at least consider two types of WMN topologies: a small-scale WMN with only 1-hop links between MCs and MRs; and a large-scale WMN with multiple MC trees. Separate methods for each of the topologies is desired since 1-hop links have less clock deviation than multi-hop tree topology. In addition, the scheme should adapt to node mobility well since the airborne network applications is targeted. Note that the wireless backbone may not connect to the Internet. Thus a global timestamp may not available via UTC (Universal Time Control). In the following the schemes for the two cases shown in FIGS. 3A and 3B are further described.

Small-Scale Case

Figure 11A:
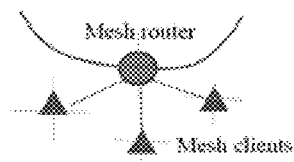
FIGS. 11A and 11B show a one-hop case (FIG. 11A) and message exchange for synchronization (FIG. 11B).

Most of the practical community networks use simple 1-hop WMN topology, as shown in FIG. 11A. There are a few MRs that form the wireless backbone. Maybe one MR serves as the gateway and connects to the Internet. It can easily obtain UTC timestamp, and then uses high-speed wireless links to broadcast to other MRs. Even without UTC, if one of the MRs can be specified to be the reference clock, all MRs can have a consistent view of the global time.

Wireless links among MRs can be more reliable (i.e., have lower packet loss rate and bit error rate (BER)) than the links between MRs and MCs. Moreover, the number of MCs can be much larger than that of MRs. Due to the slower link rate and higher BERs in MR-MC links, a simple while accurate method to synchronize the clocks between any MR and its MCs is desirable.

Figure 11B:
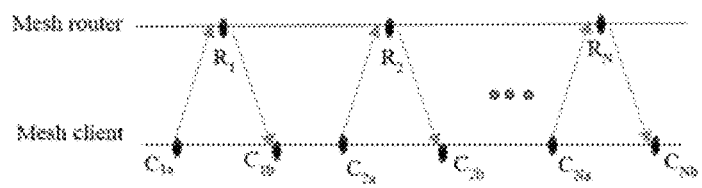

Here disclosed is the use of a low-overhead solution that only needs few rounds of round-trip message exchanges between a MR and a MC. As shown in FIG. 11B, each time the MR receives the message, it records down the local timestamp $R_i$. Based on the included timestamp information in the payload of the message packet (sent by the MC at $C_{in}$), the MR knows how long it takes for a single trip (MC→MR). Then it can form a new message and sends to MC. The MC can then know the round trip time.

Assuming that there exists a linear relationship between the local clocks of MR and MC (which can be a good approximation in most wireless devices):

$$T_{client} = a \times T_{router} + b \quad (2)$$

Figure 12:
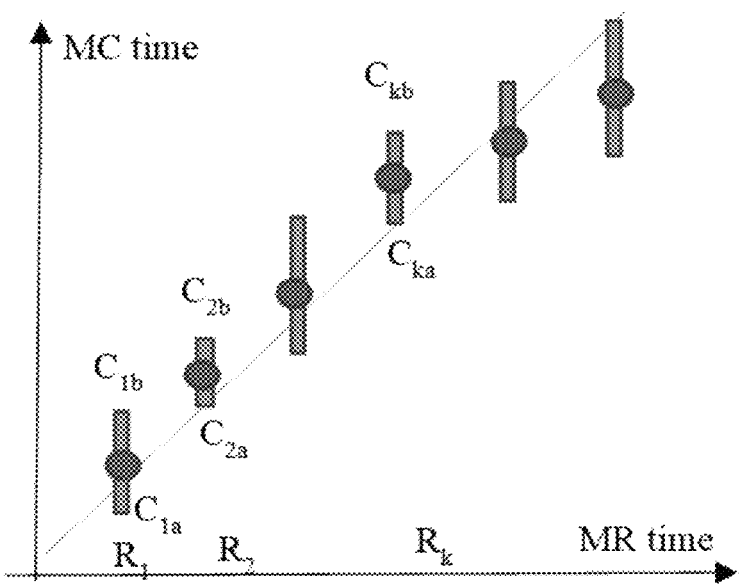
FIG. 12 shows a linear regression for time synchronization for aspects of the disclosed implementation.

A linear regression method (see FIG. 12) can be used to obtain the above two coefficients, a and b.

The clock offset and message delay can also be calculated based on the above method. The clock offset can be defined as the difference between the time reported by a clock and the real time. The clock offset A and round-trip delay Θ can be estimated as follows:

$$\text{Clock offset: } \Delta_i = [(R_i - C_{ia}) + (R_i - C_{ib})]/2 \quad (3)$$

$$\text{Round-trip delay: } \Theta_i = C_{ib} - C_{ia} \quad (4)$$

The average values for Δ and Θ can be taken by collecting some rounds of values of $C_{ia}$, and $C_{ib}$. That is:

$$\Delta = \Sigma_{i=1}^{N} \Delta_i, \Theta = \Sigma_{i=1}^{N} \Theta_i \quad (5)$$

Then the local time in the mesh client is: $T_{client} = T_{router} - \Delta + \Theta$ Large-Scale Case As mentioned before, a large-scale WMN can be organized as a tree topology (such a topology can be found via AODV-like ad hoc routing protocols). Such a tree topology matches with airborne network scenarios. For example, the nodes (UAVs or aircrafts) can have certain height levels based on their mission requirements. Different height levels also reduce the crash/collision events. The nodes with the mission of high-resolution video capture for a small region-of-interest (RoI) area, may fly in the lower height levels, while the nodes that monitor a large area may be deployed in higher levels.

Figure 13A:
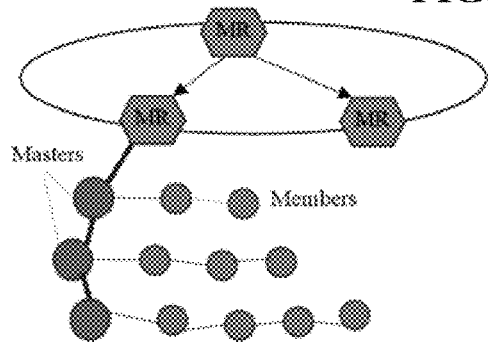
FIG. 13A shows tree-based MR-to-MC Synchronization and FIG. 13B shows MR-to-MR synchronization for aspects of the disclosed implementation.
Figure 13B:
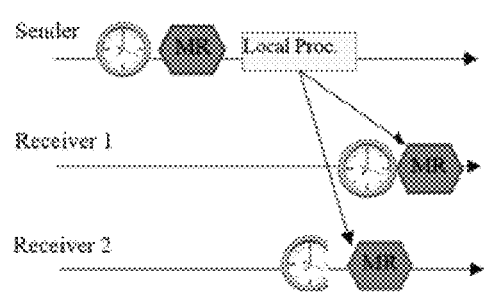

The time synchronization scheme for the above scenario should be tolerant of node mobility and message loss. The scheme should achieve level-to-level synchronization, but does not necessarily need an external, precise time server. Disclosed herein are methods that can use an enhanced time-diffusion synchronization (TDS) scheme to achieve consistent timing among mobile sensors. The original TDS can have many components (thus involves high communication overhead) and needs to maintain a big table for clock deviation update. Since a TDMA-like MAC structure with a high-speed wireless backbone is already present, the original TDS can be improved by using a RBS-based synchronization scheme to achieve precise synchronization among the backbone MRs. The accurate timing signals can then be propagated to each level of MC tree (see FIGS. 13A and 13B).

The RBS scheme may be better than general scheme that just synchronizes each sender-to-receiver pair (see FIG. 13B), for example, when a large-scale WMN has many MRs to be synchronized (therefore, a MR's timestamp may not be able to reach all MRs). The nodes that are close to each other should receive the messages from the same sender with a very small time difference. Therefore, RBS can utilize the peer-to-peer time difference evaluation (between two neighboring receivers) to get rid of the tiny time deviation. The basic procedure of RBS-based clock offset calculation is as follows: (1) first, a MR broadcasts a reference timestamp to two MRs (two receivers); (2) Then each receiver writes down its local time at which the message was received; (3) the receivers exchange their local times when receiving the packet; (4) the clock offset between two receivers can then be calculated based on their local time difference. RBS works very accurately as long as each receiver can record the receiving time promptly. But the wireless link may cause some message loss; and the receiver may not be able to record the time immediately due to other busy events. To overcome those issues, the MR can be asked to send out a sequence of reference messages (say N messages), rather than just one message. Then the average offset can be calculated as:

$$\text{Clock\_Offset\_between\_MCa\_and\_MCb} = \frac{1}{N}\sum_{i=1}^{N}(\text{Timestamp}_i(a) - \text{Timestamp}_j(b)) \quad (6)$$

RBS can be used to achieve the consistent time among all MRs, and proceed to the time synchronization issue in each mesh client tree through an enhanced TDS as follows:

Phase 1:

Master node selection in each tree level. The TDS can select a reference node as the Master node that has the most stable clock in each tree level (the MR is the only reference node in the root level). Such a master node can be used to synchronize the time in other nodes in the same tree level. The stability of the clock can be calculated as follows:

First, the tree root (a MR) broadcasts H number of time-stamped STABILITY_QUERY messages to all nodes in Tree Level 1, within a very short time interval. (After Level 1 Master is chosen, the root broadcasts STABLE_QUERY messages to Tree Level 2, and so on.)

Second, each node in Level 1 uses the STABILITY_QUERY messages to calculate the Allan variance (2-sample), $\sigma^2$, between this node and the tree root:

$$\sigma^2(\Delta) = \frac{1}{2\Delta^2(H-2)}\sum_{i=1}^{H-2}(x_{i+2} - 2x_{i+1} + x_i)^2 \quad (7)$$

Here $\Delta$ is the time difference between two time deviation measurements; x is the measured value.

Third, the tree root collects all $\sigma^2$ values via the node's STABILITY_REPLY messages, and calculate the average Allan variance as follows:

$$\overline{\sigma}^2(\Delta) = \frac{1}{J}\sum_{z=1}^{M}\sigma_{Rz}^2(\Delta),$$

here $\sigma_{Rz}^2(\Delta)$ is the Allan variance between the tree root R and a node z.

Then the outlier ratio can be used to find the node with the most stable clock in each tree level (the lowest outlier ratio is the most stable clock):

$$\eta_{Rz} = \left|\frac{\sigma_{Rz}^2(\Delta) - \overline{\sigma}^2(\Delta)}{\overline{\sigma}^2(\Delta)}\right| \quad (8)$$

Phase 2:

Use the above mentioned RBS to synchronize the MR and all master nodes.

Phase 3:

Then the method described in, Su, Weilian, and Ian F. Akyildiz. "Time-diffusion synchronization protocol for wireless sensor networks." Networking, IEEE/ACM Transactions on 13.2 (2005): 384-397, which is herein incorporated by reference, can be used to synchronize the master and each hop of nodes in the same tree level.

Mission QoS Support

In mission-oriented applications, it may be desired to adjust MAC features based on the node QoS demands. In aspects of this disclosure two levels of QoS control can be used to meet different nodes' priority requirements: (1) in the upper-layer of MAC, a weighted interval allocation algorithm can be used to ensure that the higher priority nodes get enough time to send out data; (2) in the lower-layer of MAC, the backoff timer's values can be controlled to give each node different traffic transmission priorities.

Upper-Level QoS Control: Weighted Time Allocation

The upper layer MAC design can be controlled by a time slot based architecture. The time slot can be much longer than one packet of transmission time (it needs to be able to accommodate a complete Superframe, which consists of both PCF and DCF phases). And it does not need fine timing control, i.e., each slot can have different lengths, since the goal may be just to make sure that each slot has only one sender or receiver. It was previously assumed that each node has the equal chance to be the winner (star node). However, in practical mission-oriented applications, there may be the following 4 cases: (1) No priority. That is, all nodes have the same priority. (2) Node priority: In environment surveillance applications, some UAVs may only fly in a certain region of interest (RoI). These nodes can have higher priority no matter what traffic they send out or receive. (3) Traffic priority: The entire node does not have a constant node priority; however, in a specific mission, maybe it has a particular flow that needs to be sent out with higher priority (compared to the traffic in all other neighboring nodes). (4) Traffic urgency: This represents the highest priority among all data flows in all neighboring nodes (a MAC control area). A typical example is the intrusion event detection. If a malicious activity may be detected in a RoI, the monitoring data (it can be real-time video) needs to be immediately sent out.

(1) No Priority:

For this case, each mesh node can be allowed to win the current time slot with the same chance, that is, the hash function should generate a random probability in [0, 1]: $P_i = H (ID(i), t)$, here $P_i$ is the winning probability, t (the current timestamp) is the random function seed. Note that the inclusion of the current time may be necessary. The same sequence of winning IDs may be obtained if using the same seed.

(2) Node Priority:

If different nodes are assigned different weights ($\omega_i$) to reflect their importance levels (i.e., node priorities) in the MAC operation neighborhood, the following hash function can be used to calculate the winning probability of any node with ID(i):

$$P_i = H(ID(i), t)^{1/\omega_i}, \text{ where } \Sigma_i \omega_i = 100\% \quad (9)$$

The reason of using the above exponential format is because the winning probability of a node i can be proportional to its weight percentage, that is:

$$P\left[\arg\left(\underset{n=1,2,\ldots,N}{\text{MAX}} H(ID(n), t)\right) = i\right] = \frac{\omega_i}{\sum_{n=1}^{N} \omega_n} = \frac{\omega_i}{100\%} = \omega_i \quad (10)$$

Figure 14:
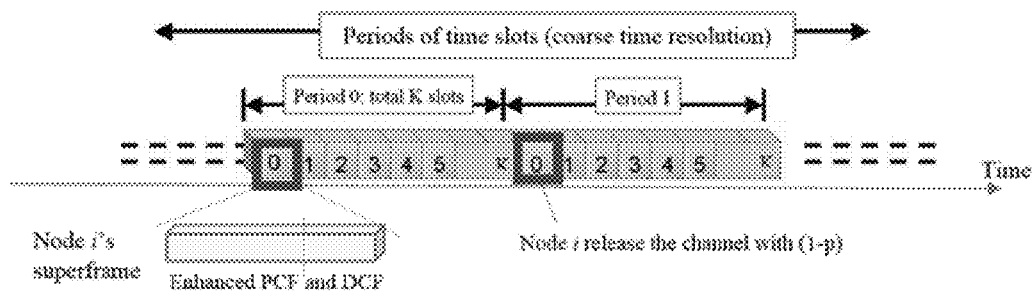
FIG. 14 shows the release of a time slot for high priority flow for aspects of the disclosed implementation.

(3) Traffic Priority:

If a node has a particular data flow which is more important than other flows, this flow may be given a higher chance to get transmitted. However, unlike Case (2) that might always give the node that owns that flow a higher winning probability, other nodes need to be given the chances to send out their own flows. A periodical time slot architecture can be used. As shown in FIG. 14, assuming each period has a total of K slots, when a node with the higher priority traffic wins a slot, it can continue to win this slot in the next period. However, it needs to release this slot with the probability (1-p). This can give other nodes the chance to use this slot. When the node finishes the transmission of the data flow, it broadcasts a DONE message and will not have the privilege of occupying the same time slot in each period.

However, the above method cannot guarantee that in each period the node with a higher probability can certainly access the channel. If the high priority flow has the requirement of occupying a longer airtime, say, it needs to occupy a total of $S_i$ slots in each period. A potentially naïve way can be to allocate consecutive $S_i$ slots for node i in each period. However, this may totally block other nodes' opportunities to send out their flows in real-time since those $S_i$ slots are all occupied. Therefore, it can be better to still use a probability to control the channel access chance. A new weight can be used which is: $\omega' = K\omega_i^2/S_i$, where K is the period length. The net effect can be equal to occupying $S_i$ slots for node i with a probability of $H(ID(i), t)^{1/\omega'}$. But it does not always win the slot. Moreover, it does not occupy consecutive slots.

(4) Traffic Urgency:

If a node has urgent traffic that needs to be sent out right away, it broadcasts an URGENT message to the neighbors. In URGENT message it may specify the airtime it needs to occupy. Such an airtime value will be converted into M time slots. Then it gets the highest hash value (which is 1) in M consecutive time slots.

In cases (3) and (4), the winner node can broadcast a DONE message in its all beams in order to tell all neighbors that it has finished the transmission of a high priority, particular data flow.

In summary, the winning probability of node i can be:

$$P_i^{Win} = \begin{cases} H(ID_i, t) & \text{No priority;} \\ H(ID_i, t)^{1/\omega_i} & \text{Node priority;} \\ H(ID_i, t)^{S_i/(K\omega_i^2)} & \text{Traffic priority;} \\ 1; \text{ hold for } M \text{ consecutive slots} & \text{Traffic Urgency} \end{cases} \quad (11)$$

Lower-Level QoS Control: Adaptive Backoff Timer

Figure 15:
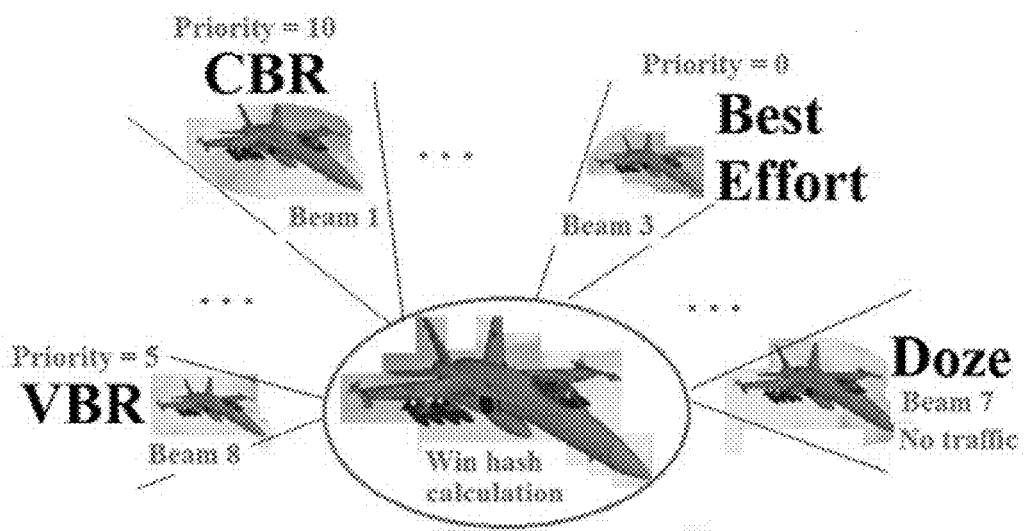
FIG. 15 shows different traffic types in different beams for aspects of the disclosed implementation.

Although the higher layer MAC can use the allocated communication time for different nodes to support QoS demands, the lower layer MAC can also perform certain operations for different node priorities. This may be because that the higher layer MAC can only make a node have a higher chance to access the channel if it has higher node priority or flow priority. However, in each Superframe, the star node still needs to deal with complex traffic profiles in different beams. As shown in FIG. 15, in each beam, one or multiple nodes can have different types of traffic, such as CBR (constant-bit-rate), VBR (variable-bit-rate), best effort, etc. In the upper layer, more time can be allocated to higher priority "receiver". This can be from a "node priority" viewpoint; on the other hand, for the same receiver, different "senders" may have different traffic priorities. Some senders may send out CBR, which can be higher than VBR. Best effort traffic has the lowest priority. Therefore, in the lower MAC layer, the beam-priority-aware QoS support scheme may be needed.

Figure 16A:
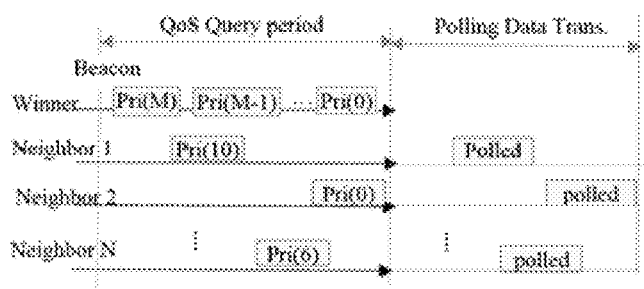
FIG. 16A shows the conventional QoS-oriented MAC and FIG. 16B shows the proposed multi-beam QoS scheme.
Figure 16B:
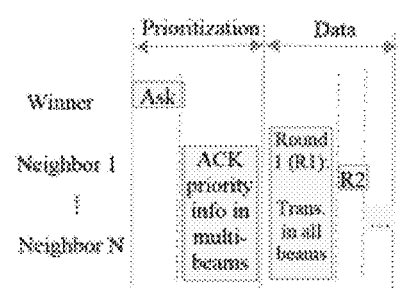

The disclosed QoS-oriented MAC can exploit the benefits of MBSA, and thus achieves higher data throughput and less protocol overhead than conventional schemes. FIGS. 16A and 16B illustrate some differences between the disclosed method and other methods. The disclosed method can exploit multi-beam transmission benefits by using concurrent prioritization response and simultaneous data transmission in all beams.

Another feature of the disclosed QoS-oriented MAC is that the case of multi-sender, multi-priority in a specific beam is considered. Note that the active nodes in the same beam can be easily detected through neighbor discovery algorithms. The neighbors can be found while an ad hoc routing scheme is running, such as the enhanced AODV scheme for directional antenna case. AODV scheme searches each hop of neighbors through multi-beam RREQ and RREP message exchanges.

Since the priority ACK packets can be small (similar to RTS/CTS message length), the chance of collision in the same beam can be slim. When a neighbor sends back the priority ACK, it may also piggyback the airtime desired in the current data phase. It will also send a priority ACK with its demanded airtime for the next data phase. This helps the star node to prepare all queues for each potential sender.

In the Data phase, the winner first broadcasts an INIT frame in all beams to tell all neighbors the following information: (1) active neighbor list (i.e., the neighbors with data for the winner); (2) the airtime each active neighbor is allocated (denoted as Ω); (3) round ID. In the Data phase, it first uses one round (Round 1) to receive all traffic from the highest priority node in each beam. Then it uses more rounds to receive data from the second highest priority node in each beam (if there are multiple nodes in one or multiple beams). It keeps doing this until it runs out of rounds (i.e., reaching maximum Data phase). Its maximum Data phase time should be: MaxCP=Superframe−CP. Such MaxCP consists of multiple rounds of data receiving operations.

As mentioned before, to make the proposed MAC back compatible with 802.11, the DCF mode can be kept in the Superframe. Therefore, the longest duration of collision-free phase ($CFP_{max}$) should be set up as: $CFP_{max}=SF-CP_{min}$, where SF is the entire super frame time length, and $CP_{min}$ is the minimum length of CP. Based on 802.11 recommendations, CP can allow at least the transmission and acknowledgement of a MAC protocol data unit (MPDU) with the maximum size. If $R_{min}$ denotes the minimum bit rate achievable in Physical layer, $CP_{min}$ can be written as:

$$CP_{min} = DIFS + SIFS + [\text{Max MPDU\_size} + \text{ACK\_size}]/R_{min} \quad (12)$$

As long as the CFP does not go beyond $CFP_{max}$, the winner can schedule more rounds to receive the traffic from each priority of flow in different beams. In real-time applications, although a node claims its desired airtime (Ω) in the priority ACK frame, it may demand a different airtime (denoted as Θ) in Data phase. In the following, the relationship between Ω and Θ is described.

(1) For VBR (variable bit rate) traffic, (such as video stream), a node can estimate its desired airtime (Ω) based on the inequality: $\Pr[\Theta \leq \Omega] \geq 1 - \xi_{VBR}$, where $\xi_{VBR}$ is the individual node's tolerable degree ($0 \leq \xi_{VBR} < 1$) for insufficient airtime. If the VBR flow's bit rate has a mean μ and variable $\sigma^2$, then the following:

$$\Omega = \left(\mu + \sigma \sqrt{\frac{1-\xi_{VBR}}{\xi_{VBR}}}\right) \times \frac{SuperFrame}{R_{ch}} \quad (13)$$

Here, SuperFrame is the whole time length of the Superframe, and $R_{ch}$ is the channel data rate.

(2) For CBR (constant bit rate), such as audio traffic, if $0 \leq \xi_{CBR} < 1$ denotes the node's tolerable bandwidth loss ratio, for a CBR flow with bit rate μ, then:

$$\Omega = \mu(1 - \xi_{CBR}) \times \frac{SuperFrame}{R_{ch}} \quad (14)$$

In the neighbor-to-winner direction, the winner (i.e., the star node) can measure the link quality in terms of the SNR, as long as there is data received by the winner in any Superframe. Thus the winner can easily estimate an allowable maximum PHY data rate R* for any specific neighbor, by using any existing SNR-based PHY rate adaptation scheme. When the winner asks a node to use the PHY rate R* to send out data, the node can estimate its maximum instantaneous throughput $TH_i$ as follows:

$$TH_i \approx \frac{\Omega \times R^* \times (1 - FER)}{SuperFrame}, \quad (15)$$

where FER is the observed frame error rate.

As long as a node's real throughput $th_i$ does not go beyond the above throughput $TH_i$, its real occupied airtime in the existing Superframe does not go beyond:

$Airtime(i) = $ (16)

$$\frac{th_i \times SuperFrame}{R^*} \leq \frac{TH_i \times SuperFrame}{R^*} = \Omega \times (1 - FEDR) \leq \Omega$$

That is, this node will not occupy more than its allocated airtime.

Note that conventional polling-based MAC protocols often use the shortest job (airtime) first policy to schedule the polled traffic in different nodes. The star node first selects the yet-to-scheduled node with the shortest demanded time. Such a policy may not yield the shortest polling time. As a matter of fact, based on the pairwise job interchange principle, the polling time can be the minimum if the star node adopts the largest job (airtime) first scheduling policy.

To model the multi-beam scheduling issue (FIGS. 17A and 17B), let $A_1, A_2, \ldots, A_n$ represent total n nodes, B(i,k)=1 is sued to represent that node i is in beam k, and 0 otherwise. Let P(i,r)=1 represent that node i can be polled in round r, otherwise 0. Then the scheduling issue becomes the following optimization problem:

Object 1:

$$\text{Minimize } O_1 = \sum_{r=1}^{M} \text{MAX}_{1 \leq i \leq n} \{P(i, r) \times airtime(A_i)\} \quad (17)$$

Object 2:

$$\text{Minimize } O_2 = \sum_{r=1}^{M} \overset{n}{\underset{i=1}{V}} P(i, r) \quad (18)$$

Subject to Conditions:

$$\sum_{r=1}^{M} P(i, r) = 1, \sum_{r=1}^{M} P(i, r) \leq H, \sum_{r=1}^{M} P(i, r)B(i, k) \leq 1 \quad (19)$$

Although the above multi-objective integer programming problem is generally NP-hard, it can be approximately solved through the largest job first scheduling.

Intelligent Communications Via HDP-HMM

Motivations of Intelligent Communication

The disclosed MAC scheme can have well scheduled multi-beam transmissions with collision reductions. However, there may be still a drawback there: in any specific interval, the active sender just simply turns on all beams, and blindly flushes out whatever it has in the queue in each beam. As a matter of fact, it may not even know how to set up each beam queue due to the unknown neighbors. If a node is not an active sender in an interval, it must be in receiving status. But it still does not know turn on which beam and receive data from which neighbor. Knowledge of neighborhood communications in Ku-band directional WMN can be useful due to the following two reasons:

(1) Distributed coordination can require each node to have smart environment awareness: As mentioned before, Ku-band channel acts like a "semi-wire" to avoid central-point-failure. Therefore, the nodes need to coordinate with each other without a central controller. In the TDMA-like upper layer, if a node gets the highest priority and sends out data, it needs to automatically decide what traffic should be sent out in each beam, what node it can be communicating with, as well as the queue serving rate. Without knowing such information, a node may just blindly send out whatever it has in each beam, or just simply sends out the same copies of packets in each beam since it has no idea on whom to communicate to.

(2) The mission-oriented communication demands a prepared multi-beam transmission/reception: Airborne networks often transmit surveillance video streams among them. In the upper MAC layer, the entire interval should be dedicated to useful data transmissions, instead of time-consuming control message exchanges. It will seriously decrease the communication efficiency if the upper layer exchanges neighboring node arrival information frequently. The lower layer 802.11-compatible protocol has used 4WH (RTS/CTS/Data/ACK) control messages to exchange some basic packet attributes (such as channel reservation time). It may not be not wise to add extra control overhead in the upper layer by asking the neighboring nodes to exchange traffic communication requirements. Therefore, each node should use other ways to prepare the beam transmissions. The node state estimation and mobility prediction can be a good approach to low-overhead communications.

For mission-oriented communications, the system typically has predictable mobility. For example, since each UAV has certain surveillance scope, it cannot randomly fly around. Also, different aircrafts have desired height levels. These facts make node mobility prediction and state estimation feasible through some Machine Learning algorithms.

In the following descriptions, two beam communication prediction schemes with different application conditions are disclosed: (1) ARMA-based prediction. This method is simple to use since it assumes that the observed measurement represents the internal true state. It uses a time series model to estimate the next state (FIG. 18A). (2) Hidden Markov Model (HMM)-based prediction. If there is mismatch between the observed values and internal states (due to noisy measurement or other uncertainty factors), HMM may be a better option since it builds the probability models for both internal states and observations (FIG. 18B).

ARMA Based Prediction

A vector ARMA model can be used to predict the next-interval beam traffic state since vector ARMA can model a group of variables simultaneously. Vector ARMA helps us to make predictions for the following values in the same model: (1) a node's beam on/off pattern: will the neighbor's beam i still be on next time? If it is off, data may not be sendable to that direction. (2) If the beam i is still on, what will be its traffic type (CBR, VBR, best effort, etc.)? (3) What queue size will be allocated for that specific beam communications? (4) What is the neighbor's next position (for example, is it out of beam scope or is still within communication range)? (5) What is the airtime for that beam's traffic? A vector (multi-variable) ARMA sequence y(t) of n elements with orders p and q satisfies the equation:

$$A_0 y(t) + A_1 y(t-1) + \ldots + A_p y(t-p) = M_0 \varepsilon(t) + M_1 \varepsilon(t-1) + \ldots + M_q \varepsilon(t-q) \quad (20)$$

Here $A_0, A_1, \ldots M_0, M_1, \ldots$ are all matrices of order n×n and $\varepsilon(t)$ is a disturbance (noise) vector of n elements. For analysis convenience, the above equation is convertible to a state-space model involving a transition equation. Thus conventional first-order Markov process can be used. Therefore:

$\xi(t) = A^{-1}(L)\varepsilon E(t)$ can be defined, and the above model can be re-written as: $y(t) = M(L)\xi(t)$, where L is the lag operator, and has the effect that $Lx(t) = x(t-1)$. Here $\xi(t)$ can be further written as a canonical recursive format:

$$\begin{bmatrix} \xi_1(t) \\ \xi_2(t) \\ \vdots \\ \xi_r(t) \end{bmatrix} = \begin{bmatrix} -A_1 & \ldots & -A_{r-1} & -A_r \\ I & \ldots & 0 & 0 \\ \vdots & \ddots & \vdots & \vdots \\ 0 & \ldots & I & 0 \end{bmatrix} \begin{bmatrix} \xi_1(t-1) \\ \xi_2(t-1) \\ \vdots \\ \xi_r(t-1) \end{bmatrix} + \begin{bmatrix} 1 \\ 0 \\ \vdots \\ 0 \end{bmatrix} \varepsilon(t) \quad (21)$$

Let's take a simple example. When n=2, ARMA can be simplified as a VAR(1) model as:

$$y(t) = \begin{bmatrix} \phi_{11} & \phi_{12} \\ \phi_{21} & \phi_{22} \end{bmatrix} y(t-1) + \varepsilon(t). \quad (22)$$

Of special interest are cases such as $\phi_{12}=0$. The above model reduces to a transfer function. For general VAR(1) case, the h-step forecast can be obtained as:

$$\hat{y}(t+h) = \Phi^h y(t), \quad (23)$$

where $$\Phi = \begin{bmatrix} \phi_{11} & \phi_{12} \\ \phi_{21} & \phi_{22} \end{bmatrix}, \text{ and } \Phi^2 = \Phi\Phi, \Phi^3 = \Phi^2\Phi, \text{ etc.}$$

HDP-HMM Based Prediction

1) General HMM

Figure 19A:
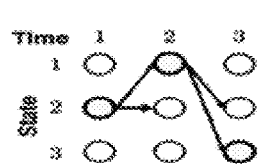
FIGS. 19A-19C show (FIG. 19A) state switching each time, (FIG. 19B) transition probability spectrum and (FIG. 19C) HMM evolution.

HMM can be used to deduce the internal state transition even if the observed values have noise or even missing data. To make the disclosed model amenable to highly dynamic WMN traffic pattern changes in different beams, conventional finite MINI can be extended to infinite HMM. In finite HMM, the system mode can only switch between pre-set finite number of states (FIG. 19A), assuming K states in total. If $Z_t$ denotes the Markov chain mode at time t, $\pi_i$ as the mode-specific transition distribution for mode j, $y_t$ as the observation that is independent of the observations and modes at other time steps, F(.) as an indexed family of distributions, and $\theta_i$ as mode i's emission parameters, then finite HMM can be described as a generative process as follows:

$$Z_t | Z_{t-1} \sim \pi_{Z_{t-1}}, \text{ and } y_t | Z_t \sim F(\theta_{Z_t}) \quad (24)$$

Figure 19B:
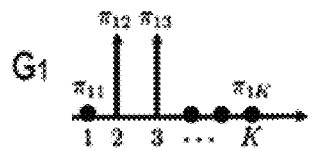

In order to maintain consistency with the later HDP-HMM discussions, HMM can be represented as a sum of probability mass. Assume each time the HMM can be one of the states in $\{\theta_1, \ldots, \theta_K\}$, and $\delta_\theta$ is a unit mass concentrated at $\theta$, the Trellis representation (FIG. 19B) can use $G_j$ to represent the transition spectrum in mode j. Then a HMM as a transition spectrum concentrated in different times can be used (see below):

$$HMM \sim \{G_j, j = 1, 2, \ldots T\}, \quad (25)$$

$$\text{where } G_1 = \sum_{i=1}^{K} \pi_{1i} \delta_{\theta_i} \text{ (see FIG. 19B)}, \ldots, G_j = \sum_{i=1}^{K} \pi_{ji} \delta_{\theta_i}$$

Figure 19C:
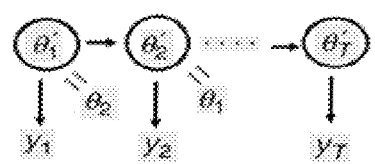

As shown in FIG. 19C, a HMM's mode at time t, denoted as $\theta_t'$, may be a state value. For example, based on FIG. 19A, $\theta_1'=\theta_2$, $\theta_2'=\theta_1$, and so on. Here $\{y_1, y_2, \ldots\}$ are observations. Then the conventional HMM representation can be transferred (see (1)) to a probability mass format:

$$\theta_t' | \theta_{t-1}' \sim G_{j_{t-1}}, \text{ and } y_t | \theta_t' \sim F(\theta_t') \quad (26)$$

Here $j_{t-1}$ is the unique emission parameter index j such that for any time state, $\theta_{t-1}'$, an unique value (called an atom) $\theta_j$ can be found to satisfy: $\theta_{t-1}'=\theta_j$.

Bayesian extension: To overcome the impacts of WMN node mobility uncertainty, conventional HMM can be extended to a Bayesian model. The transition spectrum $G_j$ can be treated as a random variable, and endow a prior distribution on it. Based on (2), $G_j$ can be the weighted sum of unit masses, that is: $G_j = \sum_{i=1}^{K} \pi_{ji} \delta_{\theta_i}$. A Dirichlet distribution can be assumed for those weights $\pi_j = [\pi_{j1}, \pi_{j2}, \ldots, \pi_{jK}]$, and assume H as a base distribution. Its choice can consider the computational efficiency during Bayesian conjugate analysis. Thereby:

$$\pi_j \sim Dir(\alpha_1, \alpha_2, \ldots, \alpha_K), j=1,2,\ldots,K, \text{ atoms } \theta_j \sim H \quad (27)$$

Extend finite HMM to Infinite HMM: Conventional finite state HMM (with total K states) can be extended to an infinite-state scenario, where the number of states can change from time to time. In other words the node states cannot be limited within certain pre-fixed set (as in FIG. 19A). A finite HMM can be built by extending the K-state weighted sum in (2) to the infinite state case, which can be called Dirichlet Process (DP):

$$G_0 = \sum_{i=1}^{\infty} \beta_i \delta_{\theta_k}, \text{ and } \theta_k \sim H \qquad (28)$$

The random variable weights $\{\beta_i\}$ cam be sampled through stick-breaking construction: a unit-length stick can be divided into lengths given by the weights $\beta_k$, and the ith weight is a random proportion $v_i$ of the remaining stick after the first (i−1) weights are chosen. $\beta_i \sim \text{GEM}(\gamma)$ can be denoted, which means:

$$\beta_i = v_i \prod_{l=1}^{i-1} (1 - v_l), v_i \sim \text{Beta}(1, \gamma) \qquad (29)$$

2) HDP-HMM with State Suppression

The above DP-HMM adapts to variable-state Markov chain. However, it has a serious drawback: It assumes that the transition spectrum has non-overlapping support. That is, at each transition step, the system switches to an entirely new collection of HMM modes and prevents the previously visited modes to ever be revisited. This may not be what is intended in mobile applications since some common mobility behaviors can be seen in different surveillance applications. To reflect this fact, a transition spectrum $\{G_j\}$ can be defined on the same support points $\{\theta_1, \theta_2, \ldots\}$ to be a variation on a global discrete measure $G_0$. In other words, a hierarchical specification $G_j \sim \text{DP}(\alpha, G_0)$ can be defined, and $G_0$ itself can be a draw from a DP $(\gamma, H)$. Therefore, (5) can be extended to a HMM with a prior distribution of hierarchical DP (HDP) as follows:

$$\begin{cases} G_0 = \sum_{i=1}^{\infty} \beta_i \delta_{\theta_k}, & \beta | \gamma \sim DP(\gamma, H) \\ G_j = \sum_{i=1}^{\infty} \pi_{ji} \delta_{\theta_k}, & \pi_j | \alpha, \beta \sim DP(\alpha, \beta) \end{cases}, \text{ and } \theta_k \sim H \qquad (30)$$

Figure 20A:
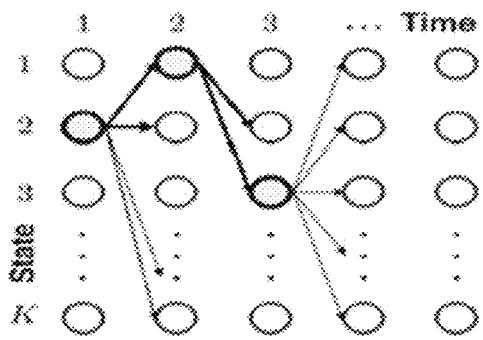
FIGS. 20A and 20B show the (FIG. 20A) general HMM and the (FIG. 20B) HDP-HMM.
Figure 20B:
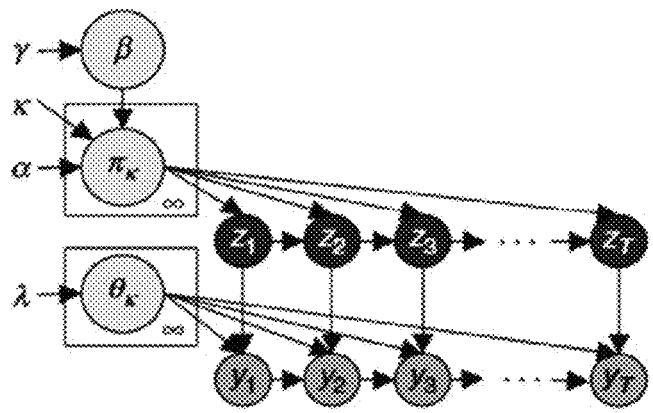

Suppress Redundant States:

For a realistic beam traffic change trajectory, there can be many sticky states (FIGS. 20A and 20B) that may be removed without impacting on the description of the traffic change. For example, a beam may just simply alternates between CBR and VBR, but both belong to real-time multimedia traffic type and thus may be combined into one state (called "real-time traffic"). Smoothly varying Markov state dynamics may be preferable. However, general HDP-HMM (FIG. 20A) may not be able remove those redundant, sticky states without involving prohibitive high computational complexity. It may not differentiate self-transitions from transitions between different states. In order to increase the expected probability of self-transition, those sticky states can be suppressed by introducing a new control parameter, k, for random variable $\pi$, that is (see FIG. 20B)):

$$\pi_j | \alpha, k, \beta \sim DP(\alpha + k, (\alpha\beta + k\delta_j)/\alpha + k) \qquad (31)$$

Figure 21A:
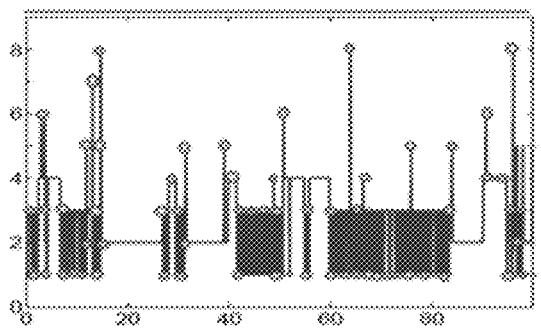
FIGS. 21A and 21B show the (FIG. 21A) general HDP-HMM and the (FIG. 21B) State-suppressed HDP-HMM.
Figure 21B:
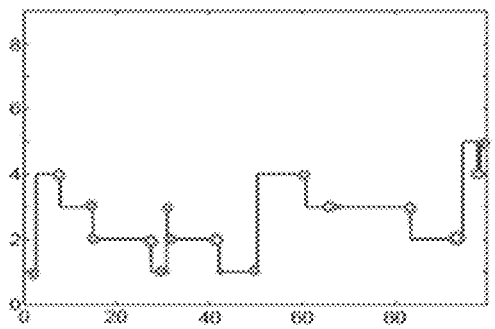

Here the parameter k is actually the reminiscent of the self-transition bias parameter of the infinite HMM, a precursor of the above HDP-HMM. The infinite HMM employs a two-level model. The top-level process places a probability on transitions to existing states in proportion to how many times these transitions have been seen, with an added bias towards a self-transition even if this has not previously occurred. While FIG. 21A shows general HDP-HMM, FIG. 21B shows the state-suppressed HDP-HMM Graphical Model. FIGS. 21A and 21B show the state suppression effect via HDP-HMM based on the synthetic data from E. B. Fox, "Bayesian Nonparametric Learning of Complex Dynamical Phenomena," Doctoral Thesis, Massachusetts Institute of Technology, July 2009, which is fully incorporated by reference.

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Extensive simulations can be performed to verify the disclosed designs, such as two-layer MAC protocol, WMN time synchronization, prediction-based communications, and the like. In the WMN simulation model, each beam can be assumed to achieve a maximum sending rate of approximately 2 Mbps. It can be assumed that each node has 4 beams (in normal cases, each beam can face east, south, west, and north; but each node can be allowed to rotate its beams in order to achieve good node-to-node communications). Note that a node can send out data concurrently in multiple beams. Thus it can achieve a maximum of approximately 2 Mbps×4=8 Mbps each time. The packet size can be set up to 1500 bytes, which may be popular in some local area networks. The upper MAC layer (overlay) has a time interval of approximately 100 ms, which allows the transmission of dozens of packets.

Three different traffic types are also considered (priority #1, #2, #3): (1) CBR: Speech and audio streaming—100 kbps, 10 audio frames per second, up to 300 ms delay, highest priority (#1). All packets have the same priority; (2) VBR: Video on demand (streaming of pre-encoded video such as Netflix)—720p, 2 Mbps, 5-10 s delay, priority #2; and (3) Best Effort: general data transmission applications; the lowest priority (#3).

Figure 22:
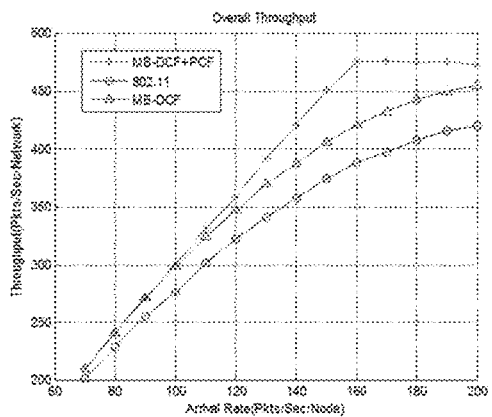
FIG. 22 shows the network throughputs for (1) multi-beam DCF+PCF (scheme described in this disclosure) (2) 802.11 DCF only (without enhancement) (3) multi-beam DCF only (without PCF).

First, a small-scale network with only four nodes is investigated. One node can be the receiver and the other 3 nodes can be senders. FIG. 22 shows the network throughput with the packet arrival rate.

In FIG. 22, three schemes can be compared: (1) the disclosed scheme (MB-DCF+PCF), where 2-layer MAC is run with enhanced multi-beam DCF and PCF in the lower layer. (2) 802.11-DCF only, here multi-beam can be also assumed, that is, in each beam an 802.11 conventional DCF scheme is run; (3) MB-DCF: this is a simplified version of the scheme described herein where the PCF scheme is taken away and only the enhanced DCF scheme is kept. As can be seen, the scheme described herein has the highest throughput, and the conventional 802.11 scheme (with multi-beam considerations) has the worst performance.

Figure 23:
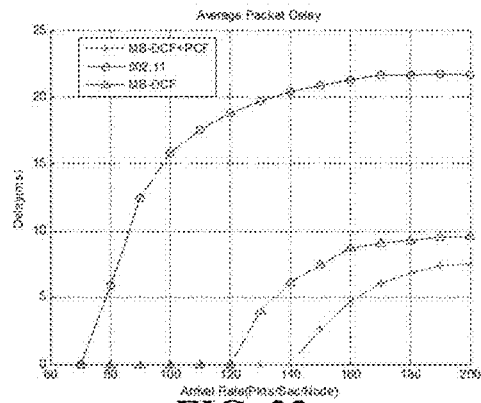
FIG. 23 shows packet delay for (1) multi-beam DCF+PCF (scheme described in this disclosure) (2) 802.11 DCF only (no enhancement) and (3) multi-beam DCF only.

FIG. 23 shows the average packet end-to-end delay performance for the above-mentioned three cases. The disclosed method has the best performance (the shortest delay), and the conventional 802.11 has the worst performance (the longest delay).

Figure 24:
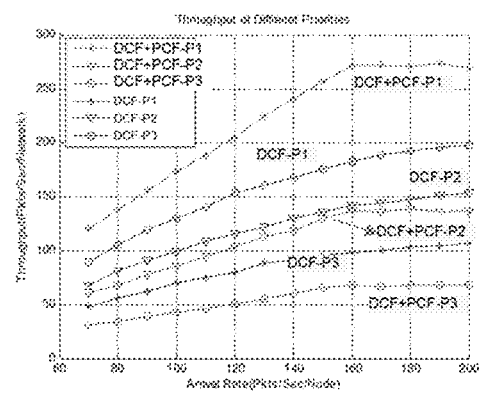
FIG. 24 shows mission-priority-aware transmission (throughput) for aspects of the disclosed implementation.

QoS Support:

One advantage of the disclosed scheme is the mission priority support through enhanced PCF and DCF schemes. One can investigate this aspect through the transmission of 3 different priorities of flows (CBR, VBR, and best effort). In FIG. 24, curves 10 represent an embodiment of the scheme disclosed herein, and curves 20 are for conventional scheme (802.11 DCF only). Additionally, the scheme corresponding to each curve has been marked. The disclosed scheme can well separate the transmission priorities of three types of flows (P1: CBR, P2: VBR, and P3: best effort). That is, there can be throughput difference among those three priorities. While conventional 802.11 scheme cannot separate those flows well since they all have close throughputs.

Figure 25:
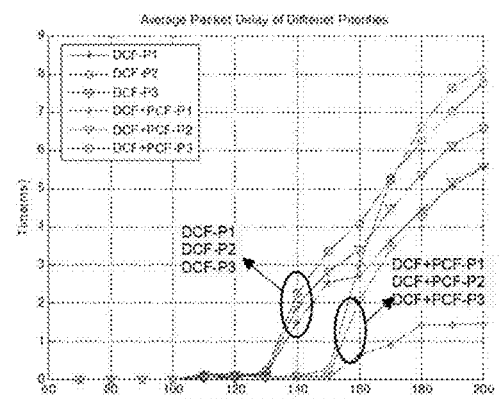
FIG. 25 shows mission-priority-aware transmission (delay) for aspects of the disclosed implementation.

FIG. 25 further demonstrates the validity of the disclosed QoS support schemes through delay performance. Through the disclosed QoS support scheme, the 3 flows have lower delays in most times. Moreover, the P1 flow have the lowest delay by giving it highest priority in the beam communications.

The above analysis can be extended to a larger scale network (with 15 nodes). Five different priorities of data flows can be considered. Other parameters can be the same as before. Since the disclosed methods concern the MAC layer (not Routing layer) protocols, the disclosed 2-layer MAC scheme can be assumed to run among those 15 nodes. This can be a typical high-density network. In any time interval (approximately 100 ms in the higher layer MAC), only one node may be selected as the star node. Recall that in the disclosed multi-beam MAC with enhanced PCF and enhanced DCF (MB-EPCF+EDCF), if there are multiple nodes in a beam, tree-splitting based collision resolution scheme can be used to schedule their transmissions. Without the tree-splitting scheme, those nodes will have many collisions during their attempts to send data to the star node.

Figure 26:
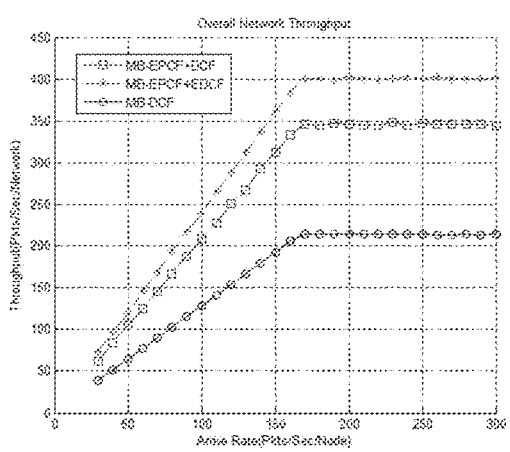
FIG. 26 shows throughput performance for large-scale network of aspects of the disclosed implementation.

FIG. 26 shows the throughput performance for 3 schemes: (1) MB-EPCF+EDCF: This is the disclosed scheme with two-layer MAC and multi-beam-oriented, enhanced PCF and enhanced DCF modules. (2) MB-No EPCF: In this scheme, the enhanced DCF part is maintained; however, the enhanced PCF part is removed, that is, just keep standard PCF; (3) MB-802.11 DCF only: In this scheme, 802.11 is applied in each beam's communications; however, regular 802.11 DCF is used, and PCF is not used here.

As shown in FIG. 26, the disclosed scheme has almost doubled throughput compared to 802.11 regular DCF. The enhanced PCF part can be also important since it helps to increase the throughput for more than 10%.

Figure 27:
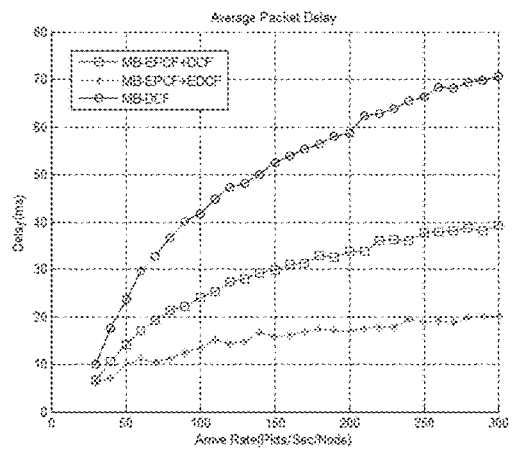
FIG. 27 shows delay performance (large-scale) of aspects of the disclosed implementation.

FIG. 27 shows the delay performance for the above mentioned 3 schemes, illustrating similar trends. The disclosed scheme reduces the delay for almost triple amount compared to the regular 802.11 when the arrival rate can be more than 200 pkts/sec/node. It can be also better than "no enhanced PCF" case.

Figure 28:
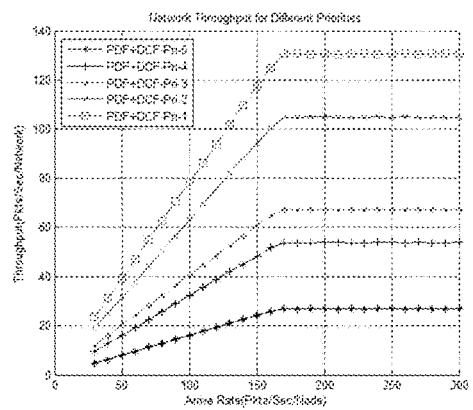
FIG. 28 shows throughput of 5 different priorities of traffic of aspects of the disclosed implementation.
Figure 29:
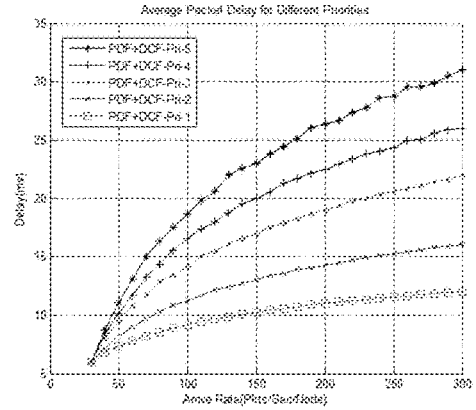
FIG. 29 shows delay performance of 5 priorities of aspects of the disclosed implementation.

FIG. 28 (throughput) and FIG. 29 (delay) show that the disclosed scheme can well separate five different priorities of flows. Higher priority traffic has higher throughput and less delay.

Validation of the Time Synchronization Schemes

To validate the disclosed time synchronization scheme, four different mesh trees are simulated: (1) Tree 1: it has only one level of children nodes (the root node is in the wireless mesh network backbone); (2) Tree 2: it has two levels of children nodes. (3) Tree 3: it has three levels; (4) Tree 4: it has four levels.

Figure 30:
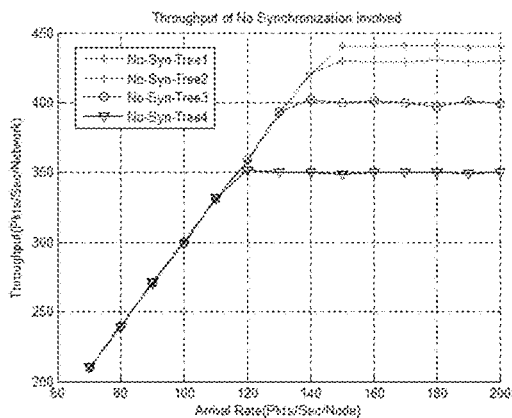
FIG. 30 shows throughput performance (no synchronization) of aspects of the disclosed implementation.

FIG. 30 is the throughput comparisons for those 4 trees without using the disclosed proposed time synchronization schemes. One consequence can be that a star node may not be able to receive the data from some beams because those beams have drifted clock values and cannot join the concurrent beam communication event in the same time. They may join later, and thus miss some data transmissions. FIG. 22 shows, when the tree has more levels, i.e., a deeper tree, lower throughput is obtained in the network. This can be explained as follows: the deeper a tree is, more time deviations are observed between the root node and the deeper level nodes. The root node can be assumed to be in the WMN backbone has the standard time. The bigger tree means more diversified clock values in different nodes.

Figure 31:
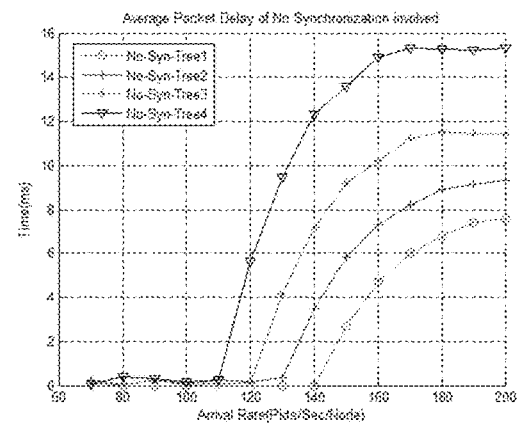
FIG. 31 shows delay (no synchronization) of aspects of the disclosed implementation.

FIG. 31 is the delay comparisons for those four trees. Again, a bigger tree may cause longer packet transmission delay because some beams may not ready for concurrent data transmissions. Each time a beam misses the data transmissions, it may take the beam longer time to finish the transmissions of all buffered data since that particular beam needs to wait for the next time slot to try to deliver the rest of the data.

Figure 32:
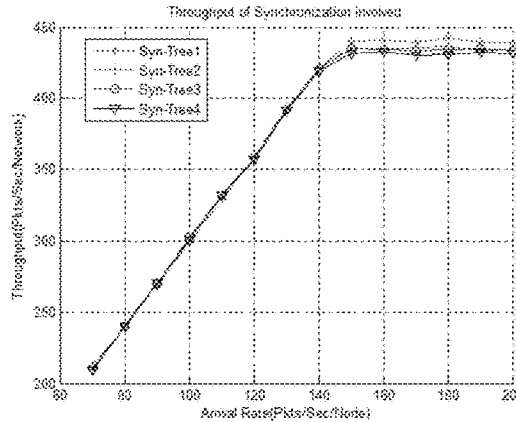
FIG. 32 shows throughput (with synchronization) of aspects of the disclosed implementation.

FIG. 32 shows the throughput after using the disclosed time synchronization scheme. FIG. 32 shows a higher throughput than FIG. 30 (when the tree level is the same). This may be because accurate node can be used and beam synchronization schemes to enable all neighbors that have data for the star node to simultaneously turn on their corresponding beams and will not miss any data transmissions.

Figure 33:
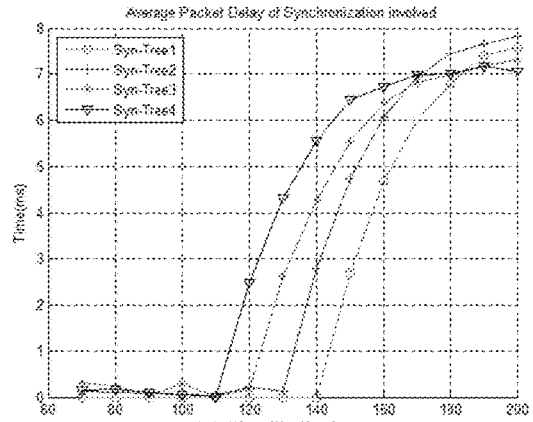
FIG. 33 shows delay (with synchronization) of aspects of the disclosed implementation.

By comparing FIG. 33 with FIG. 31, the delay performance has been improved by using the disclosed synchronization schemes. All four trees have reduced their delays for more than 50% in most cases.

Figure 34:
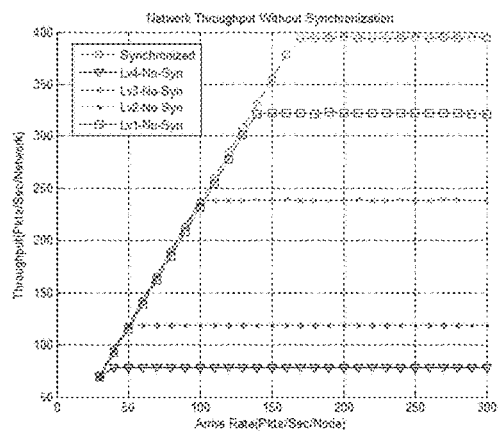
FIG. 34 shows larger scale throughput (no synchronization) of aspects of the disclosed implementation.
Figure 35:
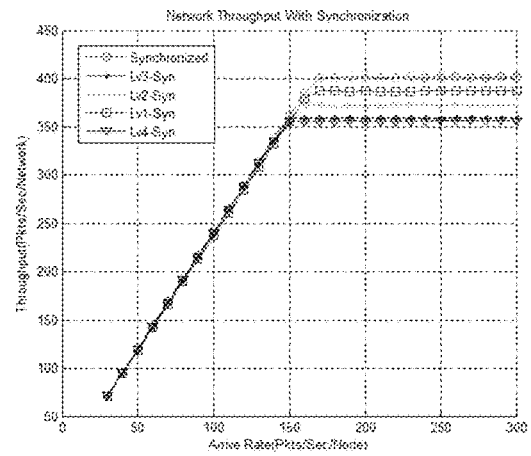
FIG. 35 shows larger scale (with synchronization) of aspects of the disclosed implementation.

FIG. 34 shows the larger-scale (>15 nodes in the neighborhood) network throughput without using synchronization. Note that an ideal case is also shown, that is, when all clocks are completely synchronized and never have any clock drifts. This may not be realistic in practical networks, but is shown for reference purposes. The deeper a tree has, the lower throughput it has. FIG. 35 shows the effect after using the disclosed synchronization scheme. For a larger-scale network, a well synchronized communication will not waste much bandwidth of each beam. Therefore, the multi-beam feature can be exploited to achieve higher throughput than the no synchronization case.

Validation of the State Prediction Schemes

Figure 36:
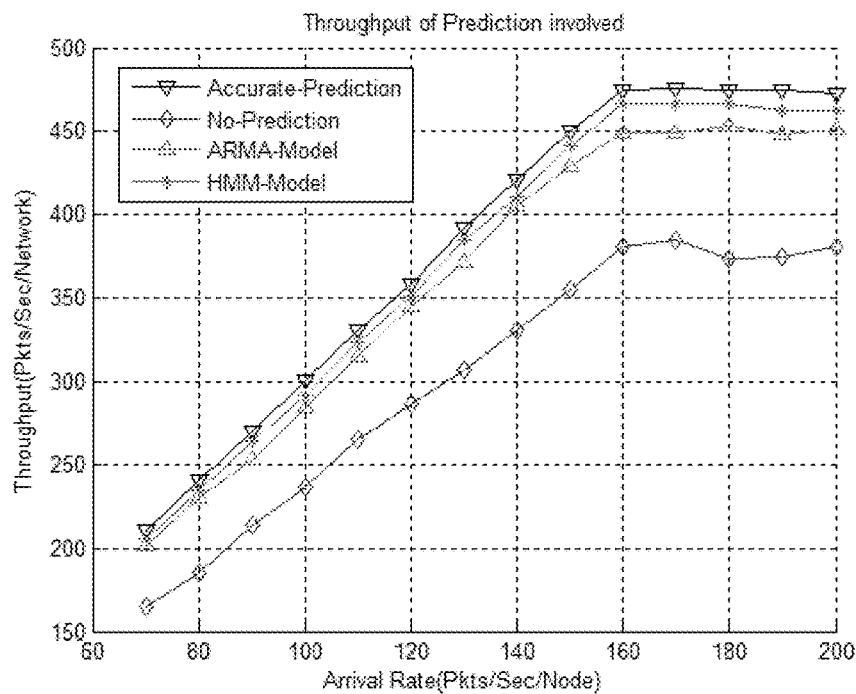
FIG. 36 shows the impact of using state prediction schemes (ARMA and HMM) on aspects of the disclosed implementation.

FIG. 36 shows the effect of using node state prediction schemes (including ARMA and HMM based prediction). Here the prediction schemes is applied to node mobility behaviors. That is, a prediction is provided for which beam a neighboring node will move to next, what is its traffic type and required airtime. For comparison purpose, a 100% accurate prediction case is provided (i.e., where the node moves to in the next time slot is always known). Both HMM and ARMA achieve a higher throughput than no-prediction case. This may mainly be because each node can prepare the data queue better after predicting the traffic profile and node mobility behaviors. For example, after knowing a node will move away from the current beam, the queue in that direction can be cleared. If it is know that a node will move to this beam and send out data, a proper length of queue can be allocated to fill in the "airtime" in that direction.

FIG. 36 also shows that both HMM and ARMA have the performance that may be closer to the ideal prediction case. But HMM outperforms ARMA in many cases since it can overcome the impacts of noisy, missing or even erroneous measurements. HMM can deduce the internal state from the inaccurate measurements. While ARMA simply thinks the measurement represents the internal true state.

Figure 37A:
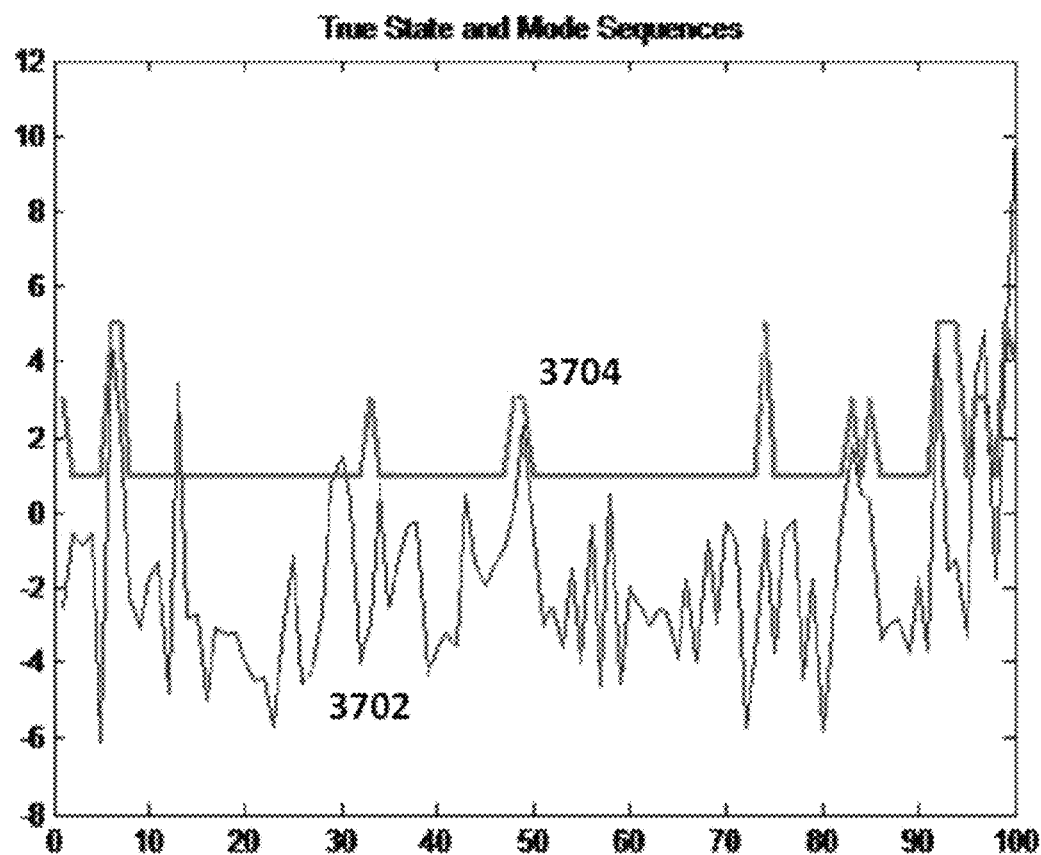
FIGS. 37A and 37B show (FIG. 37A) observations with state sequence (3702) and mode sequence (3702) and (FIG. 37B) observations of the sticky model.
Figure 37B:
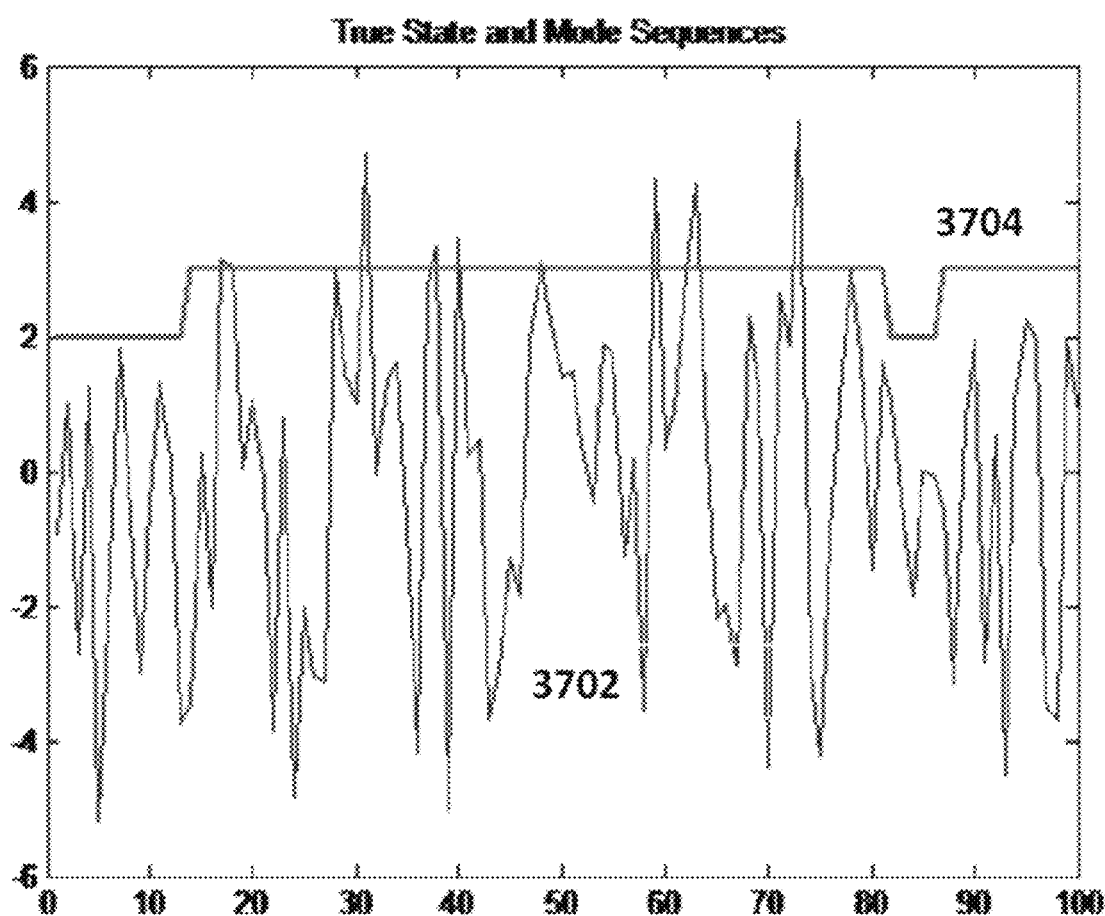

FIGS. 37A and 37B show the effect of using HDP-HMM to reduce the complexity of HMM-based prediction. Before using HDP (see FIG. 37A), there may be many states; after application HDP (FIG. 37B), similar states can be combined into one state, and thus reduce HMM state space. This largely shortens HMM state estimation time. In particular, FIG. 37A shows observations with state sequence (3702) and mode sequence (3702) and FIG. 37B shows observations of the sticky model.

Example—Heterogeneous Mac Design

Overview

Figure 38:
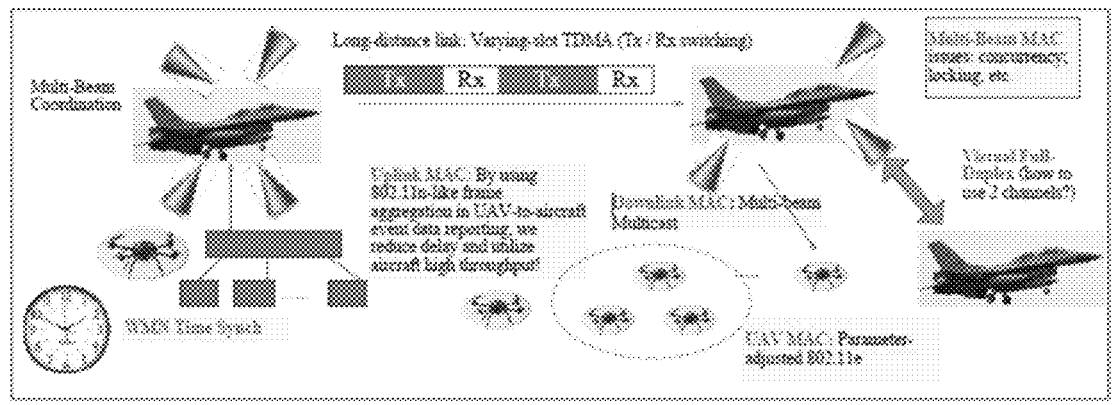
FIG. 38 shows one embodiment of a MAC solution.

An overview of one embodiment of a MAC design is shown in FIG. 38. This design follows three principles as described below:

Principle 1: Uplink MAC with frame aggregation can serve as the bridging point from the UAV network to the aircraft network. The UAV network has much lower data rate than the aircraft network due to two reasons: First, an UAV has much smaller size and more limited communication capability than an aircraft. The AMN can utilize the powerful aircrafts to perform the aggregation and analysis of UAV data, and then sends data to the satellite or the ground station. Second, the multi-beam antenna in each aircraft enables high-speed links (>10 Mbps in each beam). The aircraft can easily pump a big amount of data into the high-speed Ku-band links. To utilize the high-speed AMN links, the protocol overhead is reduced by aggregating UAV network packets into a larger packet when the UAV packets enter the aircraft network via the uplink MAC protocol.

Figure 39:
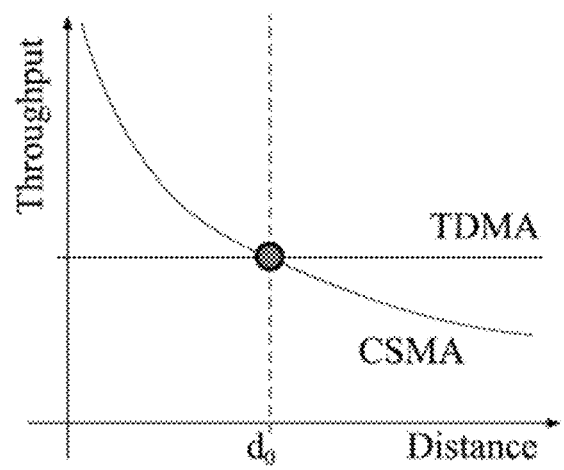
FIG. 39 shows throughput-distance for TDMA and CSMA.

Principle 2: The link distance determines the performance boundary of CSMA-based (random) MAC and TDMA-like (scheduled) MAC. When the link distance is too long (>50 km), the random access based MAC schemes cannot work efficiently since it is difficult to detect the radio signal collisions. As an example, suppose one node performs carrier sensing and believes that the channel is idle; however, the conflict can still occur since another node's signal may be still in fly, and it takes some time (>0.01 ms) for the signal to reach the current node. Also, the long ACK timeout makes the sender difficult to achieve high throughput since it will waste much time to wait for the ACKs. As shown in FIG. 39, when the link distance (d) is short (<10 km), CSMA-based MAC protocols (such as IEEE 802.11) achieve higher throughput and lower delay; when d is long (>50 km), CSMA seriously sacrifices the link throughput, and TDMA-like scheme is more suitable to such a long propagation delay since it can use a dedicated time duration for data transmissions.

Principle 3: The MAC scheme should fully explore the multi-beam capacity to improve the network throughput: The biggest benefit of multi-beam antennas is that the throughput for N times (in ideal case) can be improved if an antenna has N beams that all send out data at full capacity. If there is only one beam (i.e., single direction) of transmission, that particular link may get congested if the sending rate is too high. By distributing the data into N beams (directions), more neighboring nodes can be used to help forward data. If such a multi-beam data distribution is integrated with Rate-less codes (RC), high efficiency is realized since RC can decompose a packet into multiple pieces that go through the network in multiple paths.

Heterogeneous MAC Design—MAC for A2A: Multi-Beam, TDMA-Like (Scheduled) Communications Although long-distance wireless communications have been investigated in some works, especially in long-distance Wi-Fi (WiLD) for countryside networks, the system disclosed herein has a few challenging issues not considered in previous works:

(1) How to explore multi-beam antenna's benefits: Those long-distance MAC designs did not consider the use of multi-beam antennas. They assumed that either omni-directional or single-beam directional antennas were used. The disclosed network can use the multi-beam antennas to achieve concurrent Tx or Rx in multiple directions.

(2) How to overcome beam locking: Multi-beam antennas also introduce some special issues. One problem is beam locking, which means that one beam is still in Tx (or Rx) mode, which prevents other beams from switching to Rx (or Tx) mode.

(3) How to overcome ACK non-synchronization: When one beam has received ACK after sending a small packet, other beams may be still sending large packet (thus no ACK is sent back). This prevents the entire antenna from switching to Rx mode (for ACK).

(4) How to use detour beam to overcome Ku-band weakness: Unlike Wi-Fi signals that can pass through many obstacles (such as the human body), Ku-band signals are weaker to LoS blockage. Therefore, it is important to find detours to forward the data if the LoS beam does not have good signal quality. It is also important to coordinate all the neighbors in each beam in case a detour is needed. Multi-beam antenna provides a natural way to establish detour links. Later on we will discuss about the integration of multiple detour beams with Rate-less codes to improve the Ku-band throughput.

Below the basic A2A MAC scheme is introduced, and then a significantly enhanced scheme is described that overcomes the above mentioned issues. Please refer back to FIG. 38, which shows that an aircraft has a larger packet size after aggregating packets from the RoI nodes. FIG. 39 already shows that CSMA does not work well in long-distance links due to long propagation delay. Moreover, the large packet size (after packet aggregation) will have high collision rate if CSMA is used. (This is also the reason why most CSMA networks often use the packet size of 1,500 bytes only). Therefore, TDMA-like MAC is a better choice. Since the aircraft network is much sparser than the UAV network, it is easy to manage the slot allocation via a satellite-controlled global network management.

The disclosed A2A MAC is just TDMA-like, not conventional pure TDMA scheme, due to the following two reasons:

(1) Longer slot duration: Although we also define time slots and schedule different Tx/Rx phases, each phase (a slot) is much longer than the slot in conventional TDMA: instead of using only hundreds of micro-seconds (μs) as the slot length, each slot allocated to a Tx or Rx phase could be hundreds of milli-seconds (ms) long in order to handle the aggregated traffic coming from UAV RoI nodes.

Figure 40:
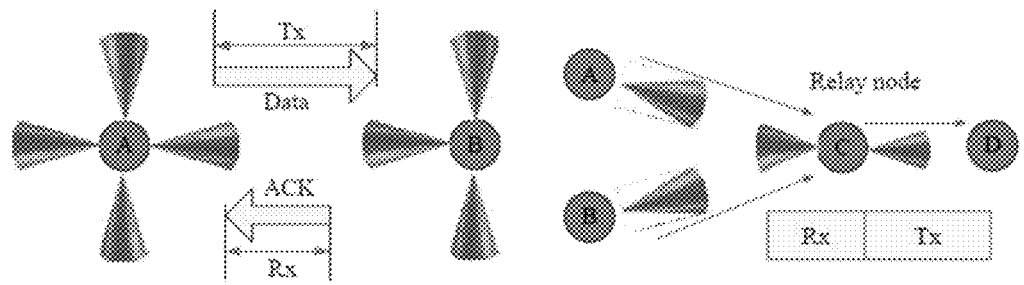
FIG. 40 shows examples of unequal-time Rx/Tx modes.

(2) Variable slot length: While traditional TDMA often allocates fixed-length time slot(s) to each node, here we use a variable-length Rx/Tx phase, which could be tens or hundreds of ms long depending on the amount of data to be handled in each phase. It will cause much delay if the multi-beam antenna frequently switches between Rx and Tx modes (it could take 1 ms to switch the mode in multi-beam antennas). Therefore, it is better to finish a window of packets in one slot (i.e., one Tx/Rx phase). The window size should be proportional to the traffic load in the node. FIG. 40 shows two cases that should not use equal sizes of Tx and Rx phases (Here the cone shapes represent antenna beam directions). The first case shows that the reverse direction has just tiny ACK packets, which means that node A should operate in Tx for a longer time than in Rx mode. The second case shows that an aircraft that relays data from two upstream nodes is supposed to spend double time in Tx than in Rx assume that A and B send out the same amount of traffic).

1) Time Efficiency:

Here a math model is used to explain the time efficiency (to be defined later) for the above TDMA-like scheme. Referring to FIG. 40, it is assumed that the time allocated to node C in Rx mode is $R_{x\_time}$ (it is used by C to receive data from both A and B). Likewise, the Tx time allocated to C (to send data to D) is $T_{x\_time}$. Tx/Rx mode switching time is denoted as $T_{switch}$. The ratio of the allocated $T_{x\_time}$ over $R_{x\_time}$, denoted as r, is:

$$r = \frac{T_{x-time}}{R_{x-time}} \quad (1)$$

To avoid congestion, the relay node is expected to work smoothly without accumulating packets in its buffer. Since C has two reception paths and only one transmission path, C may need more time to send out packets than to receive them (namely, r should be larger than 1). It is also assumed that the capacity of each link could be different. Link speeds in AC, BC, CD, are denoted as $L_1$, $L_2$ and $L_3$, respectively. Since part of the allocated time may not be used for actual data transmission (i.e., the node may not need such a long time in Tx or Rx), the actual transmission time within $T_{x\_time}$ is denoted as $T_{trans}$, and the actual reception time as $R_{trans}$. Then the time efficiency for the above TDMA-like MAC scheme is defined as:

$$E = \frac{T_{trans} + R_{trans}}{T_{x-time} + R_{x-time} + T_{switch}} \quad (2)$$

Within $T_{x\_time}$, the amount of data that node C is able to send out is $L_3 \times T_{x\_time}$. And the received data amount within Rx-time should be $(L_1+L_2) \times R_{x\_time}$. Here we consider two cases:

Case 1:

In node C, when the sent data (output) is less than the received one (input), that is, $(L_3 \times T_{x\_time}) < (L_1+L_2) \times R_{x\_time}$, we have:

$$r = \frac{T_{x-time}}{R_{x-time}} < \frac{L_1 + L_2}{L_3} \quad (3)$$

In this scenario data would have accumulated in C. One approach to solve this challenge is to decrease the amount of input data so that all the input data could be sent out in time. Since the link speed is fixed, we could only reduce the assigned Rx time to limit the input data amount. In the meantime, it is desired to make full use of the Tx link to get all data out. Especially, $T_{trans}$ and $R_{trans}$ can be set as:

$$T_{trans} = T_{x\_time} \quad (4)$$

$$R_{trans} = T_{trans} \times \frac{L_3}{L_1 + L_2} \quad (5)$$

Consequently, the time efficiency is $$E = \left(1 + \frac{L_3}{L_1 + L_2}\right) \times \frac{r}{r + 1 + c} \quad (6)$$

Here $$c = \frac{T_{switch}}{T_{x-time}}$$

is a rather small number (the allocated Tx time could be over 20 ms, while the Tx/Rx switching time is less than 1 ms). Thus it can be ignored, or treated as a small constant.

Case 2:

When $(L_3 \times T_{x\_time}) \geq (L_1+L_2) \times R_{x\_time}$, that is, the output data is more than the input in C:

$$r = \frac{T_{x-time}}{R_{x-time}} \geq \frac{L_1 + L_2}{L_3} \quad (7)$$

For this case, input (Rx) can be kept in full pipe status and increase Tx time, that is:

$$R_{trans} = R_{x\_time} \quad (8)$$

$$T_{trans} = R_{trans} \times \frac{L_1 + L_2}{L_3} \quad (9)$$

Thus the time efficiency is, $$E = \left(1 + \frac{L_1 + L_2}{L_3}\right) \times \frac{r}{r + 1 + c} \quad (10)$$

In summary, the overall time efficiency is expressed as:

$$E = \begin{cases} \left(1 + \frac{L_3}{L_1 + L_2}\right) \times \frac{r}{r+1+c} & \text{if } r < \frac{L_1 + L_2}{L_3} \\ \left(1 + \frac{L_1 + L_2}{L_3}\right) \times \frac{1}{r+1+c} & \text{if } r \geq \frac{L_1 + L_2}{L_3} \end{cases} \quad (11)$$

From the above formula, it can be seen that when $r=(L_1+L_2)/L_3$, E gets the maximum value. In other words, the peak value of time efficiency occurs at a specific r point.

2) Aircraft MAC Operation Phases:

It is assumed the entire aircraft network is time synchronized by the synchronization scheme described herein. If those aircraft are equipped with GPS (which is true in most aircraft networks), those nodes can easily synchronize their clocks in μs level. Each aircraft operates in Tx or Rx phase. Each phase is called a superframe in the disclosed MAC protocol. As mentioned before, each superframe does not necessarily to have the same time durations since an aircraft could have different traffic loads each time. A superframe may handle dozens or even hundreds of packets. A gateway node, selected from the aircraft network, collects the data request information from each node and then notifies them the transmission schedule. There is a short guard time between two superframes, which accounts for the overhead in the gateway, such as the local traffic processing time, radio propagation time, etc.

Figure 41:
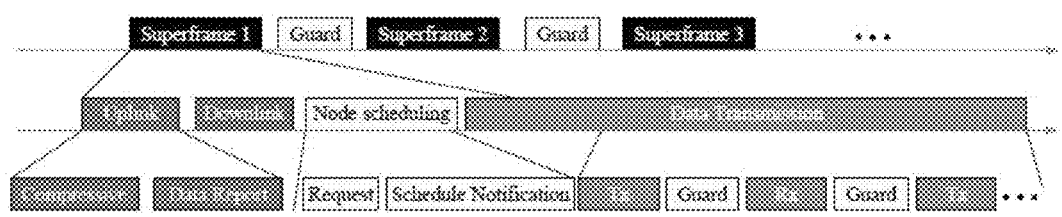
FIG. 41 shows exemplary operation phases in an aircraft.

As can be seen from FIG. 41, a superframe consists of (1) Uplink phase: The RoI nodes first use compressive sensing scheme to report their transmission durations to the aircraft, which then receives the aggregated data from RoI nodes; (2) Downlink phase: The aircraft uses this phase to send out control messages (such as data polling request) to the RoI nodes via multi-beam multicast operations; (3) Node scheduling phase: Each aircraft sends a tiny message (thus they can easily get through the network) to the gateway. Such a message tells about its transmission request, and includes required Tx time and QoS parameters. Then the gateway notifies each node about their Tx and Rx schedules. Note that each node just needs to report Tx time instead of Rx, since other nodes may have data for this node (thus by default this node's Rx time is known). (4) Data Transmission phase: This includes alternate Tx and Rx modes with guard time between them (to account for multi-beam antenna switching delay and other processing time).

(1) Node Scheduling Phase: After a gateway node receives the data request from each node, it can simply determine each node's transmission order based on a hash function with the input parameters of node ID and the timestamp:

$$\text{Order}(i)=\text{Hash}(ID(i),\text{timestamp}), i=1,2,\ldots,N \quad (12)$$

Here the hash function is a special function with the result between 0 and 1. Timestamp is the current clock time in the whole network. Using timestamp as a seed, the result becomes a random value. A node with ID=J is the winner of the current transmission cycle if it gets the maximum hash value:

$$\underset{1 \leq x \leq N}{\arg\max} \text{Hash}(ID(i), \text{timestamp}) = J \quad (13)$$

Figure 42:
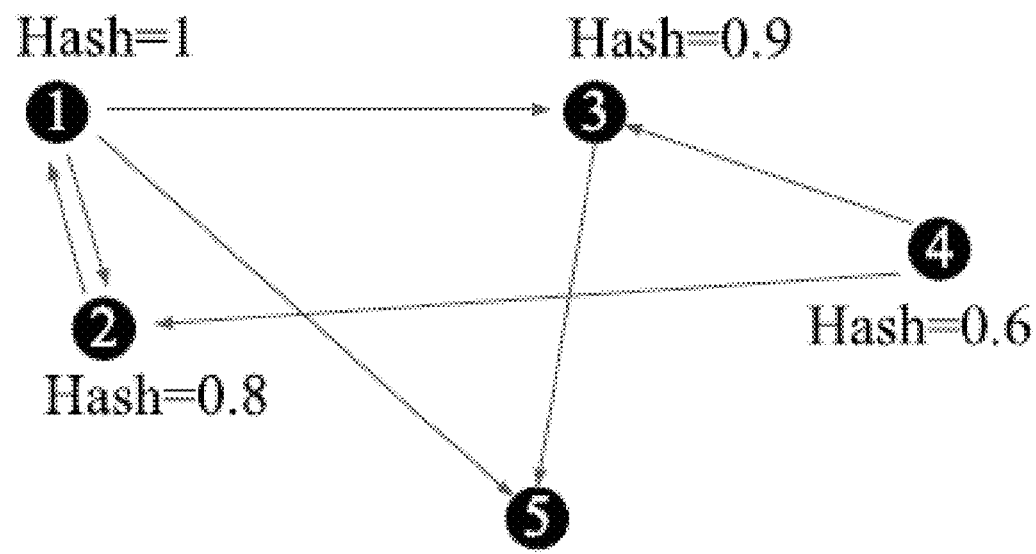
FIG. 42 illustrates an exemplary hash function based node Tx priority.
Figure 43:
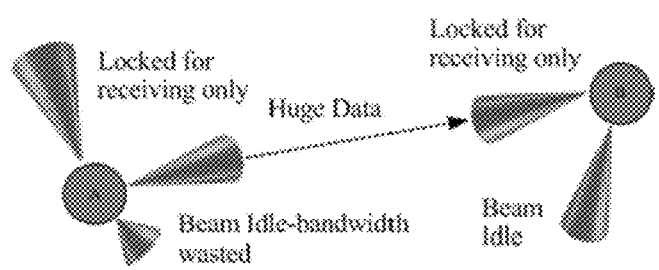
FIG. 43 illustrates an exemplary beam locking issue.

If a node is the winner, its data can get out first. As shown in FIG. 42, node 1 has the maximum hash value (=1), it will use 3 beams to concurrently send out data to nodes 3, 2, and 5. Note that in the meantime node 4 can send data to node 2 since node 2 is in Rx mode anyway. After node 1 finishes Tx phase, it immediately enters Rx mode. In FIG. 43 it can be seen that node 2 can now send data to node 1.

To determine which node should transmit data next after node 1 finishes Tx phase, the second highest hash value can be checked and let it transmit data (in FIG. 43, it is node 3). Likewise, the third highest hash value can be checked, and so on.

Node priority: If different nodes are assigned different weights ($\omega_i$) to reflect their QoS demands and node priorities in an aircraft network, we can use the following hash function to calculate the winning probability of any node with ID(i):

$$P_i = \text{Hash}(ID(i),t)^{1/\omega_i}, \Sigma_i \omega_i = 100\%$$

The reason of using the above exponential format is because the winning probability of a node i is proportional to its weight percentage, that is:

$$P\left[\underset{1 \leq n \leq N}{\arg\max} \text{Hash}(ID(n), t) = i\right] = \frac{\omega_i}{\sum_{n=1}^{N} \omega_n} = \frac{\omega_i}{100\%} \quad (14)$$

Therefore, a node with higher weight will have higher chance to get the maximum hash value (=1).

Figure 44:
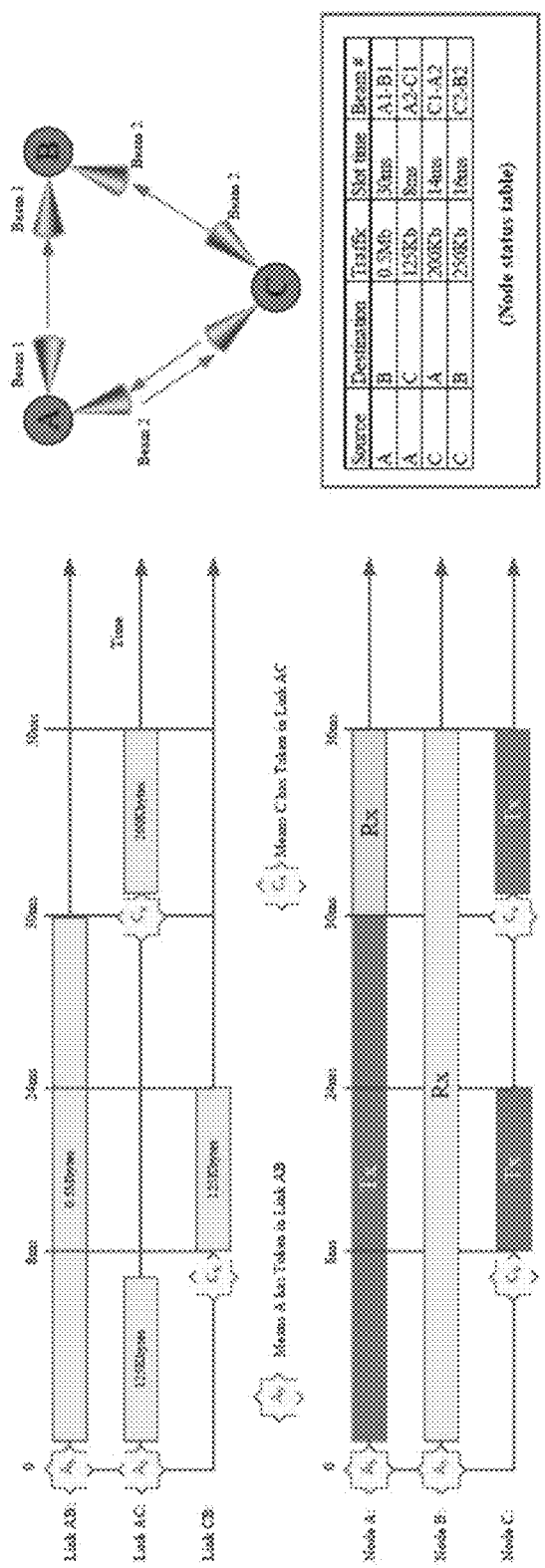
FIG. 44 illustrates an example of detour beams to overcome beam locking.

(2) Data Tx/Rx Phase:

after the gateway node notifies each node about its Tx/Rx schedule, the nodes enter TDMA-like, scheduled communications. The gateway arranges the nodes' Tx/Rx modes based on a token-based, pipelined transmission (see FIG. 44). It follows 3 rules as below:

Rule 1: Multi-beam antenna oriented transmissions: Any node can use all of its beams to concurrently transmit or receive data. In FIG. 44, if node A is scheduled to send out data with higher priority (based on the above hash results), it should communicate with both B and C at the same time instead of just one of them. Otherwise, node A wastes its multi-beam capacity. Even though A-C link time is shorter than A-B time, A cannot switch to Rx mode until it finishes the longest Tx duration (here it is A-C link).

Rule 2: Token control: In any link (say A-B), there is a unique token (a tiny control message). A node cannot enter Tx mode until it has held the token for that link. The token ensures that a node alternates between Tx and Rx modes (i.e., accessing the channel in a TDMA-like pattern).

Rule 3: Pipelined scheduling: As can be seen from FIG. 44, although A cannot switch to Rx mode due to the longer Tx time in A-B link, it allows C to enter Tx mode after A-C transmission is done. Therefore, C can start to transmit data to B after 8 ms. Such a scheme makes the described MAC efficiently utilize each free link.

In addition, FIG. 44 also shows that a gateway maintains a node status table, which has the profile information on traffic to be sent in each beam of a node. The gateway does not need to broadcast such a table to each node. It just needs to tell a node about its specific Tx/Rx timing information as well as the MAC address of its destination (when in Tx mode) or source (when in Rx mode). A node can use neighbor discovery process to easily find out which neighbor can be reached in which beam. For example, a notification message may have the following fields: 0 ms, To B; 1.1 ms, From C; 1.5 ms, To D; . . . .

3) Handle "Beam Locking" Issue:

Although multi-beam significantly improves a node's capacity by pushing data to multiple directions simultaneously, there exists the beam locking issue.

As shown in FIG. 43, node A has a big amount of data to be sent in a particular beam. The entire node is locked in Tx mode, and other beams cannot receive data (i.e., enter Rx mode) even though they have finished Tx phase. This is because that they are waiting for the ending of the big data beam in node A. Node B is also locked (in Rx only) since one of its beams continuously gets data from A. As mentioned before, A2A MAC does not use conventional TDMA concept that uses small, equal-length time slots for the transmission of very few packets in each slot. Instead, the disclosed scheme can flush out many packets in an allocated Tx slot. If one beam has much longer Tx slot than other beams, the beam locking problem arises.

Figure 45:
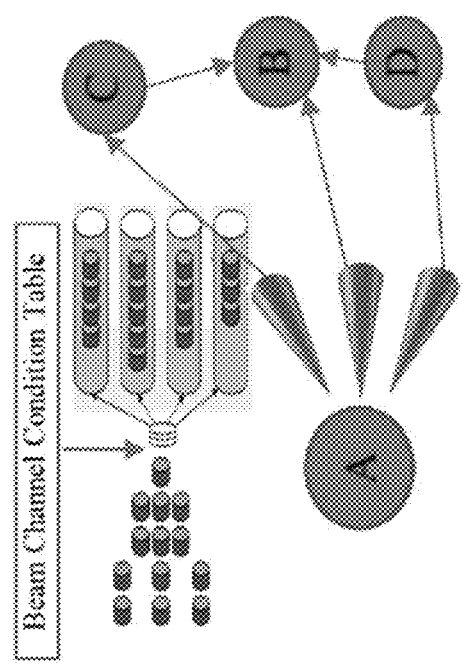
FIG. 45 illustrates an example of a multi-beam scheduled transmission process.

To avoid such an issue, the detour beam concept is described. As shown in FIG. 45, each node maintains a table called beam channel status table (BCST). The BCST includes not only its own channel quality (measured in SNR or BER) in each beam, but also the channel conditions in the nodes that are the neighbors of both itself (node A) and the destination (node B). For example, nodes C and D all have beams facing B. Nodes C and D are called detour nodes. Then node A's BCST should maintain the channel conditions in C-B and D-B links. The channel conditions in each link can be easily measured from history transmissions in previous Tx modes. It is an average value over the past certain number of slots. Since the latest SNR/BER values are more important, the following formula can be used:

$$LQ(beam_m) = \frac{(1-\alpha)\left(\sum_{i=1}^{N-1} BER(i)\right)}{(N-1)} + \alpha \times BER(N) \tag{15}$$

Here $LQ(Beam_m)$ means the link quality in $m^{th}$ beam, and $0<\alpha<1$ is the weight factor. A high $\alpha$ value means that we pay more attention to the latest BER value. This is especially helpful for time-varying fading channels since the historical average may not reflect the recent channel state (at time N−1). A low $\alpha$ value means that we prefer to take the average historical BER as the measure of channel quality. Based on the beam link quality estimation results, the node distributes the remaining data of that particular beam to other beams. The distribution amount is proportional to the beam link quality. But other beams that get allocated traffic will not continuously send out data to its corresponding neighbors (here they are C and D). Instead, they send some packets for a short time (called detour time window, around 5 ms), then pause for a short time (<0.5 ms). The exact number of packets in each window depends on the packet size and sending rate, as well as the relationship between transmission delay and propagation delay. If the sending rate is high, the transmission delay is short. Then more packets can be sent in each detour window.

As a concrete quantitative example, suppose the propagation delay in each link is around 0.5 ms, the transmission delay of each packet is 0.05 ms, the detour window size can be set to around 4 to 6 packets. Using 4 packets is safer, since there is a need to give the detour nodes (C or D in FIG. 45) some time to switch from Rx to Tx, send data to B, and then switch back to Rx, to continue to get data from A.

4) Window ACK and Selective Retransmission:

The long-distance link causes the conventional 802.11 protocols to have low throughput due to frequent ACK timeouts. For example, for a 1500-byte packet, and a 100M bps link rate, it takes 1500×8/20M=0.12 ms (transmission delay). For a 150-km link, round trip time (RTT)=2×150 km=(3×10$^8$)=1 ms, which can be used to transmit 8 packets. The disclosed scheme assumes the use of alternate Tx and Rx slots. And in each Tx slot the whole window of packets can be flushed out. Obviously, if a conventional 802.11 send-and-wait scheme is used, that is, the next packet is not transmitted until the ACK for the last packet arrives (see FIG. 46A), it will waste a large amount of time due to the big gap between two transmissions. A worse thing is that frequent ACK timeouts will occur (802.11 scheme sets up ACK timeout based on practical Wi-Fi link distance, which is typically less than 300 m), and thus many retransmissions can occur. This can waste much network bandwidth.

Window ACK (i.e., sending back only one combined ACK for the whole window of sent packets) can be used to overcome the above issue. As shown in FIG. 46B, (assume a RTT with 1 ms), aggregated ACK can be used (all ACK packets are combined into one) for the whole window of packets. Moreover, selective transmission is used, which only retransmits the missed packets. And the ACK timeout value is set as:

$$ACK_{timeout} = RTT + 2 \times T_{local} + T_{trans} + T_{margin} \tag{16}$$

Here $T_{local}$ is the local processing time in each node (including operating system time, protocol overhead, physical layer processing, etc.). $T_{local}$ is the transmission delay (=data amount/link rate). $T_{margin}$ is the miscellaneous delay from other factors, such as queueing, Tx/Rx switching, etc.

5) Handle ACK Non-Synchronization Issue:

This issue is related to the above beam locking issue. It can occur in the following two cases: (a) many-to-one, and (b) one-to-many transmissions, as illustrated in FIG. 47.

In either case, as long as there is significant difference among beam link qualities or sending rates, an ACK non-synchronization problem could exist. This is because any multi-beam node cannot switch Tx/Rx modes until it has finished all data transmissions in all beams. In Case (a) (FIG. 47), node C cannot send ACK back until it has finished Rx phase. However, the slow rate in the poor-quality channel (which is the A-C link), makes C unable to switch from Rx to Tx until its data is finished. But the ACK transmissions require that node C switches from Rx to Tx. Since node B may set up a fast ACK timeout due to its good link quality (in link B-C), it cannot wait so long. Thus it will have one or multiple ACK timeouts and then performs unnecessary retransmissions.

To overcome the above issue, the following solution is described: (1) first, each link should estimate its link quality based on the receiver's feedback. For example, node C in Case (a) can piggyback the BER value in its ACK packets. Then each sender should adjust its sending rate and traffic load in order not to hold the channel for too long. (2) Second, it is required that all senders use an ACK timeout value not based on its own channel quality. Instead, they use the maximum possible RTT value among all links. By this way we can avoid the ACK timeouts in fast channels.

6) Explore Multi-Beam Relay Via Enhanced Fountain Codes:

Also disclosed is the benefit of multiple beams by integrating multi-beam transmissions with priority-aware Raptor codes, to achieve real-time, reliable data transmission.

As shown in FIG. 48, Unequal Error Protection (UEP) based Raptor codes can use outer/inner encoding schemes to protect different data flows with multiple priorities. The higher priority packets have more coding redundancy to achieve a higher reliability (i.e., with stronger packet recovery capability in the receiver side). Then those encoded packet pieces are dispatched to different beams of a node. The beams with better link quality (lower BER) are allocated with more of higher priority packet symbols.

In general Raptor codes, the packet is decomposed into pieces (called symbols). Those symbols pass an outer encoder (typically a LDPC code), and then pass a weakened LT code as the inner code. They can be parameterized by (K, C, Θ(x)), here K means the number of the source symbols, C is the outer code result (with block size L). Thus, we have L intermediate symbols after outer encoder. The last L-K symbols are redundant symbols. Θ(x) is the degree distribution of LT codes. The L intermediate symbols are encoded with LT code to generate N encoded symbols. Those N symbols pass the lossy wireless channel. Even some of them are lost, the original K source symbols can be recovered as long as enough number of symbols are received. Assume $N_r$ is the number of received encoded symbols. The decoding failure probability, $P_e(\xi_r)$, is very low. Here $\xi_r=N_r-K$ reflects the encoding overhead (redundancy level) of Raptor codes, and we have:

$$P_e(\xi_r)=0.85\times 0.567^{\xi_r} \quad (17)$$

The average received overhead ρ, is the percentage of the extra added symbols among the source symbols. It is:

$$\rho = (1/K)\sum_{i=0}^{\infty} (i\cdot(P_e(i-1)-P_e(i))) \approx 2/K \quad (18)$$

As can be seen, just 2 extra symbols are used to achieve a nearly 100% success recovery rate since the extra added symbols (in average) should be: K×ρ=2.

In the disclosed priority-based Raptor codes, more extra symbols are generated for higher priority symbols, and those symbols should be sent by the beam with higher link quality. Suppose $L_1$ represents the highest priority, $L_2$ the second, and so on. And there are $K_i$ source symbols with priority $L_i$. Also denote $\xi_r(K_i)$ as the number of extra symbols for priority $L_i$. Then the minimum coding overhead $\rho(K_i)$, which is the percentage of extra symbols among the total source symbols for priority $L_i$, should be:

$$\rho(K_i) = \frac{K_i \times PER + \xi_r(K_i)}{(1-PER)\times K_i} \quad (19)$$

Here, PER is the packer error rate (PER). The disclosed UEP-based Raptor coding scheme can use PER feedback from the receiver to adaptively adjust the overhead of Raptor codes for data with different priority levels. The higher priority symbols can be dispatched to the beam with better link condition in that direction.

Heterogeneous MAC Design—MAC For U2U Links: Parameter-Adjusted 802.11e Enhancement The UAV network has much higher density than the aircraft network, and the above TDMA-like MAC is difficult to manage since distributed TDMA in a large-scale UAV network needs a global coordinator as well as an accurate timing synchronization scheme among many UAVs. Moreover, the data exchange among UAVs is not very often since most times they just send data directly to the higher-level aircrafts. Thus using dedicated time slots could waste much bandwidth in the UAV network. Random access MAC (such as CSMA-based one) is a better option since it does not need a global schedule manager, and the short UAV links (~10 km) will not bring many signal transmission collisions due to its short propagation delay this is different from the long aircraft links).

In FIG. 39, the advantage of CSMA scheme in shorter links has been illustrated. CSMA-based scheme just simply asks each node to try its luck: as long as the medium is idle, data can be sent out. Since the UAV links can be up to 10 km long, general 802.11 protocols cannot be used. Some important MAC parameters (such as ACK timeout value) need to be adaptively adjusted based on the link states.

Therefore, IEEE 802.11e protocol is proposed to support U2U communications. The 802.11e has an improved DCF mode (compared to 802.11b) for better QoS support. However, 802.11e does not support 10 km links well due to its assumption of 300 m Wi-Fi coverage. It also does not have efficient support of directional antennas. Since UAVs could be equipped with single-beam antennas, deafness and capture issues have to be solved in the enhanced 802.11e.

Figure 49:
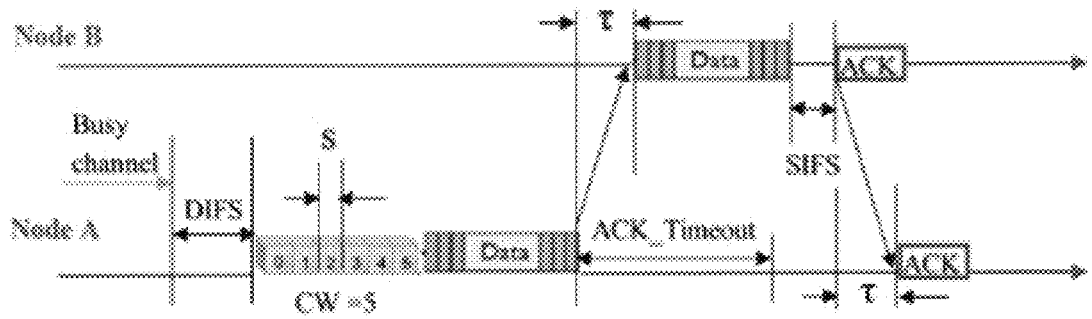
FIG. 49 illustrates an example of different CSMA time durations during DATA/ACK transmission.

First, some popular parameters used in 802.11 protocols are reviewed. As shown in FIG. 49, when node A has a DATA packet for node B, it first listens to the channel. It must finish the channel sensing within DIFS (Distributed Inter Frame Space). If the channel is busy, it enters a backoff waiting phase. The duration of waiting time is called a CW (contention window). It consists of a series of small time units, called Slot Time (S). This is the quantum (minimum time unit) for defining other durations (such as DIFS). S is PHY-dependent constant. In 802.11b it is 20 μs, while in 802.11e it is only 9 μs. Note that S is different from general time slot length. Here S is a shorter time unit than general TDMA slots (>100 μs) or Tx/Rx durations (>20 ms).

In FIG. 49, τ is the propagation delay (light speed). 2τ is the RTT. After node B receives DATA, it sends out ACK after SIFS (Short Inter Frame Space). SIFS separates the end of the DATA reception and the start of the ACK transmission. Note the following relationship:

$$\text{DIFS}=2\times S+\text{SIFS} \quad (20)$$

As can be seen from FIG. 49, conventional 802.11 standards set up ACK timeout value based on short Wi-Fi link distance (<300 meters). For longer U2U links, frequent ACK timeouts will occur, and then node A will retransmit the frame after the timeout.

The 802.11 protocols assume that the signal propagation time, which is defined in AirPropagationTime variable, has a maximum value of 1 μs (only enough for 150 m). When ACK timeout occurs, the default maximum retransmission times is 7. IEEE 802.11 uses RTS/CTS to handle hidden terminal issue. The RTS sender waits for CT timeout interval for the return of CTS. Again, CTS timeout can occur when the distance is too long. And the maximum repeated RTS retries is 4 times by default.

Figure 50:
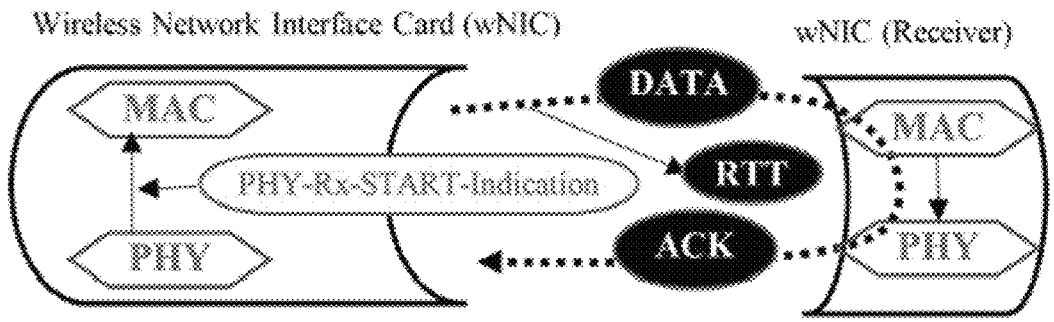
FIG. 50 illustrates an example of a calculation of ACK timeout.

1) Adjustment of ACK Timeout: The latest 802.11 standard recommends that ACK timeout should include the following 3 components: (1) SIFS. The receiver needs a minimum of SIFS between the reception of DATA and the ACK feedback; (2) SSTD (standard slot time, 9 μs in 802.11e); (3) PCLP (Physical layer convergence procedure), this refers to the processing overhead of PHY-to-MAC data passing (in the sender) and the overhead from MAC to PHY (in the receiver). 802.11 requires that the PHY layer passes an aPHY-RXSTART-Indication message to MAC layer before ACKTimeout expires (FIG. 50). Otherwise, the ACK will be discarded. 802.11 expects that the RTT is less than 1 μs. But it also recommends the margin of 5 μs for the CCA (Clear Channel Assessment). Here CCA time is the sum of all times except light propagation delay. 5 μs is good for 750 m of light propagation. Therefore, the standard ACKTimeout value is not enough for U2U links longer than 750 m. Thus adjust 802.11e ACKTimeout value as follows:

$$\text{ACKTimeout}=\text{SIFS}+S_{STD}+\text{PCLP}+\text{RTT} \quad (21)$$

2) Adjustment of the Slot Time: The motivation of defining slot time (S) is as follows: if two nodes transmit data in different slots (maybe those two nodes have the maximum distance to each other, which is around 750 m in 802.11), they should have enough time to detect signal collisions, and then freeze and back-off to avoid the collision. Therefore, the slot time S should be at least larger than the sum of the following components: (1) time to allow CCA, (2) Tx/Rx switching delay, (3) the light propagation time (single-trip, for signal collision detection), and (4) local protocol (MAC/

PHY) processing delay. Again, it is assumed that CCA is the sum of all times except the light propagation time. Therefore, S>(RTT/2)+CCA.

Figure 51:
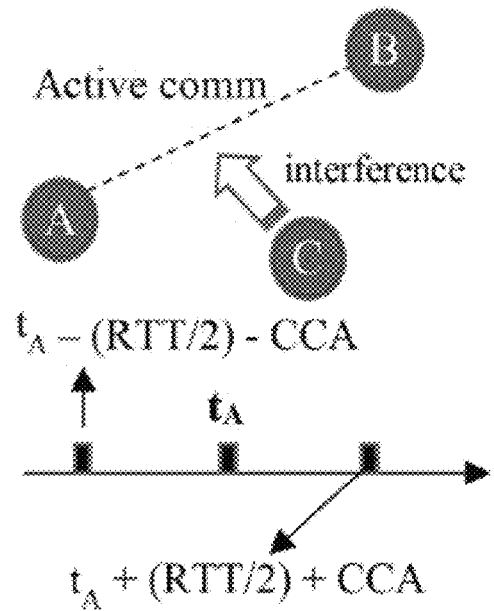
FIG. 51 illustrates an example of adjusting a time slot.

In practical design, the constraint of S should consider the impact of the interference on the ongoing link. As shown in FIG. 51, suppose node A sends out DATA at time $t_A$. The collision can occur under two cases: (Case 1) If C sends data before A, and is in an interval $[(t_A-RTT=2-CCA), 0]$, then A's transmission at time $t_A$ can cause collisions to C's data; (Case 2) If C sends data after A and is in the interval of $[(t+A+RTT/2+CCA), 0]$, then C can cause collisions to A's data. Therefore, the slot time S should be at least larger than the duration $[(t_A-RTT/2-CCA), (t_A+RTT/2+CCA)]$, in order to make sure that one node does not cause collisions to another one. Therefore, $$S > (t_A+RTT/2+CCA)-(t_A-RTT/2-CCA) \quad (22)$$

which means:

$$S > RTT+2 \times CCA \quad (23)$$

3) Adjust DIFS: The purpose of setting SIFS and DIFS is to separate the transmission times between DATA, ACK, PCF control frames, and DCF data frames. It can prevent the collisions between the transmission of DATA and the reception of ACK. DIFS is longer than SIFS. Since it needs to consider the waiting time of ACK (for the last DATA frame), it needs to be longer than RTT. Therefore, after the slot time (S) is adjusted based on the above formula, the DIFS can be adjusted based on 802.11 recommendation: DIFS=SIFS+2× S.

Figure 52:
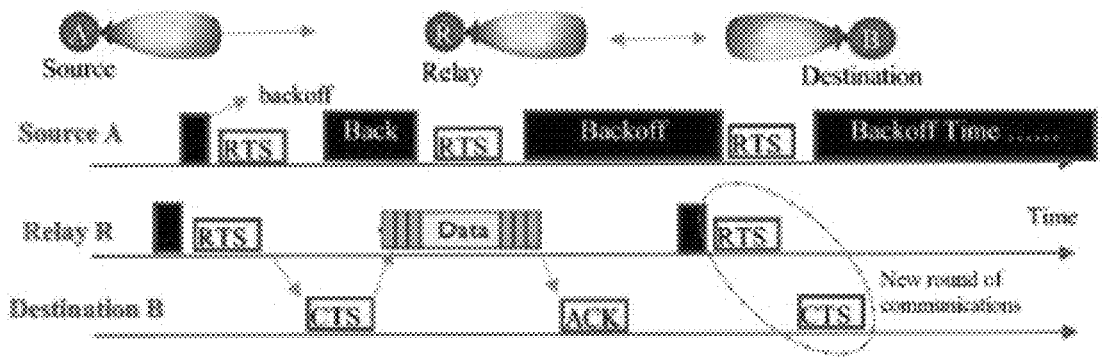
FIG. 52 illustrates an example of deafness experienced with directional antennas.

4) Deafness Avoidance for UAVs with Single-Beam Antennas: MAC design under single-beam directional antennas has been studied for some years. Deafness is a serious issue in directional MAC. Assume a 3-node communication scenario as shown in FIG. 52. When a source (node A) wants to send data to the destination (node B), it needs the help of a relay node (R). Ideally, R alternates between A and B, in other words, R talks with A to get some packets, then changes its antenna direction to talk with B to relay the data.

However, the deafness can occur as follows: when R uses 4WH (4-way handshake: RTS/CTS/DATA/ACK) to talk with the destination B, the source A tries to hold the relay node R after it finishes one round of 4WH. However, when A tries backoff a few times (because it cannot receive CTS from R), its backoff window can become large. As shown in FIG. 52, when it finishes the long-time backoff, and sends RTS again to R. Thus R maybe get engaged again with B for a new round of communications. R's single-beam antenna still faces B. Thus A will not be able to communicate with R.

The real issue is that R's single-beam antenna always faces B during its 4WH communication, and A does not know what time R finishes its 4WH. A's backoff window gets exponentially increased each time that R's antenna is not facing itself (no CTS is sent back to A).

Note that deafness issue can cause cascading effect since the higher layer (such as TCP) may think the link has congestion and stops to send out new packets. Deafness can cause path delay chain effect (i.e., increasing the accumulative delay after multiple hops) in large-scale networks.

Figure 53:
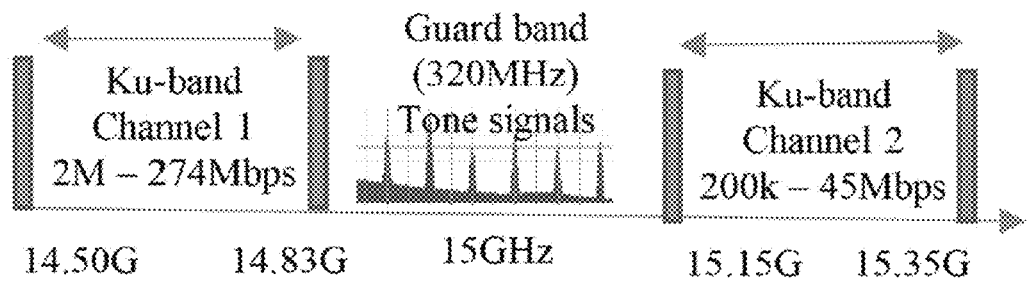
FIG. 53 illustrates an example of Ku-band allocations.

A solution to R's antenna deafness is to utilize a low-cost analog signal detection technique, called tone-based energy detection. Tone signal is not a digital signal. It can be broadcasted via low-cost analog circuit. And any nearby node can easily detect such a narrow-band analog signals with specific frequency ($f_{tone}$) and a narrow bandwidth ($B_{tone}$, less than 1 KHz). Such a narrow-band tone does not need to pass demodulator and decoder since it is not a digital signal. In targeted airborne network applications, it has been noticed that the CDL (common Data link) at Ku-band has enough unused bandwidth for the generation of multiple tone signals. As shown in FIG. 53, CDL divides Ku-band into two channels: channel 1 (14.50-14.83 GHz) and channel 2 (15.15 G-15.35 GHz). There is over 300 MHz of guard bandwidth (14.50-15.35 GHz) between those two channels. Today, many standards are underway on the use of such a wide guard bandwidth for other purposes.

As described herein, multiple tone signals are generated in such a band. And each RoI node is asked to maintain a table that holds the mapping relationship from a tone signal $[f_{tone}, B_{tone}]$ to a node ID. The RoI node can broadcast such a tone identification table to its nearby UAVs. Thus each UAV knows which node ID launches each tone after using a simple analog circuit to detect the tone energy.

Figure 54:
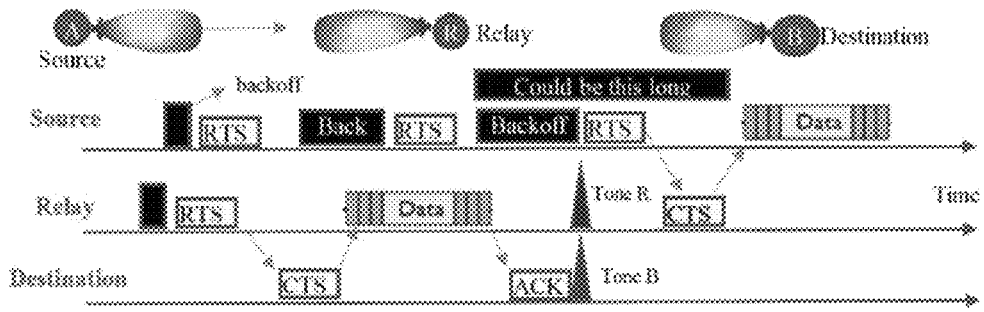
FIG. 54 illustrates an exemplary method to avoid deafness via Ku-band tones.

In the disclosed scheme, as shown in FIG. 54, each time a sender-receiver pair finishes a 4WH round, they can immediately launch a tone signal. Then the source node can detect those tone signals even when it is in backoff state, since the tone signal just needs analog circuit to detect the signals. Then S can terminate its backoff phase earlier, and issue a RTS for R. It thus has a higher chance to capture R than the case shown in FIG. 52. Note that in UAV network each node has a low-cost omni-directional antenna to detect the incoming traffic from all 360° directions. R can capture A's RTS and turns its single-beam antenna to A. Then A sends data to R, which later on relays the data to B.

Heterogeneous MAC Design—MAC for Aircraft-UAV Links: Frame-Aggregated, Compressive CSMA Communications The critical links in the airborne network are the ones between aircrafts and UAVs since those links deliver surveillance data via uplinks (U2A) and command data via downlinks (A2U). An aircraft keeps certain time in each of its operation phases for uplink and downlink communications (refer back to FIG. 41).

1) Uplink Transmission (U2A—from UAVs to the aircraft): There are some challenging issues in uplink transmissions, especially about the polling of each RoI UAV to collect their data transmission requests. There could be dozens of (or even more) RoI nodes in the broadcast coverage of an aircraft. If the aircraft simply polls each RoI node one-by-one to ask whether they have data to send, it will waste much time and cause high protocol overhead, especially when there are many RoI nodes. Moreover, those RoI nodes cannot send out their requests simultaneously. Otherwise, there will be many collisions since those nodes generate RF interference to each other. Although 802.11 can use backoff scheme to reduce collisions, when there are many RoI nodes, the CSMA scheme seriously degrades the link throughput. In other words, CSMA does not scale well with the UAV network size due to its random access nature and exponential backoff scheme.

To quickly collect different RoI nodes' requests, compressive sensing (CS) concepts are used to allow concurrent, uplink request transmission among large amount of RoI nodes. CS-based MAC has been shown to be able to significantly reduce the data polling time in a large-scale wireless LAN. This is mainly because CS scheme can simply ask all nodes to send out analog (instead of digital) signals in the air, and then the aircraft can use signal reconstruction to recover the original analog signal vector. Since analog signals are used to send out requests, those signals could simultaneously propagate in the air. And the aircraft can use CS signal reconstruction (again, this is analog operation) to recover the RoI requests. Thus there is no need to worry about the signal collision issues in the air. It is a concurrent transmission (thus it is fast). And the aircraft can quickly handle the signals since analog signals do not need digital signal processing (such as demodulation, decoding, etc.)

Figure 55:
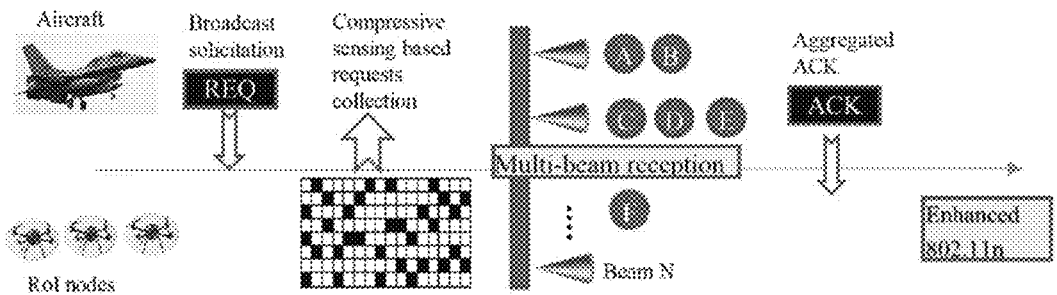
FIG. 55 illustrates an example of compressive sensing based request polling in an uplink.

Particularly, a CS-based uplink data collection scheme is disclosed as shown in FIG. 55. When the aircraft enters uplink transmission phase (FIG. 41), it first uses an analog tone with the central frequency of 14.95 GHz as well as a narrow bandwidth of only 1 Khz, to tell all covered RoI nodes that they can send out requests after DIFS time. Then all RoI nodes just send out uplink requests in compressive analog signals. The aircraft performs compressive signal reconstruction to recognize which nodes have data to report, and then prepares reception queues and schedule for those nodes. Such a schedule information is broadcasted to all nodes. As shown in FIG. 55, since the multi-beam antenna allows simultaneous reception in all directions, beam-by-beam polling can be avoided. If there are multiple nodes in any beam, the previously broadcasted schedule information tells which node should go first in that multi-request beam. Finally, the aircraft broadcasts an aggregated ACK, which tells what requests have been successfully received from which node IDs.

Figure 56:
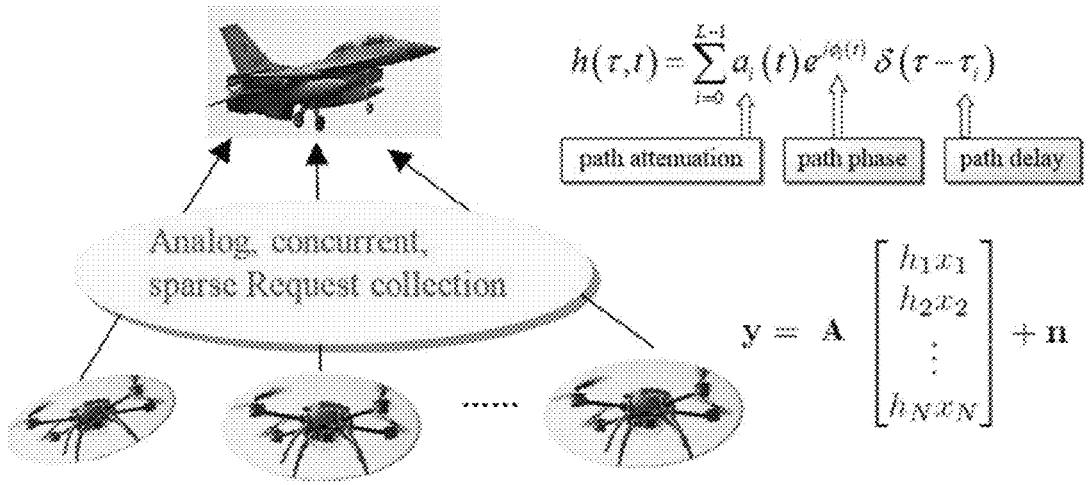
FIG. 56 illustrates an example of the principle of compressive sensing based signal collection.

The compressive request signal model is shown in FIG. 56. Here $h(\tau, t)$ is the channel impulse response function for each U2A link. $X=[x_1, x_2; \ldots, x_N]$ is a binary signal vector. When a node has data to report, $x_i=1$; otherwise 0. Note that it is not needed to know the exact math model of $h(\tau, t)$ since it has only two cases: zero (no request), and a non-zero value (with request). Therefore, a simple threshold detection can find which nodes have data requests. In FIG. 56, A is compressive sensing measurement matrix (also called sensing matrix). As long as the sensing matrix A meets restricted isometry property (RIP), the signal X can be recovered, which is a sparse signal with sparsity K, that is, it has only K significant elements. This fits practical airborne surveillance application where only a small amount of RoI nodes have important RoI data to report. For example, a UAV stores most sensing data locally. Only when it detects an abnormal event (such as an environment intrusion event), it will immediately tell its RoI node. In FIG. 56, n is the noise vector. $l_1$-norm can be used to recover X to know which nodes have requests:

$$\min_{x \in R^N} |X|_{l_1}, \text{ s.t. } Y = AX \tag{24}$$

Note that the UAV nodes typically forward small-size packets (<2 Kbytes) to the RoI nodes. And the A2A links have much higher capacity (>10 Mps in each beam) than U2A links. Therefore, packet overhead can be reduced by concatenating multiple payloads together into one payload (see FIG. 40). This way the percentage of the packet header can be reduced in the whole packet. The latest IEEE 802.11n standard can be used for the UAVs-to-RoI MAC design since it allows packet aggregation.

2) Downlink transmissions (A2U links: Aircraft to UAVs; using multi-beam multi-cast): In the downlink direction, broadcast can be used to announce a message, or unicast used to allow an aircraft to pinpoint a specific RoI node. Multi-beam multicast (MBM) transmissions can be sued. A highly reliable 1-to-M communication scheme is required in order to deliver important commands to a specific group of RoI nodes. For example, some specific RoI nodes may be asked to change their surveillance tasks, or change the sensing modes, or even update their information filtering models in order to detect different abnormal event patterns in those RoIs. Those multicast messages cannot be lost since they may hold re-tasking commands. It is necessary to adjust the power level and sending rates in each beam direction based on the link channel quality. For higher quality links, lower power levels can be used (thus save some energy). The sending rate in a good link can also be increased to more efficiently use its bandwidth. In some beam directions, if the link quality is poor, the power level may need to be increased to overcome the noise impacts, and use a lower data rate to avoid link congestion and reduce the packet loss.

Figure 57:
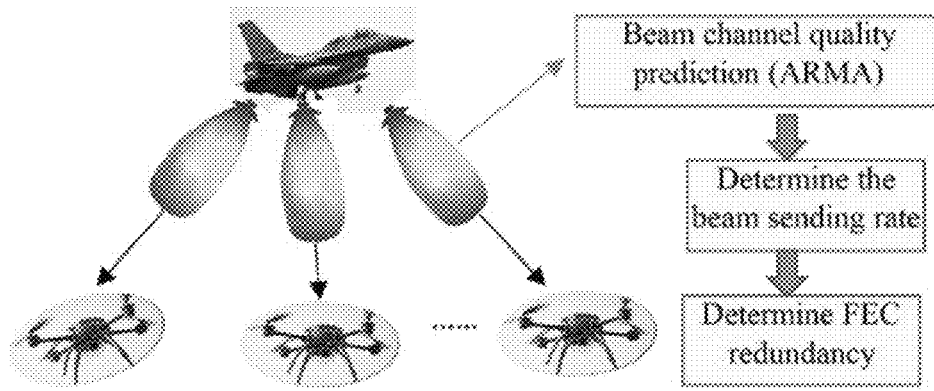
FIG. 57 an example of proactive multi-beam multicast in a downlink MAC.

In any case, it may be necessary to use a link-quality-adaptive MBM scheme. Thus a proactive MBM can be used as shown in FIG. 57. Since the link quality estimation needs some type of feedback from the receivers (RoI nodes), each multicast UAV is required to piggyback their PER (packet error rate) in their ACKs. They should also indicate their mobility speed and absolute position in the ACK such that the aircraft can predict its next position (such as leaving the current beam or not). After the aircraft has the history link state parameters (including PER, mobility, etc.), it will use vector (i.e., multivariable) AutoRegressive Moving Average (ARMA) model to predict the next round of link state:

$$\sum_{l=0}^{p} A_l y(t-l) = \sum_{l=0}^{q} M_l \epsilon(t-l) \tag{25}$$

Here $A_0, A_1, \ldots, M_0, M_1, \ldots$ are all matrices of order n×n and $\epsilon(t)$ is a disturbance (noise) vector of n elements. For analysis convenience, the above equation can be converted to a state-space model involving a transition equation. Thus conventional first-order Markov process can be used. If the aircraft predicts that an UAV will leave its current beam next time, it will store the data in a buffer until it knows the next beam scope that the UAV will move into. It can also increase or decrease its power level based on the new position prediction results.

Based on the predicted FER result, we can easily estimate the allowable maximum link data rate R*, by using any existing SNR-based PHY rate adaptation scheme. For the rate R*, the link peak throughput $TH_i$ in beam i can be estimated as follows:

$$TH_i \approx \frac{\Omega \times R^* \times (1 - FER)}{SuperFrame} \tag{26}$$

Performance Evaluation

A. A2A MAC Performance

The efficiency of long-distance A2A MAC protocol that explores multi-beam capacity and uses TDMA-like scheduling is tested. Consider an A2A network with 10 nodes. The distance between nodes is in the range of 100 km to 300 km. Since the Ku-band A2A links have high data rate, link speed in each beam is set as 10 Mb/s. The packet size is set to 1500 Bytes. Each node has a 4-beam antenna (thus the entire node can have 40 M/s of data rate) as well as a buffer to store up to 30 packets.

Two MAC schemes for A2A links are considered, one is the proposed Long-Distance TDMA-like scheme (LDT-DMA), and the other is traditional CSMA-based 802.11 scheme (for comparison purpose). In the LD-TDMA scheme, it is assumed that during each Tx transmission, after the receiver gets all the data in the whole Tx phase, it will then send back a window of ACKs. Suppose that the distance between two nodes is 100 km. Then the single trip propagation time is 100 km/$(3\times10^8)$=0.33 ms. In the disclosed MAC protocol, each node is equipped with a multi-beam antenna with 4 beams (facing east, south, west, and north, respectively). Each beam covers 90 degrees of area. The average Tx/Rx duration is set to 100 ms each. Since existing 802.11 does not consider directional antennas, in the CSMA scheme, omni-directional antennas are used. Assume that 80% of the nodes are active (the rest of them do not have data to send/receive), then the ideal maximum network throughput should be approximately 2667 packets/Sec/Network.

Figure 58:
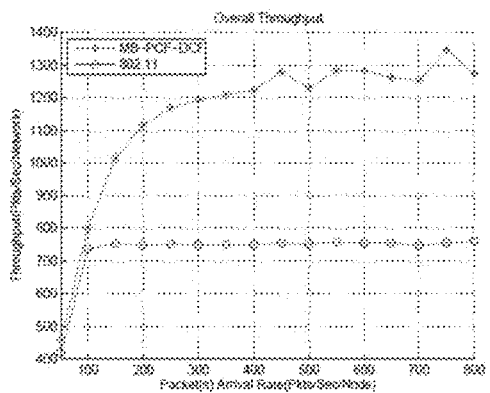
FIG. 58 illustrates throughput performance.

FIG. 58 shows the throughput comparisons of those two MAC schemes. Both schemes reach a ceiling after the network gets congested. In the beginning when the node data rate is less than 100 pkts/sec/node, the disclosed scheme has the same performance as CSMA since the network does not have high traffic amount for both schemes. After the node data rate is higher than 150 pkts/sec/node, LD-TDMA throughput is much better than that of CSMA scheme: it is nearly twice as CSMA throughput.

Figure 59:
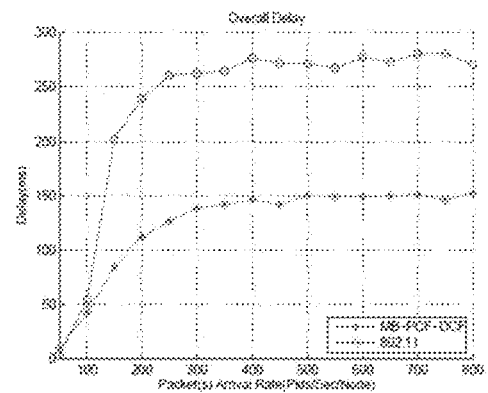
FIG. 59 illustrates delay performance.

FIG. 59 shows the delay performance. The average delay of CSMA is always larger than that of LD-TDMA. It can be seen that CSMA gets congested earlier than LD-TDMA: CSMA starts to have drastic delay increase after 100 pkts/sec/node; while LD-TDMA starts congestion until the rate reaches 300 pkts/sec/node.

B. A2A QoS Performance

Figure 60:
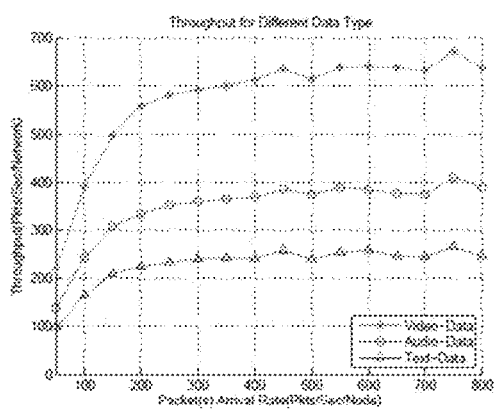
FIG. 60 illustrates throughput of multi-class data.

FIG. 60 shows the throughput performance for different types of data (video, audio, and text). Here the disclosed LDTDMA MAC scheme is applied. As described herein a hash function is sued to determine the transmission order among all nodes. By introducing a weight in the hash function video data can be given a higher priority to access the Ku-band.

The audio data has the second highest priority while the text data has the lowest one. In this part of simulation, we suppose 50% of the packets generated by one node are video data packets; while audio and text data occupy 30% and 20% of the total data, respectively. The maximum waiting time in the packet queue is set to 200 ms, 500 ms, and 1000 ms, respectively, for video, audio and text data. If the waiting time is longer than the transmission time of one packet, this packet is automatically dropped in the queue. As we can see from FIG. 60, video data has the highest throughput.

Figure 61:
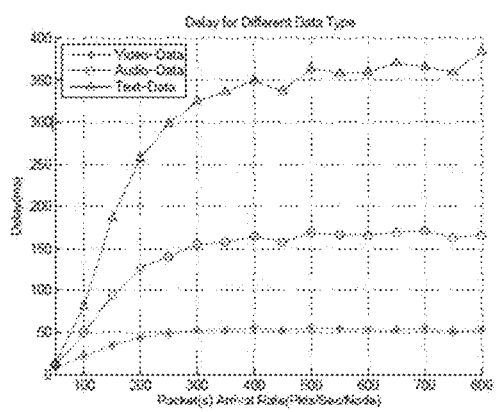
FIG. 61 illustrates delay performance of multi-class data.

FIG. 61 shows the delay performance of LD-TDMA with multimedia data. We can see that their delays have similar trends: after reaching the congestion point, they have drastic increase. The video has the lowest delay. However, their delay difference is less than the throughput case. This is because we use the frame aggregation (802.11e) when the UAVs send data to the aircraft. And each aircraft sends out all data during the Tx phase, no matter the data is video, audio, or text.

C. Beam Locking Scheme

Figure 62:
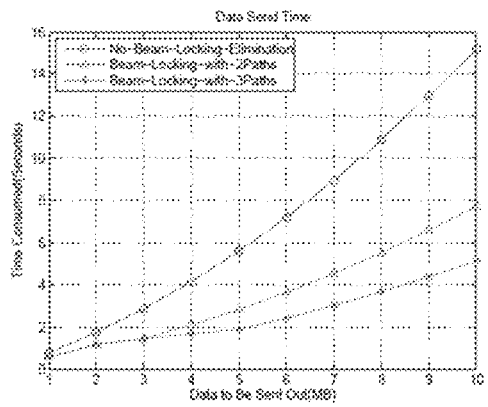
FIG. 62 illustrates delay performance with beam locking.

FIG. 62 shows the delay performance of beam locking scheme. Please refer back FIG. 45 on the concept of detour beam to overcome beam locking issue. As we can see, the delay goes up more quickly if not using beam locking scheme. By using 2-path beam detour, we can decrease the delay for more than 40% when the data amount is larger than 3M bytes. By using 3-path beam detour, we can have more options to deliver blocked traffic. FIG. 62 shows that the 3-path delay is less than half of the original non-detour case.

D. On Efficiency of TDMA-Like A2A MAC Scheme

For long-distance A2A communications, the time efficiency of TDMA-like, scheduled transmissions has been modeled herein. Here we evaluate our MAC performance in terms of handling the input/output traffic asymmetry issues in the case of relay communications. The relay node needs to have higher throughput than other non-relay ones in order to forward the aggregated traffic, see FIG. 40. Note that here we are not simulating the entire network. We use the scenario shown in FIG. 40 (right part) to evaluate our time efficiency model.

Figure 63:
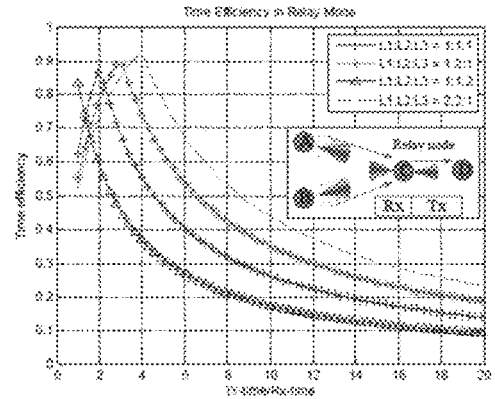
FIG. 63 illustrates delay performance of TDMA-like A2A MAC scheme.

FIG. 63 shows the time efficiency with different Tx and Rx allocation ratios. The x-label represents the ratio of Tx time over Rx time. And the y-label is the measurement of time efficiency of the relay node. It means the percentage of effective transmission time (note that part of allocated Tx/Rx duration may be idle if not enough data is transmitted). We could find that the time efficiency first goes up and then decreases. There exists a peak point. This verifies the conclusion explained in section IV-B 1.

E. Token-Based A2A MAC Scheme

Figure 64:
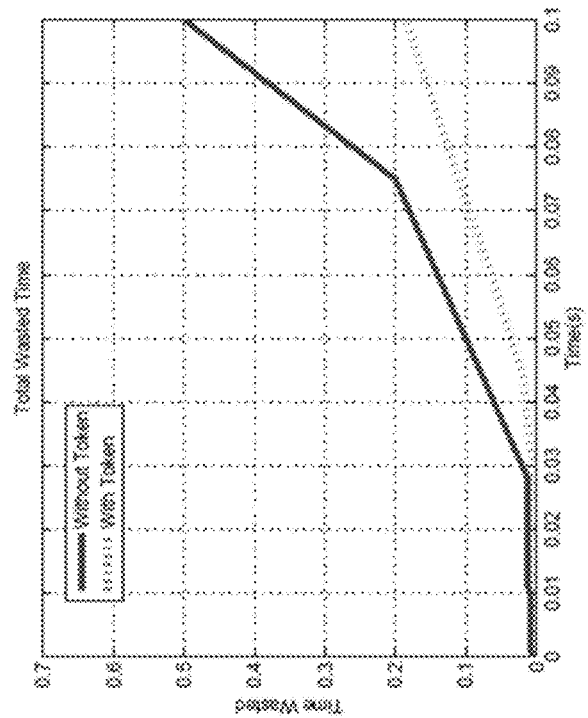
FIG. 64 illustrates throughput of a token-based scheme.
Figure 65:
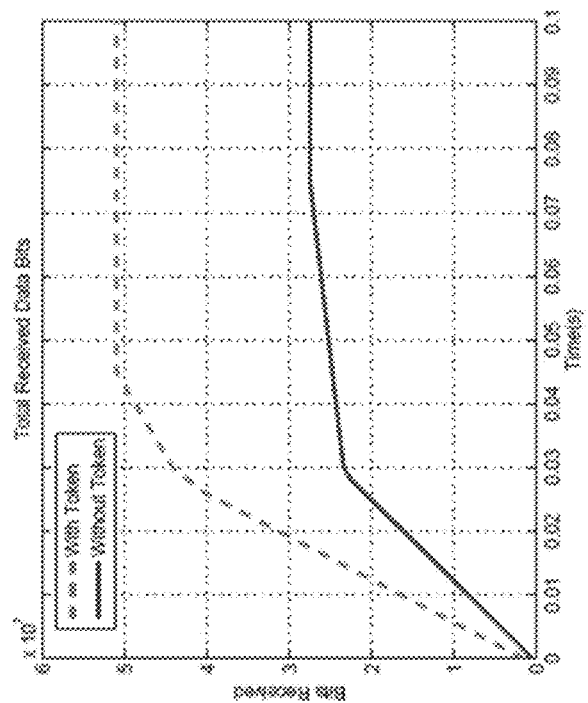
FIG. 65 illustrates delay performance.

We then evaluate our pipelined, token-based, scheduled A2A communication scheme (please refer to FIG. 38 as an example scenario). Here we present the simulation results, as shown in FIGS. 64 and 65. As we can see from FIG. 64, the token-based MAC scheme can significantly increase the throughput (almost doubled compared to non-token scheme). This is because any node can immediately switch to Tx (or Rx) mode after it finishes Rx (or Tx) phase, as long as it follows multi-beam antenna requirements (all beams should be in the same mode). Such a pipelined transmission also shortens the delay. As shown in FIG. 65, the delay is reduced for more than 50% after a certain time of communications.

F. Compressive Sensing Based Uplink MAC (UAV Aircraft) Polling Control

As described herein, on the uplink transmission (from UAVs to the aircraft), the aircraft will first poll the UAVs to see which nodes have data to send. We have used compressive sensing based polling scheme, which scales well in high-density UAV network. Here we use simulations to verify the throughput efficiency of our scheme.

Figure 66:
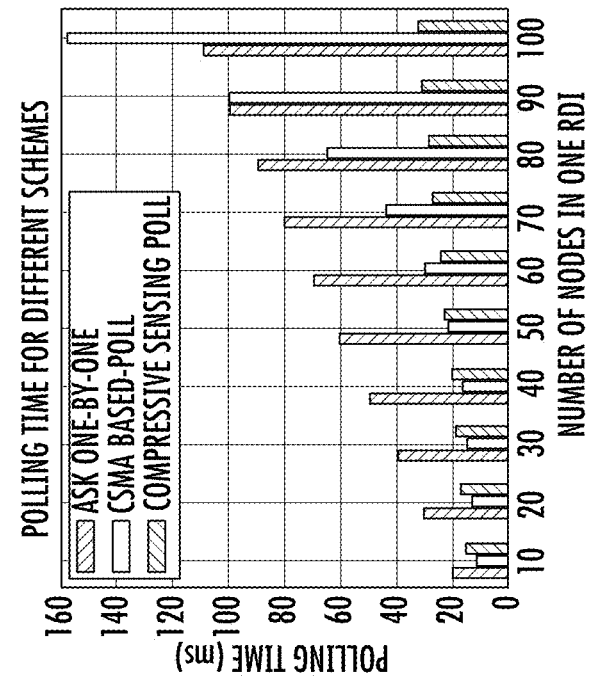
FIG. 66 illustrates polling-time comparisons among three schemes.

FIG. 66 shows the polling time comparisons between 3 schemes: (1) our compressive sensing based polling; (2) naïve one-by-one polling: in this scheme, the aircraft polls each UAV (in its coverage) one by one to see whether the UAV has data to send in the uplink direction; (3) CSMA-based polling: In this scheme, the aircraft first broadcasts a querying message to ask which nodes have data to send. Then the UAVs use CSMA to compete for the channel access. If any UAV wins, it sends its response to the aircraft.

As shown in FIG. 66, the compressive sensing based polling scheme has very low overhead (thus has little polling time) even when the network scale is over 100 nodes in the coverage of an aircraft. Simple one-by-one polling scheme has a linearly increased polling time, which is much higher than compressing sensing based scheme when the network size is more than 20 nodes. The CSMA-based scheme has good performance when the network scale is small (<50 nodes). However, when the node density is too high, there will be too many MAC transmission collisions among the nodes due to CSMA's random channel access nature. Thus it has the highest polling time when there are over 100 nodes.

Figure 67:
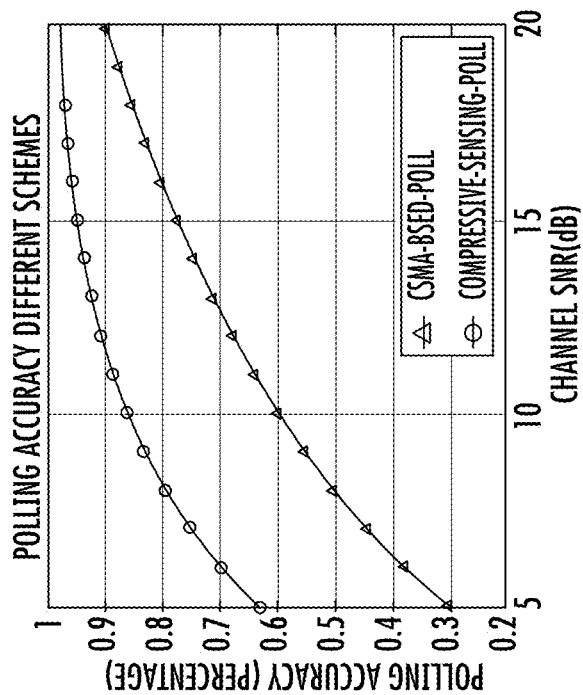
FIG. 67 illustrates polling accuracy.

FIG. 67 shows the polling accuracy comparisons for CSMA-based and compressive sensing based polling schemes. Here we use the percentage of correctly reported UAVs among all nodes as the polling accuracy. We aim to verify that compressive sensing based polling can still accurately find out what nodes have polling requests even though it uses sparse analog signal sampling.

As shown in FIG. 67, as the channel SNR becomes larger, the polling accuracy of both schemes keeps growing until reaching 100%. This is an expected result since better channel quality brings more successful uplink communications. The compressive sensing based polling is constantly better than that of CSMA. The reason is similar to the above mentioned one. Moreover, in CSMA based scheme, the response message is transmitted in the form of digital signals (i.e., packets), and thus suffers from many bit errors from fading channels. While in compressive sensing based scheme, the response messages are collected through the sparse, analog signals that suffer less from channel quality. As we can see, when the SNR is 20 dB, its polling accuracy reaches 97%.

Another Example—3-ENT (Resilient, Intelligent, and Efficient) Medium Access Control for Full-Duplex, Jamming-Aware, Directional Airborne Networks Described herein are solutions to MAC design issues in an airborne network with the following features: (1) Ku-band links (15 GHz), such a frequency is weaker to line-of-sight (LoS) blocking than 2.4 GHz, but with much better signal directionality. The nodes need to coordinate closely for detour communications since LoS path can be easily blocked. (2) Multi-beam antennas: All beams of an antenna can be set to sending or receiving mode. But at a particular time we cannot make some beams in sending and others in receiving mode. This feature requires all neighboring nodes coordinate with each other to get ready for simultaneous reception or transmission. Otherwise, the bandwidth is wasted. (3) Full-duplex communications: With the rapid progress of signal cancellation, full-duplex becomes a reality. This means that each node can simultaneously send or receive data. Our MAC design has 3-ENT properties, i.e., it is resilient, efficient, and intelligent. Particularly, it is resilient to jamming attacks through the encoding of traffic in each beam. And it achieves throughput-efficient communications through the integration of full duplex traffic control and multi-beam data forwarding. Finally, it has intelligent beam traffic profile prediction via machine learning algorithms, and thus each beam can better prepare for next-step communications based on the prediction of traffic amount and neighbor movement. The 3-ENT MAC protocol can be used for airborne/UAV networks or other long-link wireless networks.

Described below is a MAC scheme for the next-generation airborne networks (ANs) with the following 3 network conditions: (1) Long-distance Ku-band links: Ku-band provides a much better signal directionality than Wi-Fi frequency (2.4 GHz). Although it cannot achieve the wire-like signal propagation, it can well limit all signal energy within a small angle. This means that by using a narrow-beam directional antenna, signal quality can be maintained for long distances (>1 km) since the signal power does not diffuse in a wide angle. Higher frequency also means higher data rate. Today, around 1 GHz of bandwidth in the central Ku-band can be used for uplink/downlink communications. However, higher frequency means shorter wavelength, and thus Ku-band signal is weaker to line-of-sight (LoS) blocking since a signal typically can only cross an obstacle with the size similar to its wavelength. Therefore, a node needs to coordinate with all neighbors very closely in case it needs to find a detour path when the LoS path is blocked. This research describes the use of detour beam and rateless codes to overcome single-path blocking issue. (2) Multi-beam antennas: As mentioned above, by integrating with directional antennas, a Ku-band signal can propagate for a long distance. Multi-beam smart antenna (MBSA) has much less manufacturing cost and complexity than MIMO antennas, since it just simply extends general directional antenna from a single beam to multiple beams. Thus a node can dispatch different packets in multiple beams concurrently. The reason of using concurrent Tx (transmission) or Rx (reception) is because the all beams are involved in the same coefficient vector calculations. One beam's side lobe can seriously leak energy to other beam's main lobe if those two beams operate in different modes (i.e., one in Rx and the other in Tx). The concurrent Tx/Rx requires all neighboring nodes to be synchronized well. (3) Full-duplex communications: Most of existing wireless products only support half-duplex communications, that is, a node can be either in Tx or Rx mode (but not in both). But full-duplex (FD) allows a node to send out data in one set of antennas while simultaneously receive data in another set.

Although the above 3 features can greatly enhance the network throughput, it also brings many challenges to the MAC design. For example, in Ku-band networks, the interference is not the major concern. But all neighbors need a distributed coordination scheme to maintain detour links. Although a MBSA can theoretically enlarge the link capacity for N times (N is the number of beams), it needs a beam-based distributed coordination function (DCF) as well as accurate clock synchronization scheme. The FD links need a MAC to deal with simultaneous DATA/ACK scheduling after RTS/CTS exchange.

Figure 68:
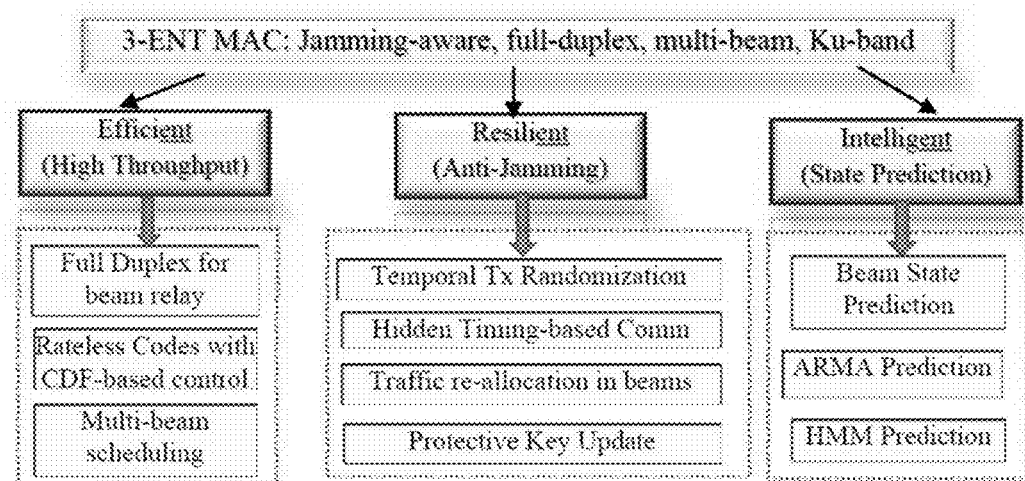
FIG. 68 illustrates an overview diagram of 3-ENT MAC.

The disclosed exemplary MAC design has the following 3-ENT (efficient, resilient, and intelligent) features (FIG. 68): (1) Efficient MAC via seamless integration of multi-beam forwarding, FD primary/secondary transmission, and enhanced rateless codes for throughput-efficient Ku-band networking. Prioritized rateless codes are implemented in multi-beam FD links. The rateless codes is enhanced by code distribution function (CDF) to reduce the ACK waiting time. Coded symbols are distributed in multiple beams, and use both primary transmission (from the source beam to a relay) and secondary transmission (from a relay to the destination beam) of FD links to achieve no-wait data forwarding. (2) Resilient MAC via hidden timing based anti jamming transmission: The disclosed targets a frequently seen jamming attack in the airborne network (AN): the jammer can move to different beams, and launch random attacks. A hidden communication channel based on the encoding of packet interarrival times is used for common control channel. The traffic amount is adaptively adjusted in different beams based on the jamming degree in each beam. (3) Intelligent MAC via beam state prediction for intelligent traffic scheduling in multiple beams: Mission-oriented airborne networks have predictable mobility. A Hidden Markov chain is established to capture the node state transition from time to time by differentiating between the hidden, intrinsic node state (in terms of channel quality, traffic profile, etc.) and the observable, noisy node parameters, and deducing the changing trend of a node's mobility patterns and traffic features. Since such a state-to-state transition matrix could be large due to the complex multi-channel condition changes, the Markov Chain state space is supressed via a promising statistical model called HDP-HMM (Hierarchical Dirichlet Process based Hidden Markov Model), to achieve low-complexity node state prediction. Such a beam communication pattern prediction plays a critical role in mission-oriented airborne networks.

System Model (1) Node Topology:

A typical airborne network (AN) with Ku-band links is assumed. The AN is comprised of mission-oriented airplanes or UAVs. Due to the use of high power transmitter (>500 mW), the signal can reach over 100 km away. Although the nodes can be highly mobile, a node does not need to switch beam as long as the destination node is still within the beam angle, which is very likely within a few minutes of duration, since for such a long distance of link the beam angle could cover a large cone-like area. To adapt to mobile topology, intelligent beam prediction algorithms based on mobility prediction model are used. All nodes are assumed to form a typical wireless mesh network (WMN) with at least one node serving as the gateway, which obtains accurate timestamp from either the satellite or a ground station. It is further assumed that the gateway can use some popular schemes, such as reference broadcasting synchronization (RBS) or time diffusion to achieve clock synchronization among all nodes. WMN clock synchronization ensures that any node can concurrently communicate with multiple neighbors in different beams.

(2) Jamming Assumptions:

A jamming environment is targeted since the AN collects sensitive mission-related environment data. Obviously, if there are many powerful jammers located in all possible communication paths, there is not much we can do to protect data from those jammers. However, in most cases it is a small number of jammers that have certain power constraints and only launch intermittent (not continuous) attacks. Like most anti-jamming systems, the following reasonable assumptions are made: (1) small number of attackers: To avoid being detected, attacker only jams the links sparsely. (2) Limited power: It is also the jammer's benefit to use an energy-saving approach to attack an AN, instead of launching high-power jamming signals. Thus it is assumed that the jammer has at most the same power level as the AN. (3) Random jamming: To save power and also prevent being detected, a jammer only attacks the network once for a while. And it may use intelligent attacks. For instance, only when the data is sensed (by listening to the specific preamble pattern) will it launch the interference signal.

(3) Multi-Beam Antennas:

Although a switched MBSA has separate beams, those beams need to all get involved into the calculation of antenna control weight vector in order to set up certain beam pattern (this controls the beam on/off and power level in each beam). Therefore, it is not possible to allow one beam to send data while ask another beam to receive data at the same time. In other words, all beams should either transmit or receive data concurrently. As shown in FIG. 10, above, each beam needs to maintain separate queues due to the different traffic profiles and sending rates in each beam. Here nodes A, C, E are supposed to send data to the star node simultaneously. However, if any of them misses the sending time or is late, the bandwidth of that beam is wasted. Likewise, nodes B, D, F are supposed to prepare their receiving queues beforehand for synchronous data reception.

(4) Full-Duplex (FD) Transmission:

Today FD has been implemented in single-beam and MIMO antennas. MBSA is even simpler than MIMO since it does not need complex feedback control. FIG. 69 illustrates the principle of FD design for antenna array case (such as MBSA). FIG. 69A shows the typical antenna layout. The two multi-beam antennas (one for Tx and the other for Rx) are well separated to reduce signal interference. The middle part is signal cancellation circuit, with the principle shown in FIG. 69B. As can be seen, the self-interference from Tx to Rx is over 70 dB, that is, the Tx signal could be millions of times stronger than Rx signal. Both analog and digital cancellation circuits are needed. Overall, more than 60 dB of self-cancellation can be achieved. Thus the Rx signal will not be overwhelmed and becomes detectable in the same node. The FD technique can greatly improve AN throughput.

Throughput-Efficient MAC

A. New MAC for Long-Distance, Multi-Beam, Full-Duplex Nodes

A basic MAC design for the AN with Ku-band links is used, as has been described above. Later, four strategies to improve the throughput of the basic MAC protocol are explained. Because the focus of this example is a 3-ENT MAC enhancement, basic MAC principles are only briefly introduced.

Also as described above (reference FIG. 49), ACK Timeout is adjusted such that ACKTimeout=SIFS+$S_{STD}$+PCLP+RTT.

B. Throughput-Efficient MAC Enhancement

Figure 70:
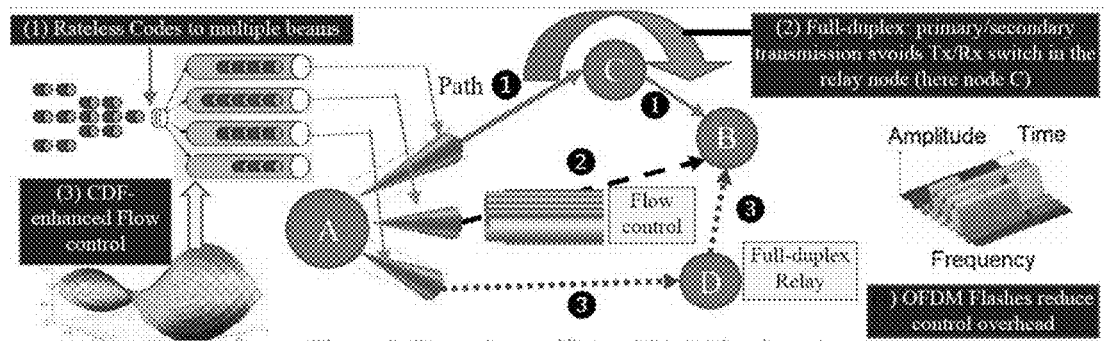
FIG. 70 illustrates an exemplary overview of a throughput-efficient MAC.

Enhancements to the above basic MAC scheme are made for throughput-efficient neighborhood communications. As shown in FIG. 70 the disclosed scheme includes four enhancement strategies: (1) Rateless codes based multi-beam data distribution: Prioritized Fountain codes are integrated with the multi-beam MAC operations, in order to dispatch the data symbols to multiple beams. This is beneficial in two aspects: First, it fully explores the multi-beam capability to dispatch more traffic. Second, by distributing Rateless codes to multiple beams, higher transmission reliability is achieved since it has redundant packets to compensate for the packet loss in any path. (2) Full duplex (FD) oriented MAC: The basic MAC is enhanced by using the FD's advantage in terms of establishing both primary and secondary transmissions. (3) CDF-enhanced flow control: Improper pauses (waiting for ACKs) can significantly reduce the throughput. Code distribution function (CDF) is used to control the pause time of the sender during the delivery of rateless codes in each beam. Such a CDF-enhanced flow control can avoid unnecessary pauses in the sender. (4) OFDM flashes for control overhead reduction: Existing 802.11 typically assumes OFDM in the lower layer for high-rate transmission. Here the flash concept is used to avoid the co-existence of control messages and data packets. Thus much bandwidth can be saved and transmission time reduced due to the removal of control messages (such as ACK, RTS, CTS, FD NAV, etc.) from the data channels.

(1) Fountain Codes Over Multiple Beams

Rateless codes, also called "regret-free" codes since they never discard any packets, have been shown promising performance in multimedia over wireless networks. In the sender side, each group of packets is decomposed into symbols with certain redundancy such that the receiver can easily reconstruct the original packets as long as enough number of symbols are received. The sender does not need to change the modulation and link layer coding schemes. It simply keeps sending symbols. If an ACK is received (which means that the receiver receives enough symbols to recover the original packets), the sender sends out next group of symbols. For a well-designed rateless code, the number of symbols for each group of packets closely tracks the changes in the channel conditions. The rateless codes are called "rateless" since the sender does not need to adjust its data rate for different channel conditions. The sender just simply keeps sending symbols until an ACK for previously sent packets is received. This is different from general networks that require the sender to select a suitable rate from a pre-fixed rate set (and it is always difficult for the sender to select a proper rate).

By applying rateless codes in multi-beam scenarios, one more benefits are gained: utilize the multiple wireless links (in each beam) to send out more symbols than conventional one-link case. Since rateless codes has decomposed the original application layer message into some redundant pieces (called symbols), it is convenient to separate those symbols into different beams. Because the symbols go through different paths instead of waiting in the queue of the same link, throughput can be improved. Moreover, higher communication reliability is achieved since it is very unlikely that all beams have poor channel conditions. The amount of symbols are allocated to different beams based on their channel conditions. For example, more traffic can be allocated in the beams with lower jamming possibility.

Figure 71:
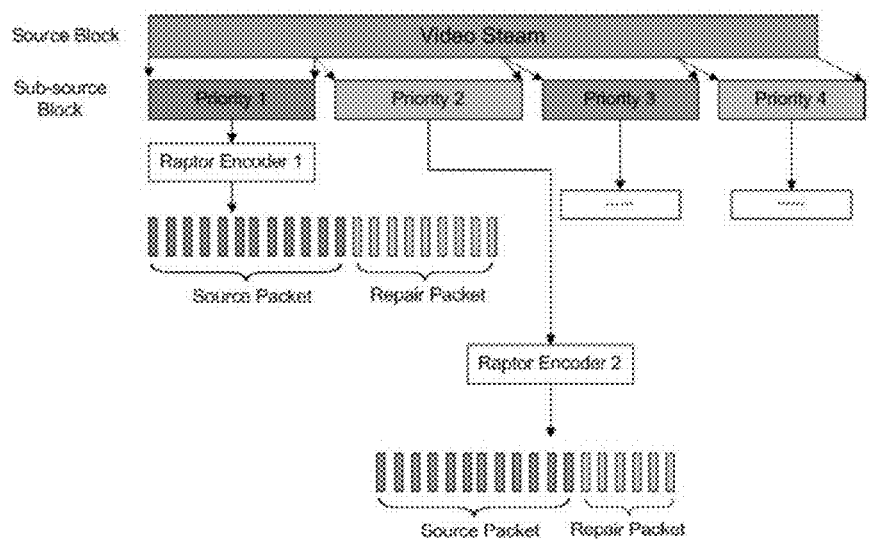
FIG. 71 illustrates an example of prioritized fountain codes.

As described herein, Prioritized Fountain Codes (PFC) (see Yeqing Wu, Sunil Kumar, Fei Hu, John D. Matyjas, "Cross-layer Forward Error Correction Scheme using Raptor and RCPC Codes for Prioritized Video Transmission over Wireless Channels", IEEE Transactions on Circuits and Systems for Video Technology. Issue: 99, January 2014, which is fully incorporated by reference) as the rateless codes algorithm. As shown in FIG. 71, PFC can encode the source messages into symbols with different redundancy control. In other words, for a packet with higher priority, PFC can increase the encoding redundancy and thus has higher success probability of recovering the original packet. Therefore, PFC can support the mission-oriented military (or civilian) applications by providing higher reliability for more important data.

(2) Full-Duplex Enhancement

Figure 72:
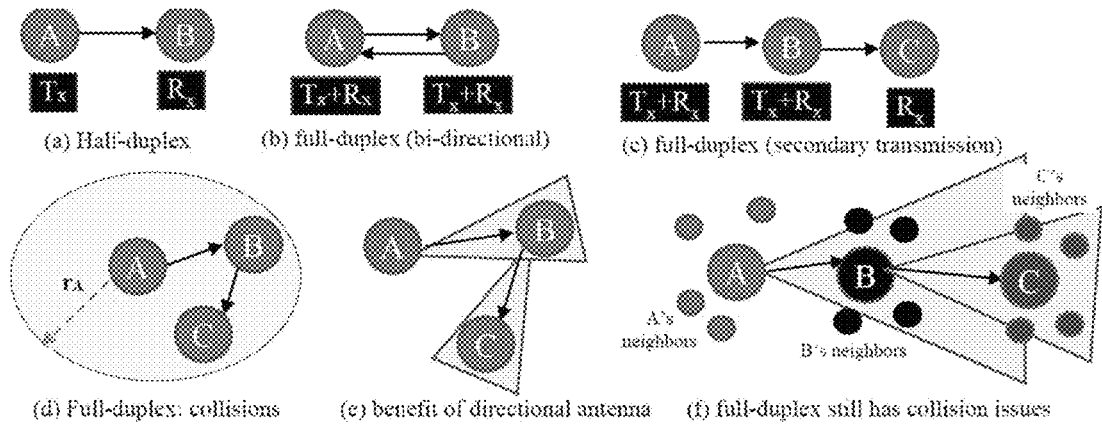
FIG. 72 illustrates benefits and challenges with full-duplex Tx and Rx.

The full-duplex (FD) capability largely extends the function of a wireless network. FIG. 72 shows conventional half-duplex (HD), which is assumed in almost all of today's wireless systems. Case (b) of FIG. 72 shows a benefit of FD: although conventional protocols require the sender (A) to switch to Rx mode in order to receive data from B, FD allows bi-directional communications to occur between A and B simultaneously without self-interference issues between A and B. This avoids Tx/Rx switch delay. Thus data and ACK can be sent in the same time. Case (c) of FIG. 72 shows another use of FD—secondary transmission, which means that while a node is involved in an ongoing transmission, it can still simultaneously establish another communication session. Here node B is already talking with A. Since it has FD capability, it can be the source for C. Here A→B is called primary transmission, and B→C is the secondary transmission.

However, FD also brings some issues. As shown in Case (d) of FIG. 72, here B is talking with A, and also helps with the secondary transmission B→C. Obviously, it is not A's intention to talk to C since C cannot receive two senders' signals simultaneously. However, C is in A's signal interference range. Thus there exist transmission collisions from C's viewpoint. Fortunately, multi-beam antenna is used in each node. Case (e) of FIG. 72 shows that as long as those two transmissions are located in different beams (directions), there is no interference between them. However, if they are in the same direction, there will be collisions, as shown in Case (f) of FIG. 72. For such an issue, secondary transmission cannot be adopted here.

Figure 73:
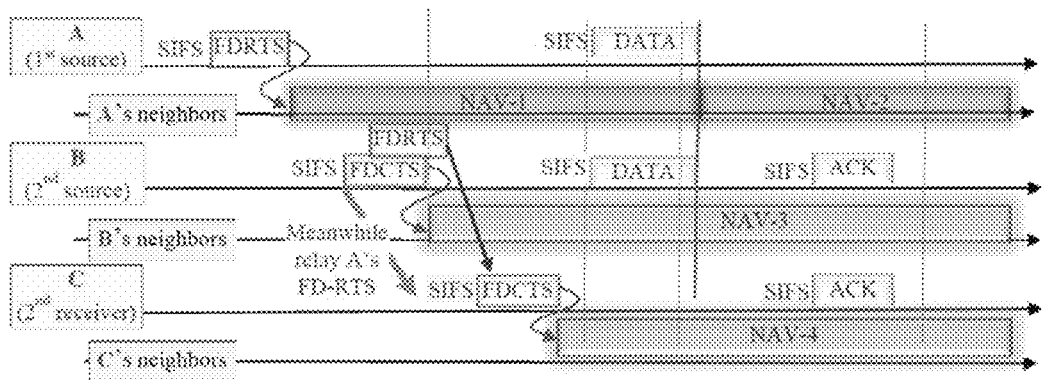
FIG. 73 illustrates full-duplex MAC operations.

To fully explore the pipelined transmissions of FD, it is recommended to allocate similar traffic amount in the links of primary (A→B) and secondary transmissions (B→C). Otherwise, one of them (A or B) will sit idle and waste the link capacity (thus sacrificing throughput). MAC protocols are also enhanced during HD transmissions. FIG. 73 illustrates a typical HD-oriented MAC operation process. Here again A→B is the primary link, and B→C is the secondary link. Suppose the secondary transmission request just comes from A. It sends out RTS (marked as FDRTS in FIG. 73). A's neighbors (except B and C) sensed FDRTS, and enter sleep status for the duration of NAV-1. This way A will not have interference from others. When B receives FDRTS, and if it is free to talk, it sends back CTS (marked as FDCTS in FIG. 73).

The primary and secondary transmissions are scheduled in the same time. When B feedbacks FDCTS to A, it also tells A when it can send out next round of DATA at the same time as A. Based on B's feedback, A tells its neighbors to wait for a longer time (marked as NAV-2 in FIG. 73). Thus in total A's neighbors will keep silent for a total of NAV-1 plus NAV-2. In the meantime, B's neighbors knows how long (NAV-3) it should wait based on B's FDCTS content. Note that after B sends back FDCTS to A, it also sends a FDRTS to C to establish a secondary transmission with C. C sends back the FDCYS to B. Such a FDCTS can be captured by C's neighbors which will wait for NAV-4. As shown in FIG. 73, now two links can send data at the same time and with the same total time duration (as long as they send the same data amount). C's neighbors also know how long they should wait based on C's NAV message.

(3) CDF-Based Flow Control

Flow control is an important (although not mandatory) function in Data Link layer. It is often tied with MAC scheme since both targets the one-hop communications. In the disclosed long-distance Ku-band links with long RTT, the flow rate in each beam is carefully controlled. Note that here flow control is not congestion control. The latter is a Transport layer function (it typically uses TCP).

Since rateless codes are used, there is no need to adjust the sending rate in the flow control. Instead, the sending pace is implicitly controlled by determining the right time to pause the symbols in the sender side, in order to wait for the ACK for the previously sent symbols. Without ACK, the sender may need to continue to send the symbols for the last packet. With more redundancy, it is easier for the receiver to reconstruct the packets. Note that the sender cannot just pause randomly. It is important to pause in the right times since it is not free (free means 'taking 0 time') for a receiver to send back ACK (after successfully re-assembling a group of packets based on the received symbols). As a matter of fact, it takes a few ms to finish a single round of group transmission, which includes the following time-consuming operations in both the sender and receiver: (1) the receiver switches radio circuit from Rx (receiving) to Tx (transmission) modes. (2) The receiver completes the ongoing rateless decoding and determines whether a positive ACK should be sent back; (3) forms ACK packet; (4) turns radio back to Rx; (5) the sender switches from Tx to Rx and decodes ACK, and then stops sending more symbols for the ACKed group; (6) sender turns back to Tx to send out new symbols for the next group of packets. It has been shown that each pause for ACK would waste 18% of overhead in terms of the total time spent on symbol transmission plus ACK feedback.

The sender cannot pause after receiving an ACK since much time has passed for each ACK feedback due to the above six operations. It is better to perform predictive pause: once the sender determines to pause to wait for ACK, the ACK will almost arrive at the sender at that time. To achieve such a proper pause, the concept of code distribution function (CDF) is used, which is defined as the probability with which the encoded message can be decoded successfully without error after a certain number (n) of symbols have been received by the decoder. The probability distribution increases monotonically with number of symbols received. This distribution is sensitive to rateless code parameters, radio conditions, and code block length. A benefit of using CDF is that just a small amount of records are collected on the relationship between n (number of symbols sent between two consecutive pauses) and $\tau$ (ACK feedback delay), in order to obtain the CDF curve. The main features of decoding CDF include: 1) since it pauses on the right times, it thus implicitly captures all the channel uncertainties in the system. 2) It can improve the throughput of the system due to the avoidance of unnecessary pauses.

Figures 74A, 74B:
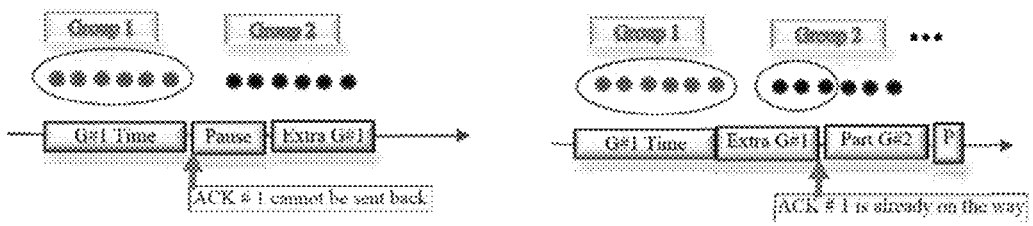
FIGS. 74A and 74B illustrate benefits of using CDF.

FIGS. 74A and 74B clearly show the advantage of using CDF. Suppose the prioritized Fountain codes (PFC) are used to encode a group of packets into some symbols. The sender sends those symbols of each group each time. Without CDF, the sender has to pause after sending the minimum number of symbols for each group. If the receiver still cannot re-assemble G#1 (Group 1), then no ACK will be sent back. But at least a few ms of time has been wasted. The sender has to send extra symbols for G#1. After using CDF, since the sender already has the statistical distribution of how many symbols it should send before each pause, it can now pause at the proper time after sending the minimum G#1 symbols plus some redundant symbols (just in case the receiver cannot recover G#1). Because the ACK takes some time to get back to the sender side, the sender can just simply squeeze part of G#2 symbols before the first pause. As can be seen from FIG. 74B, while the ACK for G#1 is on the way, the sender has sent out quite a few useful symbols for both G#1 and G#2, and then pauses to wait for ACK for G#1.

The first step is to generate such CDF curves based on empirical data, i.e., the records between n (number of symbols sent between two consecutive pauses) and $\tau$ (ACK feedback delay). In order to speed up the CDF learning process, Gaussian approximation can be adopted. Gaussian approximation is a reasonable approximation at low SNR, and its maximum likelihood (ML) requires only mean, $\mu$ and variance, $\sigma^2$. In addition, learning rate $\alpha$ is introduced, which ranges from 0 (means no memory) to 1 (unlimited memory), to represent the importance of historic symbols in the calculation. This process has two advantages. Firstly, the start-up transient dies out more quickly, and secondly, the ML estimator is well behaved for $\alpha=1$.

Using the given CDF in a specific beam, the optimal strategy for flow control in that beam can be determined. This is because CDF curves already tell how many new symbols should be sent based on last time ACK feedback delay. Therefore, each beam adopts a flow control with the style like "sending a certain number of symbols, then pause for feedback, then send another group of symbols, and so on".

(4) Using Flash for Control Messages

Although the above rateless codes based, multi-beam, multi-path, full-duplex MAC scheme significantly improves throughput, it still has a drawback: all the control messages (such as ACK) share the same Ku-band channel with the DATA (symbols). It has been shown that typical Wi-Fi control messages can consume over 40% of channel time. This is maybe the main reason that most commercial 802.11 products turn off RTS/CTS options, which means hidden terminal problems cannot be well solved. In the disclosed MAC design, some new control messages (such as FD-RTS, FD-CTS, A-NAV, etc.) have been added, which can add more overhead to the channel.

One approach is to decouple the control messages from the data packets, such as using the dedicated control channel as what cellular network does today. However, such a control channel in WMN cannot be afforded due to the heavy data bandwidth requirements. Here, a flash concept (see Asaf Cidon, Kanthi Nagaraj, Sachin Katti, and Pramod Viswanath. 2012. Flashback: decoupled lightweight wireless control. In Proceedings of the ACM SIGCOMM 2012 conference on Applications, technologies, architectures, and protocols for computer communication (SIGCOMM 12). ACM, New York, N.Y., USA, 223-234, which is fully incorporated by reference) is adopted to implement a virtual control plane. Flash is built on OFDM. OFDM has become a popular modulation mode in Wi-Fi, LTE, WiMAX, etc. FIG. 75A shows the basic function blocks in an OFDM transmitter. It uses IFFT to generate symbols in each subcarrier (see FIG. 75B). Flash does not change the Wi-Fi's OFDM hardware and algorithms. The only change is that it just simply erasures the 4 μs data constellation whenever it wants to send out a flash signal in a specific (i, j) OFDM grid position (see FIG. 75C). Here i is the time slot ID (i.e., each Wi-Fi OFDM symbol occupies 4 μs of slot length), and j is the subcarrier position (Wi-Fi uses 64 subcarriers). Ku-band applications can define their own OFDM subcarrier architecture.

The flash is just a sinusoid signal with the corresponding $i^{th}$ subcarrier frequency, and appears like a power spike. Since the transmitter focuses all its power on a single subcarrier, it has higher power than regular data symbols, and thus is easy to detect by a receiver. Flash coding/decoding is straightforward. Because the phase offset is robust to channel fading, the receiver only records the subcarrier location difference (called a gap) between neighboring flashes. Note that the time gap between flashes is fixed. A control message can be represented by a set of flashes. As described herein, a control message is encoded as shown in FIG. 75D: its total size is 40 bits. The first 10-bit represents the node ID. Since a small-to-middle-scale network is targeted, 10 bits should be good enough to name each node. The 5-bit beam ID is as follows: the first bit: '0'—Tx, '1'—Rx. Recall that full-duplex multi-beam antennas are used; the remaining 4 bits can name up to 16 beams; the next 5 bits can represent up to 32 different control message types, such as FD-RTS, FD-CTS, ACK, A-NAV, etc. Next 5 bits can specify the QoS and QoE metrics. For example, we can use '00000' to mean the first priority CBR (constant bit rate) audio traffic. Next 2-bit field means the full-duplex transmission type: '00'—half duplex mode; '01'—full-duplex, bi-directional; '10'—full-duplex, and the receiver establishes a secondary transmission; '11'—the sender launches a secondary transmission. The next field is optional for other purposes. The last 8 bits are for CRC error check.

The above 40-bit control message can be simply divided into 8 groups; each group has 5 bits, which corresponds an integer 0-31. Each integer corresponds to the gap between consecutive flashes. For example, if the first flash is sent in subcarrier i=5, and the second is sent in i=15, then the gap is 10, which is 01010.

Jamming-Resilient Communications

The above proposed multi-path, rateless codes based, full-duplex relayed transmission can serve as a good basis for jamming resistance. For example, when one beam is jammed, the sender can use Raptor codes to generate redundant symbols to improve reliability. When worse comes worst, it can select another non-jammed beam to send out data. However, a mobile, power-constrained jammer (an assumed attack model) can still move around to launch jamming signals once it detects the CTS message, which often indicates the beginning of DATA transmission. A better scheme is needed to overcome the smart jamming that waits for DATA phase.

A. Time Interval Encoding for Anti-Jamming

The detection of jamming has been studied widely. For example, both packet delivery success rate and received signal strength statistics can be used. How does the receiver node immediately notify the sender on the existence of jamming? The sender would not know exactly why the receiver does not send back ACK since it could be due to channel noise/interference or even congestion loss. The sender may use certain statistical patterns of the ACK feedback delays to deduce the network state. But such a method needs many samples of delay data. It is important to immediately tell the sender the jamming status (such as how frequently the jamming signal comes, and how much the bit error rate is due to the jamming, etc.). If the receiver tries to use a control message to tell the sender the jamming situation, such a message may also become uninterpretable since the flash message is essentially a special data signal (it just replaces normal data constellation with a special bursty signal), and thus is also fragile to jamming.

It has been shown that it is entirely feasible to detect the packet arrival timestamp even under heavy jamming although we may not successfully decode the damaged bits. From a jammer's viewpoint, its goal is to interfere with the legitimate traffic while not being easily detected. It is not in its best interest to jam the traffic with high power since it could be easily located by doing that. Therefore, without jamming, the sender and receiver could use flashes to deliver the control message. Under the packet arrival timestamp can be used to deduce the jamming notification.

Specially, since in MAC layer has only one or two-hop of data delivery (this is unlike routing layer, which may have more diversified data transmission delays due to multiple hops of relay), the packet-to-packet interarrival times are more robust to jamming attacks than the absolute timestamps of each packet. Note that it is not the same as the above mentioned flash concept that uses subcarrier frequency position difference to encode the control messages (the time difference is the same between any two flashes).

To achieve a robust encoding of data messages into the packet interarrival times, a message is not simply mapped to a single interarrival time, such as (Msg(i)→40 μs). Instead, each symbol is mapped into a set of interarrival times. Suppose in the Application layer there is a need to send out different military commands (messages). Assume that this message needs to be sent in a jamming environment. Instead of encapsulating the message into the lower layer packets, any random packet (that is not relevant to the message content itself) is sent each time. However, the packet is sent multiple times, and each time start with a certain starting time determined by an encoding scheme as follows:

Suppose a message $M_i$ corresponds to a codeword $\Omega_i = \{\omega_{1i}, \omega_{2i}, \ldots, \omega_{Ni}\}$. This means that the same packet should be sent for N times. If the first packet is sent at time $t+\omega_{1i}$, then the remaining N−1 packets should be sent at the time $t+\omega_{2i}, t+\omega_{3i}, \ldots, t+\omega_{Ni}$, respectively. After the receiver gets those packets, it records the interarrival times, and gets a vector as $\Phi_i = \{\phi_{1i}, \phi_{2i}, \ldots, \phi_{Ni}\}$. It then calculates the distance between $\Phi_i$ and all codewords $\{\Omega_x\}$ in the database, and select the minimum distance as the decoding result:

$$\Delta = \text{Min}\|\Phi_i - \Omega_x\|, x=1,2,\ldots \quad (4)$$

Figure 76:
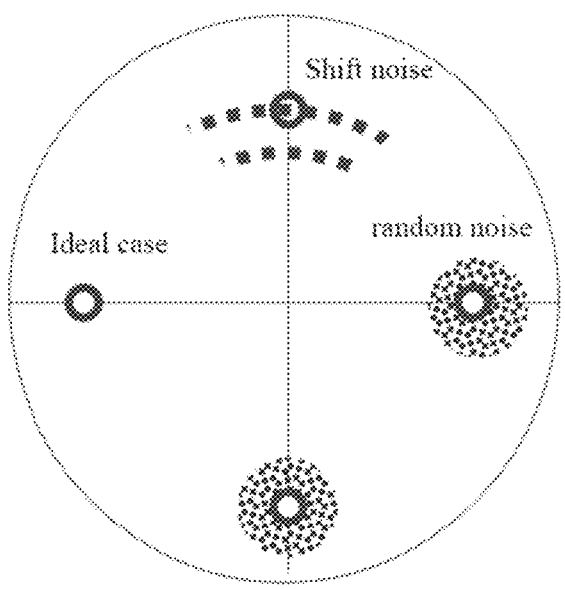
FIG. 76 illustrates the impact of noise on codes.
Figure 77:
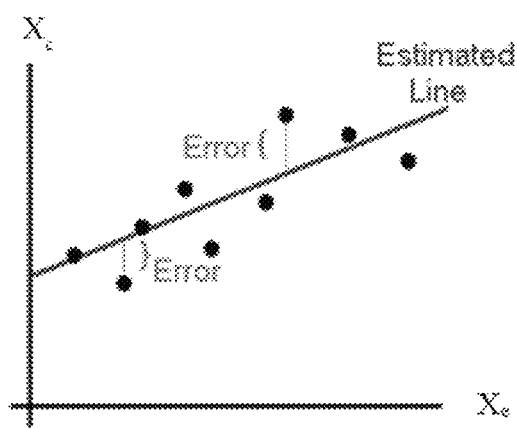
FIG. 77 illustrates linear regression of $(X_c, X_c)$.

As mentioned before, the interarrival time is robust to jamming attacks although the delay of each packet can change more drastically. In most times, the received interarrival vector is a noisy variable close to the original vector, as shown in FIG. 76. The received vector is very close to the target. Thus the minimum distance can be used to find the target.

B. Jamming-Index-Based Multi-Beam Traffic Allocation

Above, multi-beam, multi-path based rateless codes distribution has been described. The sender sends rateless coded symbols to different beams for 4 purposes: (1) achieve high throughput by fully exploring the benefits of the multiple links provided by all beams; (2) utilize the secondary transmission capability of full-duplex links (such as A→C→B, here A→C is the primary transmission, and C→B is the secondary transmission) to form pipelined transmission between links. (3) improve the resilience to packet loss and jamming by using the redundancy of rateless codes, which do not need to receive all symbols for the reconstruction of the original packets.

However, the same amount of symbols should not be allocated to different beams under jamming. Obviously, if one beam's path is jammed, it should send less or even zero symbols. No-jamming or less jammed beams should be allocated more symbols. In other words, the amount of symbols allocated to each beam should be proportional to its jamming index (JI). Here JI is defined as the degree of jamming in the wireless link. If there is no jamming, a node can receive data with occasional packet errors. However, those errors should be randomly distributed in the whole stream since they are mostly due to random noise. If there is intentional jamming attack, there will be much more packet errors, and those error positions will not be random since the jammer tries to jam the data that is in active transmissions. Therefore, there is strong correlation between the packet sending time and damaged packet's arrival time. The correlation between the packer error time instants ($T_e$) and correct reception instants ($T_c$) can be used since they are easy to collect:

$$\text{Correlation coefficient}(Xc) = \text{Cov}(T_e, T_c)/(\text{Var}(T_e) \times \text{Var}(T_c)) \quad (5)$$

Figure 78:
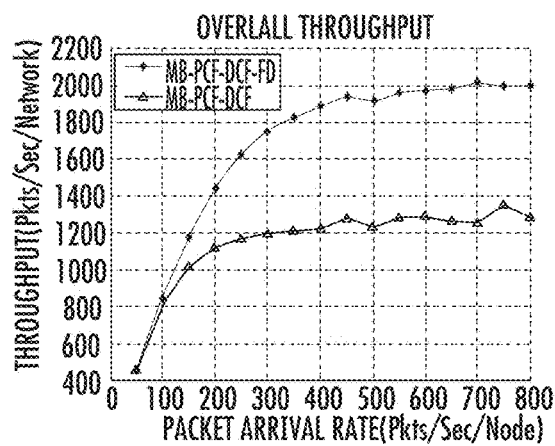
FIG. 78 illustrates throughput performance under FD and no-FD.

Obviously, such a correlation should be larger than normal (no-jamming) case. Let's denote the packer error probability (a random variable) as Xe. To determine whether a jamming attack occurs, first find the relationship between Xe and Xc in normal case. As shown in FIG. 78, suppose linear regression is used to obtain an estimated line. The estimation error between each real data point ($X_e(i)$, $X_c(i)$) and the line should be:

$$\delta(i) = X_c(i) - \{A \cdot X_e(i) + B\} \quad (6)$$

Assume that the line slope, A, is a random variable. A parameter jamming coefficient (JC) for the normal case, $\Xi$, can be defined as:

$$\Xi = \text{Ave}(A) + \Delta A \quad (7)$$

Here Ave(A) is A's average value, and ΔA is the tolerable maximum deviation of A, and is defined as:

$$\Delta A = 3 \times \left\{ \frac{1}{n-2} \sum_{i=1}^{n} \delta^2(i) \right\} / \left\{ \sqrt{n \times \mathrm{var}(X_e)} \right\} \quad (8)$$

Here n is the total number of data points. After the above threshold value Ξ is obtained in normal case (non-jamming experiments can be conducted to get such a JC), it can be used to detect jamming attack as follows (suppose the packet error rate (PDR) has been measured):

If PDR<γ (an empirical threshold value), there is no jamming attack;

Else If PDR>γ, and Correlation coefficient (Xc)>(Ξ·PDR), there is jamming attack.

Beam Traffic Allocation:

Obviously, if there is no jamming attack, allocate the maximum allowable traffic amount in that beam. Otherwise, reduce the traffic based on the jamming level, which can be measured by $X_c$. Note that $|X_c|$ will approach to 1 if there is strong correlation between those two variables. If it is close to 0, that means the correlation is weak. Therefore, the following traffic allocation strategy is provided:

If no jamming, traffic rate r(i) in beam i=$R_{max}$(i); Otherwise, r(i)=$R_{max}$(i)(1−|$X_c$|)

Intelligent Communications Via Prediction

A. Motivations of Intelligent Communication

In the above discussions, two of the 3-ENTs (throughput-efficient, and jamming-resilient) have been described. Here the third ENT—intelligent communications via prediction models—is described. So far the disclosed MAC scheme has well scheduled multi-beam transmissions with collision reductions. However, there is still a drawback there: in any specific interval, the active sender just simply turns on all beams, and blindly flushes out whatever it has in the queue in each beam. As a matter of fact, it may not even know how to set up each beam queue due to the suddenly coming neighbors. If a node is not an active sender in an interval, it must be in receiving status. But it still does not know which beam should be turned on and which neighbor it should receive data from. It is important to have a good knowledge of neighborhood communications in Ku-band multi-beam AN due to the following two reasons:

(1) Distributed Coordination Requires Each Node to have Smart Environment Awareness:

As mentioned before, Ku-band channel acts like a "semi-wire" to avoid central-point-failure. Therefore, the nodes need to coordinate with each other without a central controller. In the MAC layer, if a node gets the highest priority and sends out data, it needs to automatically decide what traffic flow should be sent out in each beam, what node it will be communicating with, as well as the queue serving rate. Without knowing those information, a node may just blindly send out whatever it has in each beam, or just simply sends out the same copies of packets in each beam since it has no idea about whom to communicate with.

(2) The Mission-Oriented Communication Demands a Prepared Multi-Beam Transmission/Reception:

ANs often transmit surveillance video streams among them. In the MAC layer, the entire slot interval should be dedicated to useful data transmissions, instead of time-consuming control message exchanges. It will seriously decrease the communication efficiency if we ask the nodes to exchange neighboring node arrival information frequently. As a matter of fact, our 802.11-compatible lower MAC layer has used 4WH (RTS/CTS/Data/ACK) control messages to exchange some basic packet attributes (such as channel reservation time). It is not wise to add extra control overhead in the upper MAC layer by asking the neighboring nodes to exchange traffic parameters again. Therefore, each node should use other ways to prepare the beam transmissions. The node state estimation and mobility prediction will be a good approach to low-overhead communications.

A good news is, for mission-oriented communications the system typically has predictable mobility. For example, since each UAV has certain surveillance scope, it cannot randomly fly around. Also, different aircrafts have desired height levels. All these facts make node mobility prediction and state estimation feasible through some Machine Learning algorithms.

In the following descriptions, two beam communication prediction schemes with different application conditions are described: (1) ARMA-based prediction: This method is simple to use since it assumes that the observed measurement represents the internal true state. It uses a time series model to estimate the next state (FIG. 18A). (2) Hidden Markov Model (HMM)-based prediction: If there is mismatch between the observed values and internal states (due to noisy measurement or other uncertainty factors), HMM is a better option since it builds the probability models for both internal states and observations (FIG. 18B).

B. ARMA Based Prediction

A vector ARMA model is used to predict the next-interval beam traffic state since vector ARMA can model a group of variables simultaneously. Vector ARMA helps us to make predictions for the following values in the same model: (1) a node's beam on/off pattern: will the neighbor's beam i still be on next time? If it is off, that means we cannot send data to that direction. (2) If the beam i is still on, what will be its traffic type (CBR, VBR, best effort, etc.)? (3) What queue size will be allocated for that specific beam communications? (4) What is the neighbor's next position (for example, is it out of beam scope or is still within communication range)? (5) What is the airtime for that beam's traffic? and other factors. A vector (multi-variable) ARMA sequence y(t) of n elements with orders p and q satisfies the equation:

$$A_0 y(t) + A_1 y(t-1) + \ldots + A_p y(t-p) = M_0 \varepsilon(t) + M_1 \varepsilon(t-1) + \ldots + M_q \varepsilon(t-q) \quad (9)$$

Here $A_0, A_1, \ldots M_0, M_1, \ldots$ are all matrices of order n×n and ε(t) is a disturbance (noise) vector of n elements. For analysis convenience, we can convert the above equation to a state-space model involving a transition equation. Thus conventional first-order Markov process can be used. If we define:

$\xi(t) = A^{-1}(L)\varepsilon(t)$, we can rewrite the above model as: y(t)=M(L)ξ(t), here L is the lag operator, and has the effect that Lx(t)=x(t−1). Here ξ(t) can be further written as a canonical recursive format:

$$\begin{bmatrix} \xi_1(t) \\ \xi_2(t) \\ \vdots \\ \xi_r(t) \end{bmatrix} = \begin{bmatrix} -A_1 & \cdots & -A_{r-1} & -A_r \\ I & \cdots & 0 & 0 \\ \vdots & \ddots & \vdots & \vdots \\ 0 & \cdots & I & 0 \end{bmatrix} \begin{bmatrix} \xi_1(t-1) \\ \xi_2(t-1) \\ \vdots \\ \xi_r(t-1) \end{bmatrix} + \begin{bmatrix} 1 \\ 0 \\ \vdots \\ 0 \end{bmatrix} \varepsilon(t) \quad (10)$$

Let's take a simple example. When n=2, ARMA is simplified as a VAR(1) model as:

$$y(t) = \begin{bmatrix} \phi_{11} & \phi_{12} \\ \phi_{21} & \phi_{22} \end{bmatrix} y(t-1) + \varepsilon(t), \quad (11)$$

Of special interest are cases such as $\phi_{12}=0$. The above model reduces to a transfer function. For general VAR(1) case, the h-step forecast can be obtained as:

$$y(t+h) = \Phi^h y(t), \text{ here } \Phi = \begin{bmatrix} \phi_{11} & \phi_{12} \\ \phi_{21} & \phi_{22} \end{bmatrix}, \text{ and } \Phi^2 = \Phi\Phi, \quad (12)$$

$\Phi^3 = \Phi^2\Phi$, etc.

C. HDP-HMM Based Prediction

1) General HMM:

HMM can be used to deduce the internal state transition even if the observed values have noise or even missing data. To make our model suitable to highly dynamic AN traffic pattern changes in different beams, we extend conventional finite HMM [32] to infinite HMM. In finite HMM, the system mode can only switch between pre-set finite number of states (FIG. 19A) assuming K states in total. If we denote $Z_t$ as the Markov chain mode at time t, $\pi_j$ as the mode-specific transition distribution for mode j, $y_t$ as the observation that is independent of the observations and modes at other time steps, F(.) as an indexed family of distributions, and $\theta_i$ as mode i's emission parameters, then we can simply describe finite HMM as a generative process as follows:

$$Z_t|Z_{t-1} \sim \pi_{Z_{t-1}}, \text{ and } y_t|Z_t \sim F(\theta_{Z_t}) \quad (13)$$

In order to maintain consistency with the later HDP-HMM discussions, we represent HMM as a sum of probability mass: assume each time the HMM can be one of the states in $\{\theta_1, \ldots, \theta_k\}$, and $\delta_\theta$ is a unit mass concentrated at $\theta$, instead of emphasizing the state transition between different times, here we focus on the Trellis representation (FIG. 19B) and use $G_j$ to represent the transition spectrum in mode j. Then we can represent a HMM as a transition spectrum concentrated in different times (see below):

HMM~$\{G_j, j=1,2,\ldots T\}$, here $G_1 = \Sigma_{i=1}^K \pi_{1i}\delta_{\theta_i}$ (see FIGS. 20A and 20B), . . . , $$G_j = \Sigma_{i=1}^K \pi_{ji}\delta_{\theta_i} \quad (14)$$

As shown in FIG. 19C, a HMM's mode at time t, denoted as $\theta_t'$, should be a state value. For example, based on FIG. 19A, we know $\theta_1'=\theta_2$, $\theta_2'=\theta_1$, and so on. Here $\{y_1, y_2, \ldots\}$ are observations. Then we can transfer the conventional HMM representation to a probability mass format:

$$\theta_t'|\theta_{t-1}' \sim G_{j_{t-1}}, \text{ and } y_t|\theta_t' \sim F(\theta_t') \quad (15)$$

Here $j_{t-1}$ is the unique emission parameter index j such that for any time state, $\theta_{t-1}'$, we can always find an unique value (called an atom) $\theta_j$ to satisfy: $\theta_{t-1}'=\theta_j$.

Bayesian Extension:

To overcome the impacts of AN node mobility uncertainty, we extend conventional HMM to a Bayesian model. We treat the transition spectrum $G_j$ as a random variable, and endow a prior distribution on it. In the above math model, $G_j$ is actually the weighted sum of unit masses, that is: $G_j = \Sigma_{i=1}^K \pi_{ji}\delta_{\theta_i}$. We assume Dirichlet distribution for those weights $\pi_j=[\pi_{j1}, \pi_{j2}, \ldots \pi_{jk}]$, and assume H as a base distribution. Its choice should consider the computational efficiency during Bayesian conjugate analysis. We have:

$$\pi_j \sim \text{Dir}(\alpha_1, \alpha_2, \ldots, \alpha_K), j=1,2,\ldots,K, \text{ atoms } \theta_j \sim H \quad (16)$$

Extend Finite HMM to Infinite HMM:

We need to extend conventional finite state HMM (with total K states) to an infinite-state scenario, where the number of states could change from time to time. In other words, we cannot limit the node states within certain pre-fixed set (as in FIG. 16(a)). Here we build infinite HMM by extending the K-state weighted sum to ∞-state case, which is called Dirichlet Process (DP):

$$G_0 = \Sigma_{i=1}^\infty \beta_i \delta_{\theta_i}, \text{ and } \theta_k \sim H \quad (17)$$

The random variable weights $\{\beta_i\}$ could be sampled through stick-breaking construction [33]: we divide a unit-length stick into lengths given by the weights $\beta_k$, and the $i^{th}$ weight is a random proportion $\upsilon_i$ of the remaining stick after the first (i-1) weights are chosen. We denote $\beta_i \sim \text{GEM}(\gamma)$, which means:

$$\beta_i = \upsilon_i \prod_{l=1}^{i-1}(1-\upsilon_l), \upsilon_i \sim \text{Beta}(1,\gamma) \quad (18)$$

2) HDP-HMM with State Suppression:

The above DP-HMM adapts to variable-state Markov chain. However, it has a serious drawback: It assumes that the transition spectrum has non-overlapping support. That is, at each transition step, the system switches to an entirely new collection of HMM modes and prevents the previously visited modes to ever be revisited. This is obviously not what we want in mobile networks since some common mobility behaviors are commonly seen in different surveillance applications. To reflect this fact, we define a transition spectrum $\{G_j\}$ on the same support points $\{\theta_1, \theta_2, \ldots\}$ to be a variation on a global discrete measure $G_0$. In other words, we define a hierarchical specification $G_j \sim \text{DP}(\alpha, G_0)$, and $G_0$ itself is a draw from a DP $(\gamma, H)$. Therefore, we can extend the above model to a HMM with a prior distribution of hierarchical DP (HDP) as follows:

$$\begin{cases} G_0 = \sum_{i=1}^\infty \beta_i \delta_{\theta_k}, & \beta|\gamma \sim DP(\gamma, H) \\ G_j = \sum_{i=1}^\infty \pi_{ji}\delta_{\theta_k}, & \pi_j|\alpha, \beta \sim DP(\alpha, \beta) \end{cases}, \text{ and } \theta_k \sim H \quad (19)$$

Suppress Redundant States:

For a realistic beam traffic change trajectory, there are many sticky states that could be removed without impacting on the description of the traffic change. For example, a beam may just simply alternates between CBR and VBR, but both belong to real-time multimedia traffic type and thus may be combined into one state (called "real-time traffic"). We prefer to see smoothly varying Markov state dynamics. However, general HDP-HMM (FIG. 20A) could not remove those redundant, sticky states and thus involve prohibitive high computational complexity. The main issue is that it cannot differentiate self-transitions from transitions between different states. In order to increase the expected probability of self-transition, we suppress those sticky states by introducing a new control parameter, k, for random variable $\pi$, that is (see FIG. 20B):

$$\pi_j|\alpha,k,\beta \sim DP(\alpha+k,(\alpha\beta+k\delta_j)/\alpha+k) \quad (20)$$

Here the parameter k is actually the reminiscent of the self-transition bias parameter of the infinite HMM, a precursor of the above HDP-HMM. The infinite HMM employs a two-level model. The top-level process places a probability on transitions to existing states in proportion to how many times these transitions have been seen.

Performance Evaluation

Our simulation scenario consist of 10 mobile nodes randomly distributed in a 300 km×300 km area. We have 25 iterations for each performance test, and in each iteration we generate a different network topology (from grid to random). The final results are the average values of all the iterations. The link capacity in each beam is set to 10 Mbps. Assume that each node has 4 beams with each beam covering 90 degrees of area. Each packet has the length of 1500 bytes.

A. Full-Duplex Performance:

We first investigate the network performance with or without full-duplex (FD) transmissions. In FIG. 78, the overall network throughput is plotted. As we can see, the throughput with FD is considerably higher than the case without FD. In FD, we can have one primary link and one secondary link for each node. When the node A is transmitting data to node B via the primary link, B could also detect other available nodes which wish to receive data from B. As long as the secondary transmission does not interrupt with any of the primary ones, two links can deliver data concurrently. Thus the overall throughput of the network is significantly improved. Ideally, if a node could always successfully find a secondary link, the throughput would be doubled compared to no-FD case. But in practical applications it may be difficult to always establish a secondary link for each of these nodes due to potential transmission collisions in some beams/directions. Thus the maximum throughput would not be as twice as the case without FD. FIG. 78 shows that compared to no-FD scheme, the FD could increase the overall network throughput by approximately 60% in average during most times.

Figure 79:
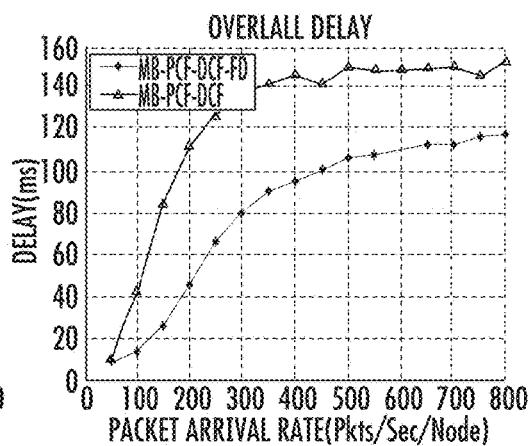
FIG. 79 illustrates delay under FD and no-FD.

The delay performance is shown in FIG. 79. From the figure we find out that the FD scheme has smaller delay than no-FD transmission. The results shows that most times the delay in FD network is 20 ms less than no-FD network. While the maximum delay difference between the two schemes is 60 ms, which happens when the packet arrival rate is 200 pkts/sec. Those delay reductions can greatly help the multimedia applications to achieve a real-time video delivery in mobile networks.

Figure 80:
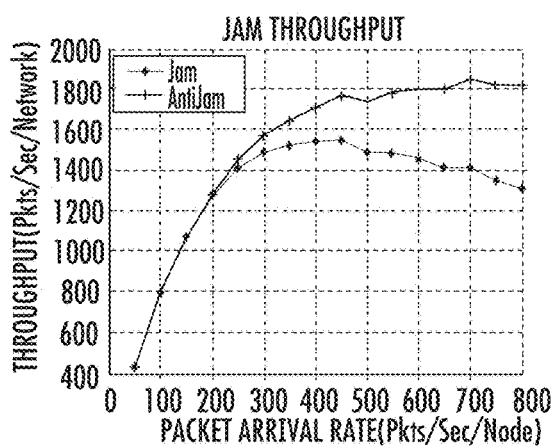
FIG. 80 illustrates throughput under anti-jam and jam.

B. Anti-Jamming Performance:

We now investigate the network performance under our anti jamming scheme. FIG. 80 describes the throughput performance. The red curve ('*' points) shows the throughput under jamming in the network but no anti-jamming scheme being used. The jammer referred to herein is smart, and could adjust the jamming power based on the detected traffic profile. If we obtain increasing packet arrival rate, generally the transmission rate in links should be higher. We assume that the jammer automatically raises its jamming power to generate more interference in higher rate links. From FIG. 80 we can see that, as the packet arrival rate is increasing, the overall throughput performance is decreasing after a certain level due to two reasons: (1) higher jamming level; (2) more network congestion events. However, with our anti-jamming algorithm, we can see that the throughput performance does not decrease. The throughput is much higher than no-anti-jamming case when the packer arrival rate is more than 500 pkts per second. But it still suffers from jamming interferences more or less, so the overall throughput performance is not as good as the FD throughput shown in FIG. 78.

Figure 81:
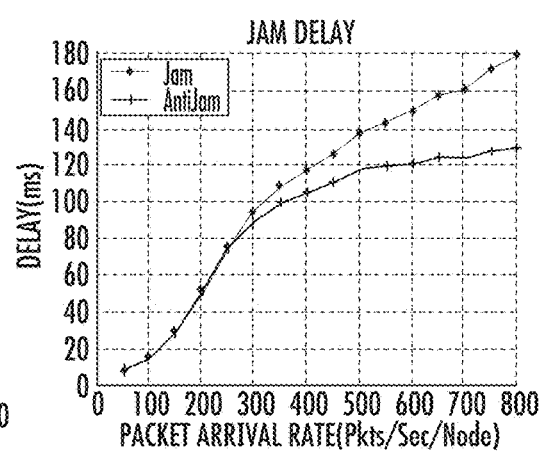
FIG. 81 illustrates delay under anti jam and jam.

FIG. 81 shows the delay performance with or without anti-jamming scheme. After applying our anti jamming algorithm, the delay performance is better than the case without using anti jamming scheme. As mentioned before, once the jammer is located, we rearrange the data to other beams/directions. And we allocate the traffic amount in different beams based on their jamming levels. Those methods help to avoid jamming attacks and quickly deliver the data to next node (thus with less delay).

Figure 82:
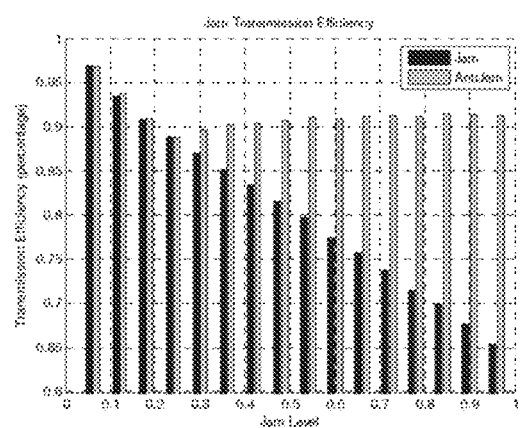
FIG. 82 illustrates transmission efficiency under jamming.

FIG. 82 shows the transmission efficiency (the ratio of successfully received packets to the originally sent ones). It is easy to see that, with the usage of our anti jamming algorithm the link transmission efficiency could be maintained around 90%. Without anti jamming scheme the link efficiency keeps decreasing as the jamming level increases. In the worst case, the efficiency may go down to approximately 75%. Such a case occurs when a jammer blocks one entire beam in a 4-beam node.

Figure 83:
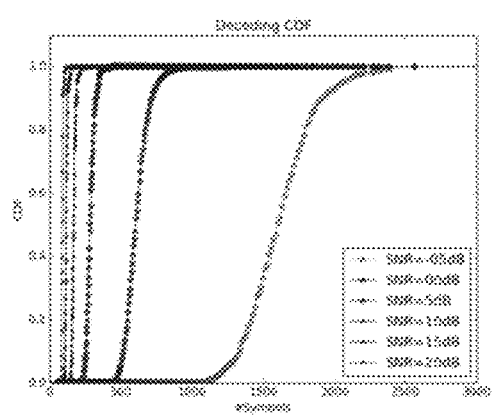
FIG. 83 illustrates estimated CDF for different SNRs.

C. Rateless Codes Performance:

We have discussed the benefit of using rateless codes in multi-beam links. It is a natural solution to distribute the rateless coded data pieces into multiple beams to achieve concurrent data delivery in order to enhance the throughput. Particularly the CDF concept further improved the rateless codes efficiency since it avoids unnecessary ACK waiting time. FIG. 83 shows our collected CDF statistics under different SNRs. As we can see, when the SNR is higher, the link condition is better, and the CDF curve can fast approach the idea case (=1). FIG. 84 shows the throughput performance for different rateless codes. Spinal codes has better performance since it is closer to the Shannon capacity.

D. Validate the State Prediction Schemes:

FIG. 85 shows the effect of using node state prediction schemes (including ARMA and HMM based prediction). Here we apply the prediction algorithms to predict node mobility behaviors. That is, we predict which beam a neighboring node will move to next, and what is its traffic type and required airtime. For comparison purpose, we put a 100% accurate prediction case here (i.e., we always know where the node moves to in the next time slot). As we can see, both HMM and ARMA achieve a higher throughput than no-prediction case. This is mainly because each node can prepare the data queue better after predicting the traffic profile and node mobility behaviors. For example, after we know a node will move away from the current beam, we can clear out the queue in that direction. If we know a node will move to this beam and send out data, we can allocate a proper length of queue to fill in the "airtime" in that direction.

FIG. 85 also shows that both HMM and ARMA have the performance that is closer to the ideal prediction case. But HMM outperforms ARMA in most cases since it can overcome the impacts of noisy, missing or even erroneous measurements. HMM can deduce the internal state from the inaccurate measurements. While ARMA simply thinks the measurement represents the internal true state.

FIGS. 86A and 86B show the effect of using HDP-HMM to reduce the complexity of HMM-based prediction. As we can see, before using HDP (see FIG. 86A), there could be many states; after we apply HDP (FIG. 86B), we can combine the similar states into one state, and thus reduce HMM state space. This largely shortens HMM state estimation time.

Figure 87:
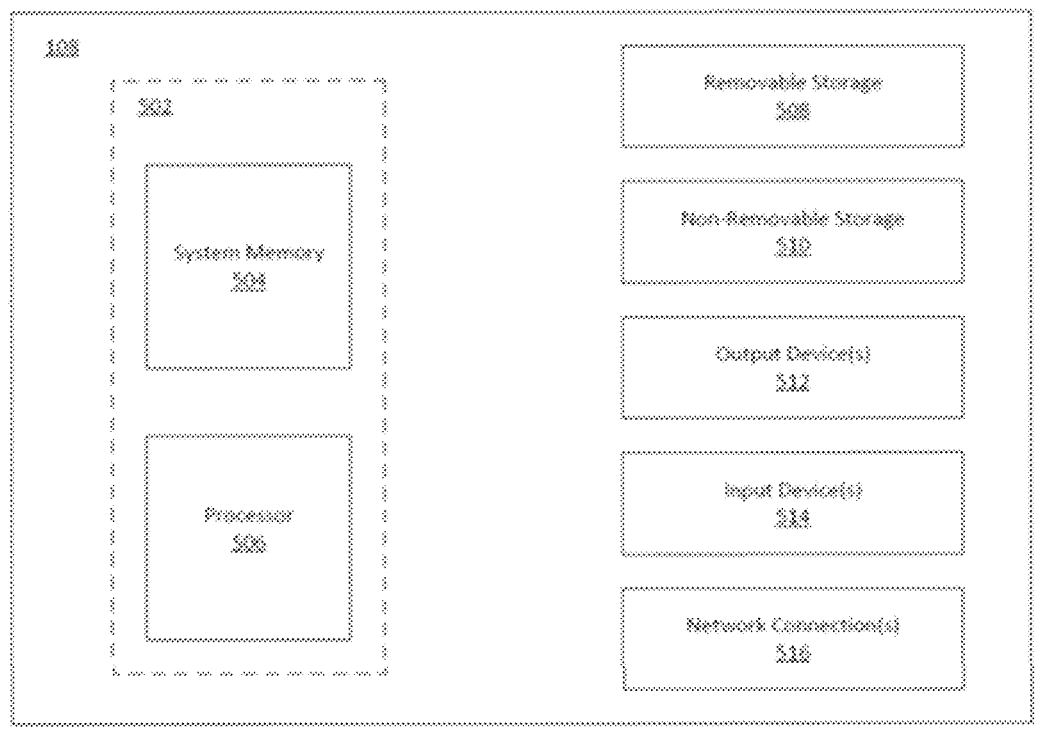
FIG. 87 shows an exemplary computing device upon which aspects of embodiments of the invention may be implemented.

When the logical operations described herein are implemented in software, the process may execute on any type of computing architecture or platform. For example, referring to FIG. 87, an example computing device upon which embodiments of the invention may be implemented is illustrated. The processing unit 108 may include a bus or other communication mechanism for communicating information among various components of the processing unit 108. In its most basic configuration, processing unit 108 typically includes at least one processor 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 87 by dashed line 502. The processor 506 may be a standard programmable processor that performs arithmetic and logic operations necessary for operation of the processing unit 108.

Processing unit 108 may have additional features/functionality. For example, processing unit 108 may include additional storage such as removable storage 508 and non-removable storage 510 including, but not limited to, magnetic or optical disks or tapes. Processing unit 108 may also contain network connection(s) 516 that allow the device to communicate with other devices. Processing unit 108 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the processing unit 108. All these devices are well known in the art and need not be discussed at length here.

The processor 406 may be configured to execute program code encoded in tangible, computer-readable media. Computer-readable media refers to any media that is capable of providing data that causes the processing unit 108 (i.e., a machine) to operate in a particular fashion. Various computer-readable media may be utilized to provide instructions to the processor 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processor 406 may execute program code stored in the system memory 504. For example, the bus may carry data to the system memory 504, from which the processor 506 receives and executes instructions. The data received by the system memory 504 may optionally be stored on the removable storage 508 or the non-removable storage 510 before or after execution by the processor 506.

Processing unit 108 typically includes a variety of computer-readable media. Computer-readable media can be any available media that can be accessed by device 108 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by processing unit 108. Any such computer storage media may be part of processing unit 108.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for control of a wireless mesh network comprising:
   implementing a multi-layered media access control protocol for coordinated transmission among a plurality of nodes of the wireless mesh network, wherein the wireless mesh network comprises a moving airborne network operating in a Ku-band frequency range, at least one of the plurality of nodes comprises a mesh router (MR) and at least one other of the plurality of nodes comprises a mesh client (MC), and wherein at least the MR node comprises a multi-beam smart antenna (MBSA);
   adapting parameters in the layers of the media access control protocol to schedule a Ku-band frequency data transmission among the plurality of nodes of the wireless mesh network, wherein all of the beams of the multi-beam smart antenna are concurrently either transmitting or receiving during the Ku-band frequency data transmission; and
   predicting state transitions between the plurality of nodes of the wireless mesh network using a mathematical model, wherein said state transitions comprise a next interval Ku-band frequency communication between the MR and the MC and the prediction includes which beam of the MBSA will be used to communicate with the MC in the Ku-band frequency range, a traffic type of the next interval Ku-band frequency communication, and required airtime for the next interval Ku-band frequency communication and the prediction is based at least in part on mobility of the MR and/or the MC.

2. The method of claim 1, wherein the at least one of the plurality of nodes of wireless mesh network is mobile.

3. The method of claim 1, wherein the wireless mesh network comprises priority aware communication.

4. The method of claim 1, wherein the multi-layered media access control protocol uses time difference synchronization further enhanced by using reference broadcast time synchronization.

5. The method of claim 1, wherein the multi-layered media access layer uses a distributed coordination function.

6. The method of claim 5, wherein the distributed coordination function comprises beam synchronized backoff.

7. The method of claim 1, wherein the multi-layered media access control protocol uses a point coordination function.

8. The method of claim 1, wherein the multi-layered media access control protocol comprises TDMA-like collision domain separation.

9. The method of claim 1, wherein the multi-layered media access control protocol comprises TDMA rate control in each beam of the multi-beam smart antennas.

10. The method of claim 1, wherein the wireless mesh network comprises neighborhood-synchronization in switched multi-beam smart antennas.

11. The method of claim 1, wherein the mathematical model comprises a vector autoregressive moving average model (ARMA).

12. The method of claim 1, wherein the mathematical model comprises a hidden Markov model.

13. The method of claim 1, wherein the predicted traffic type comprises one of a constant bit rate (CBR), a variable bit rate (VBR), or a best effort.

14. A system for control of a wireless mesh network comprising: a wireless mesh network comprised of a plurality of nodes, wherein one or more of the plurality of nodes are comprised of a processor, a memory and a communications interface, said processor executing computer-readable instructions, stored in the memo, to:
   implement a multi-layered media access control protocol for coordinated transmission among the plurality of nodes of the wireless mesh network, wherein the wireless mesh network comprises a moving airborne network operating in a Ku-band frequency range, at least one of the plurality of nodes comprises a mesh router (MR) and at least one other of the plurality of nodes comprises a mesh client (MC), and wherein at least the MR node comprises a multi-beam smart antenna (MBSA);
   adapt parameters in the layers of the media access control protocol to schedule a Ku-band frequency data transmission among the nodes of the wireless mesh network, wherein all of the beams of the multi-beam smart antenna are concurrently either transmitting or receiving during the Ku-band frequency data transmission; and
   predict state transitions between the nodes of the wireless mesh network using a mathematical model wherein said state transitions comprise a next interval Ku-band frequency communication between the MR and the MC and the prediction includes which beam of the MBSA will be used to communicate with the MC in the Ku-band frequency range, a traffic type of the next interval Ku-band frequency communication, and required airtime for the next interval Ku-band frequency communication and the prediction is based at least in part on mobility of the MR and/or the MC.

15. The system of claim 14, wherein the multi-layered media access control protocol comprises TDMA rate control in each beam of the multi-beam smart antennas.

16. The system of claim 14, wherein the wireless mesh network comprises neighborhood-synchronization in switched multi-beam smart antennas.

17. The system of claim 14, wherein the multi-layered media access control protocol uses a distributed coordination function.

18. The system of claim 17, wherein the distributed coordination function comprises beam synchronized backoff.

19. The system of claim 14, wherein the multi-layered media access control protocol uses a point coordination function.

20. The system of claim 14, wherein the multi-layered media access control protocol comprises TDMA-like collision domain separation.

21. The system of claim 14, wherein the mathematical model comprises a vector autoregressive moving average model (ARMA).

22. The system of claim 14, wherein the mathematical model comprises a hidden Markov model.

23. The system of claim 14 further comprising an aircraft, wherein at least one of the plurality of nodes of the wireless mesh network is located on the aircraft.

24. The system of claim 14, wherein the predicted traffic type comprises one of a constant bit rate (CBR), a variable bit rate (VBR), or a best effort.

* * * * *